(12) United States Patent
Yestrebsky et al.

(10) Patent No.: US 12,350,535 B2
(45) Date of Patent: Jul. 8, 2025

(54) IN SITU TREATMENT SYSTEMS FOR REMEDIATION OF POLYCHLORINATED BIPHENYL CONTAMINATED BUILDING MATERIALS

(71) Applicant: UNIVERSITY OF CENTRAL FLORIDA RESEARCH FOUNDATION, INC., Orlando, FL (US)

(72) Inventors: Cherie Yestrebsky, Geneva, FL (US); Adibah M. Almutairi, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 1313 days.

(21) Appl. No.: 17/043,913

(22) PCT Filed: Apr. 1, 2019

(86) PCT No.: PCT/US2019/025160
§ 371 (c)(1),
(2) Date: Sep. 30, 2020

(87) PCT Pub. No.: WO2019/191755
PCT Pub. Date: Oct. 3, 2019

(65) Prior Publication Data
US 2021/0016121 A1    Jan. 21, 2021

Related U.S. Application Data

(60) Provisional application No. 62/650,897, filed on Mar. 30, 2018.

(51) Int. Cl.
*A62D 3/34*     (2007.01)
*A62D 101/22*   (2007.01)
(Continued)

(52) U.S. Cl.
CPC ............ *A62D 3/34* (2013.01); *B01D 11/0288* (2013.01); *B09B 3/80* (2022.01); *A62D 2101/22* (2013.01); *B09C 1/08* (2013.01)

(58) Field of Classification Search
None
See application file for complete search history.

(56) References Cited

U.S. PATENT DOCUMENTS 5,043,054 A    8/1991  Halpern et al.
5,269,968 A    12/1993 Miller et al.
(Continued)

OTHER PUBLICATIONS

Negroni, Andrea et al., "Reductive Dechlorination of Polychlorinated Biphenyls (PCBs) By Means of Nanoscale Zero-Valent Nickel-Iron (NZVNI) Particles", Environmental Engineering and Management Journal, Oct. 2012, vol. 11, No. 10, pp. 1733-1739.
(Continued)

*Primary Examiner* — John J Figueroa
(74) *Attorney, Agent, or Firm* — Timothy H. Van Dyke; Wolter Van Dyke Davis, PLLC

(57) ABSTRACT

Treatment systems and methods for capable of extracting or extracting and degrading trapped PCBs within a variety of building materials.

9 Claims, 46 Drawing Sheets

(51) Int. Cl.
  B01D 11/02 (2006.01)
  B09B 3/80 (2022.01)
  B09C 1/08 (2006.01)

(56) References Cited

U.S. PATENT DOCUMENTS

| | | | |
|---|---|---|---|
| 7,271,199 | B1 | 9/2007 | Quinn et al. |
| 8,163,972 | B2 | 4/2012 | Quinn et al. |
| 2003/0171241 | A1 | 9/2003 | Henneberry et al. |
| 2004/0069720 | A1 | 4/2004 | Clausen et al. |
| 2007/0112243 | A1 | 5/2007 | Quinn et al. |
| 2008/0177125 | A1 | 7/2008 | Quinn et al. |
| 2010/0217063 | A1* | 8/2010 | Quinn ............... A62D 3/37 502/170 |
| 2012/0128614 | A1 | 5/2012 | Reith et al. |
| 2012/0204908 | A1 | 8/2012 | Byrne et al. |
| 2014/0155676 | A1* | 6/2014 | Quinn ............... B09C 1/025 210/644 |
| 2021/0016121 | A1 | 1/2021 | Yestrebsky |

OTHER PUBLICATIONS

Novaes-Card, Simone, "Magnesium And Acidified Ethanol Based Treatment Systems For The Extraction And Dechlorination Of Polychlorinated Biphenyls From Contaminated Oils, Paints, And Soils" , 2013, Electronic Theses and Dissertations, 2004-2019. 2801.

Okwadha, George D.O. et al., "Biocontainment of polychlorinated biphenyls (PCBs) on flat concrete surfaces by microbial carbonate precipitation", Journal of Environmental Management, 2011, vol. 92, pp. 2863-2864.

Pizam, Gonzalo E.L. et al., "Evdwtion of Cleaning and Coating Techniques for PCB-Contaminated Concrete", Environmental Progress, Apr. 2002, V01.21, No. 1, pp. 47-56.

Powers, Susan et al. "Wettability of porous media after exposure to synthetic gasolines", Journal of Contaminant Hydrology, 1995, vol. 19, pp. 105-125.

Rathfelder, Klaus et al., "The influence of capillarity in numerical modeling of organic liquid redistribution in two-phase systems", Advances in Water Resources , 1998, vol. 21, No. 2, pp. 159-170.

Rodenburg, Lisa et al., "Polychlorinated biphenyls in pigments: inadvertent production and environmental significance", Colora. Technol., 2015, vol. 131, pp. 353-369.

Ruiz, Nancy, "Application of a Bimetallic Treatment System (BTS) for PCB Removal from Older Structures on DoD Facilities", Engineering Service Center, Nov. 2011, 73 pages.

Saitta, Kristen Erin, "Laboratory Studies To Field Evaluation : Remediation Of Polychlorinated Biphenyl Contaminated Painted Surfaces Through The Use Of Activated Metal Treatment Systems", 2010, Electronic Theses and Dissertations, 2004-2019. 1664, 141 pages.

Saitta, Erin K.H. et al., "Laboratory evaluation of a prospective remediation method for PCB-contaminated paint", Journal of Environmental Health Science & Engineering ,2014, vol. 12, No. 57, 5 pages.

Saitta, Erin K.H. et al., "Case study of a non-destructive treatment method for the remediation of military structures containing polychlorinated biphenyl contaminated paint", Journal of Environmental Management, 2015, vol. 158, pp. 40-47.

Stenberg, Mia et al., "Multivariate toxicity profiles and QSAR modeling of non-dioxin-like PCBs—An investigation of in vitro screening data from ultra-pure congeners", Chemosphere, 2011, vol. 85, pp. 1423-1429.

"Stockholm Convention On Persistent Organic Pollutants", Secretariat of the Stockholm Convention, United Nations Environmental Program, 2009, 56 pages.

Tehrani, Rouzbeh et al., "Hydroxylated Polychlorinated Biphenyls in the Environment: Sources, Fate, and Toxicities", Environ Sci Pollut Res Int. May 2014, vol. 21, No. 10, pp. 6334-6345.

Vanschalkwyk, William, "Managing PCB in our infrastructure", Boston Globe Business Team, Sep. 28, 2009, 17 pages.

Wiegel, Juergen et al., "Microbial reductive dehalogenation of polychlorinated biphenyls", FEMS Microbiology Ecology, 2000, vol. 32, pp. 1-15.

Zarei, Hosseinali et al., "Experimental study on the calorimetric data of 2-butoxyethanol with aliphatic alcohols (C1-C4) and correlation with the Wilson, NRTL and UNIQUAC models at T = 298 K", J. Chem. Thermodynamics, 2016, vol. 103, pp 30-35.

Zullo, Fiona M. et al., "Mechanistic and computational studies of PCB 151 dechlorination byzero valent magnesium for field remediation optimization", Journal of Hazardous Materials, 2017, vol. 337, pp. 55-61.

PCT/US2019/025160, PCT Search Report and Written Opinion, Date Mailed Jul. 25, 2019, 13 pages.

Andersson, M. et al.,"Building materials as a source of PCB pollution in Bergen, Norway" , Science of the Total Environment, 2004, vol. 325, pp. 139-144.

Agency for Toxic Substances and Disease Registry, "Polychlorinated Biphenyls (PCB) Toxicity", Jun. 1990, Course: SS3067, 40 pages.

Balfanz Eckhard et al., "Sampling and Analysis of Polychlorinated Biphenyls (Pcb) in Indoor Air Due To Permanently Elastic Sealants", Chemosphere, 1993, vol. 26, No. 5. pp. 871-880.

Barkley, Naomi P., "Update on Building and Structure Decontamination", Journal of the Air, 1990, vol. 40, No. 8, pp. 1174-1178.

Bent, S et al., "Management of indoor air pollution by polychlorinated biphenyl compounds exemplified by two Hagen Schools", PubMed, Jul. 1994, vol. 56, No. 7, pp. 394-398.

Boatman Rodney et al., "Acute toxicity classification for ethylene glycol mono-n-butyl ether under the Globally Harmonized System", Regulatory Toxicology and Pharmacology, 2014, vol. 68, pp. 41-50.

Borja, Josephine et al., "Polychlorinated biphenyls and their biodegradation", Process Biochemistry, 2005, vol. 40, pp. 1999-2013.

Breivik, Knut et al., "Towards a global historical emission inventory for selected PCB congeners—a mass balance approach 1. Global production and consumption", The Science of the Total Environment, 2002, vol. 290, pp. 181-198.

Broadhurst, Martin G., "Use and Replaceability of Polychiorinated Biphenylst", Environmental Health Perspectives, Oct. 1972, pp. 81-102.

Brown, Kathleen W. et al., "PCB remediation in schools: a review", Environ Sci Pollut Res, 2016, vol. 23, pp. 1986-1997.

Burkhardt U. et al., "Indoor pollution by polycholrinated (PCB) bihenyls in permanent elastic sealing compounds", Das Offentliche Gesundheitswesen, 1990, vol. 52, No. 10, pp. 567-574.

Chang, M. et al., "Remediating PCB-Containing Building Products; Strategies and Regulatory Considerations", Proceedings: Indoor Air, 2002, pp. 171-176.

Choi, Sung-Deuk, et al, "Passive Air Sampling of Polychlorinated Biphenyls and Organochlorine Pesticides at the Korean Arctic and Antarctic Research Stations: Implications for Long-Range Transport and Local Pollution", Environ. Sci. Technol., 2008, vol. 42, pp. 7125-7131.

Choi, Hyeok et al., "Effect of reaction environments on the reactivity of PCB (2-chlorobiphenyl) over activated carbon impregnated with palladized iron", Journal of Hazardous Materials, 2010, vol. 179, pp. 869-874.

Coghlan KM et al., "Characterization of Polychlorinated Biphenyls in Building Materials and Exposures in the Indoor Environment", Proceedings: Indoor Air, 2002, pp. 147-151.

Coner R. et al., "PCB in Indoor Air and Dust in Buildings in Stockholm", Proceedings: Indoor Air, 2002, pp. 141-146.

Coutts, Janelle I. et al., "The use of mechanical alloying for the preparation of palladized magnesium bimetallic particles for the remediation of PCBs", Journal of Hazardous Materials, 2011, vol. 192, pp. 1380-1387.

DeVor Robert et al., "Dechlorination comparison of mono-substituted PCBs with Mg/Pd in different solvent systems", Chemosphere, 2008, vol. 73, pp. 896-900.

(56) References Cited

OTHER PUBLICATIONS

Dickey, Robert W. et al., "Dispersants and Seafood Safety Assessment of the potential impact of Corexit® oil dispersants on seafood safety", Coastal Response Research Center. Dispersant Initiative and Workshop, 2011, 11 pages.

Environmental Health & Engineering, Inc., "Literature Review of Remediation Methods for PCBs in Buildings", Jan. 2012, 68 pages.

Elie, Marc, "Use Of An Activated Magnesium/cosolvent System For The Desorption And Degradation Of Polycyclic Aromatic Hydrocarbons And Their Oxygenated Derivatives In Contaminated Soils", Electronic Theses and Dissertations, 2012, 225 pages.

Elie, Marc et al., "Application of a magnesium/co-solvent system for the degradation of polycyclic aromatic hydrocarbons and their oxygenated derivatives in a spiked soil", Chemosphere, 2017, vol. 117, pp. 793-800.

Engle, Lawrence S. et al., "Polychlorinated Biphenyl Levels in Peripheral Blood and Non-Hodgkin's Lymphoma: A Report from Three Cohorts", Cancer Res, Jun. 1, 2007, vol. 67, No. 11, pp. 5545-5552.

EPA, 15 USC CH. 53: Toxic Substance Control, Commerce and Trade, 1976, 117 pages.

EPA, "Polychlorinated Biphenyl (PCB) Site Revitalization Guidance Under the Toxic Substances Control Act (TSCA)", Nov. 2005, 87 pages.

EPA, "Part 761-Polychlorinated Biphenyls (PCBs) Manufacturing, Processing, Distribution in Commerce, and Use Prohibitions", pp. 710-838.

Granz, Dan, "Standard Operating Procedure for Sampling Porous Surfaces for Polychlorina Ted Biphenyls (PCBs)", May 5, 2011, 15 pages.

Guo, Hongyan et al., "Ethyl lactate enhances ethylenediaminedisuccinic acid solution removal of copper from contaminated soils", Journal of Hazardous Materials, 2010, vol. 174, pp. 59-63.

Harris, Olivia et al., "Toxicological Profile For ", 2-Butoxyethanol and 2-Butoxyethanol Acetate, U.S. Department of Health and Human Services, Aug. 1998, 404 pages.

Herrick, Robert F. et al., "An Unrecognized Source of PCB Contamination in Schools and Other Buildings", Environmental Health Perspectives, Jul. 2004, vol. 112, No. 10, pp. 1051-1053.

Herrick, Robert F. et al., "Soil Contamination from PCB-Containing Buildings", Environmental Health Perspectives, Feb. 2007, vol. 115, No. 2, pp. 173-175.

Herrick, Robert F., "PCBs in School-Persistent Chemicals, Persistent Problems", New Solutions, 2010, vol. 20, No. 1, pp. 115-126.

Hopf, Nancy Brenna et al., "Cumulative exposure estimates for polychlorinated biphenyls using a job-exposure matrix", Chemosphere, 2009, vol. 76, pp. 185-1093.

Hu, Dingfei et al., "Discovery of Non-Aroclor PCB (3,3'-Dichlorobiphenyl) in Chicago Air", Environmental Science & Technology, 2008, vol. 42, No. 21, 7873-7877.

Jartun, Morten et al., "Painted surfaces—Important sources of polychlorinated biphenyls (PCBs) contamination to the urban and marine environment", Environmental Pollution, 2009, vol. 157, pp. 295-302.

Jonker, Michiel T. et al., "Sorption of Polycyclic Aromatic Hydrocarbons and Polychlorinated Biphenyls to Soot and Boot-like Materials in the Aqueous Environment: Mechanistic Considerations", Environ. Sci. Technol., 2002, vol. 36, pp. 3725-3734.

Kaŏst' anek, Frantiŏsek et al., "Combined decontamination processes for wastes containing PCBs", Journal of Hazardous Materials, 2005, vol. B117, pp. 185-205.

Kolarik, Barbara et al., "Laboratory investigation of PCB bake-out from tertiary contaminated concrete for remediation of buildings", Chemosphere, 2017, vol. 179, pp. 101-111.

Kuusisto, Sari et al., "PCB contaminated dust on indoor surfaces - Health risks and acceptable surface concentrations in residential and occupational settings", Chemosphere, 2007, vol. 67, pp. 1194-1201.

Legron-Rodriguez, Tamara, "Remediation Of Polychlorinated Biphenyl (pcb) Contaminated Building Materials Using Non-metal And Activated Metal Treatment Systems", Electronic Theses and Dissertations, 2004-2019. 2882, 2013, 114 pages.

Liu, jun et al., "Study on Surface Permeability of Concrete under Immersion", Materials, 2014, vol. 7, pp. 876-886.

Ljung et al., "Proceedings of the 6th Symposium on Building Physics in the Nordic Countries", Trondhim, 2002, vol. 2, pp. 823-827.

MacIntosh, David L. et al., "Mitigation of building-related polychlorinated biphenyls in indoor air of a school", Environmental Health , 2012, vol. 11, No. 24, 10 pages.

Maloney, Phillip et al., "Dechlorination of polychlorinated biphenyls using magnesium and acidified alcohols", Journal of Hazardous Materials, 2011, vol. 187, pp. 235-240.

Matsuda,Hiroyuki et al., "Separation Effects of Renewable Solvent Ethyl Lactate on the Vapor-Liquid Equilibria of the Methanol + Dimethyl Carbonate Azeotropic System", J. Chem. Eng. Data, 2017, vol. 62, pp. 2944-2952.

Method 3550C Ultrasonic Extraction. U.S. Environmental Protection Agency, U.S. Government Printing Office: Washington, DC, 2007, 17 pages.

Method 3665A Sulfuric Acid/Permanganate Cleanup. U.S. Environmental Protection Agency, U.S. Government Printing Office: Washington, DC, 1996.5 pages.

Method 8082A Polychlorinated Biphenyls (PCBs) by Gas Chromatography. U.S. Environmental Protection Agency, U. S. Government Printing Office: Washington, DC, 2007 56 pages.

Mousa, Mahmound et al., "Microbial Dechlorination Alleviates Inhibitory Effects of PCBs on Mouse Gamete Fertilization in Vitro", Environmental Science & Technology, 1996, vol. 30, No. 6, pp. 2087-2092.

* cited by examiner

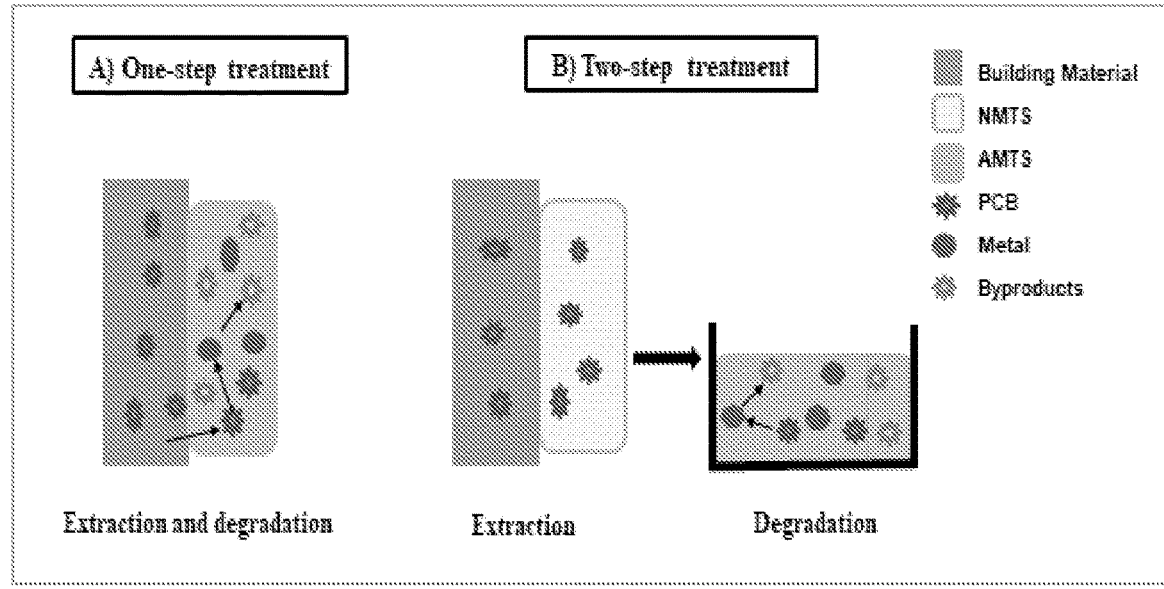
FIG. 1A-B
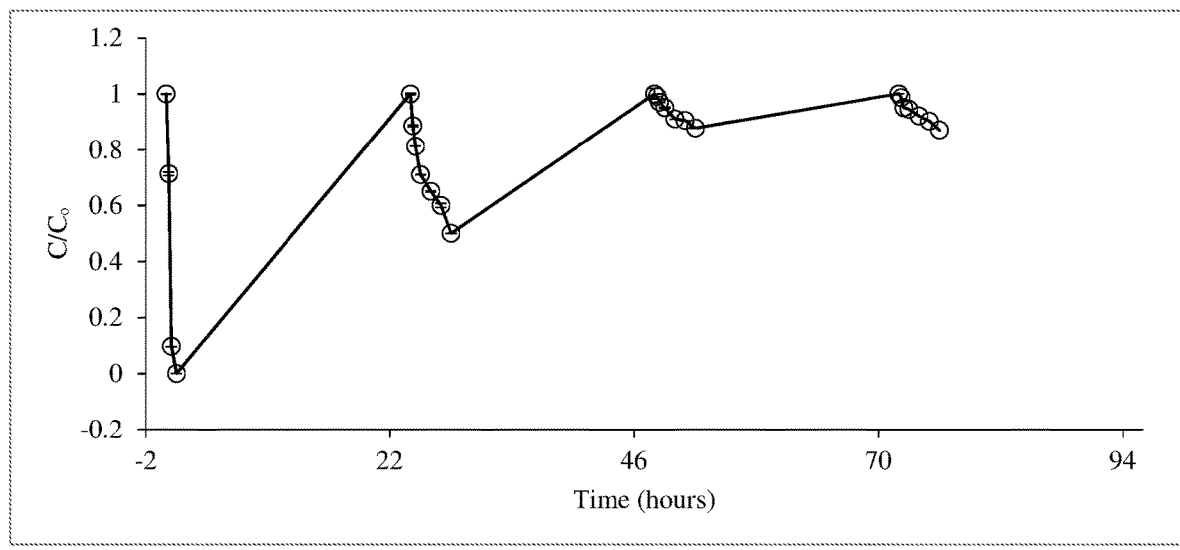
FIG. 2

FIG. 8A-D analysis.

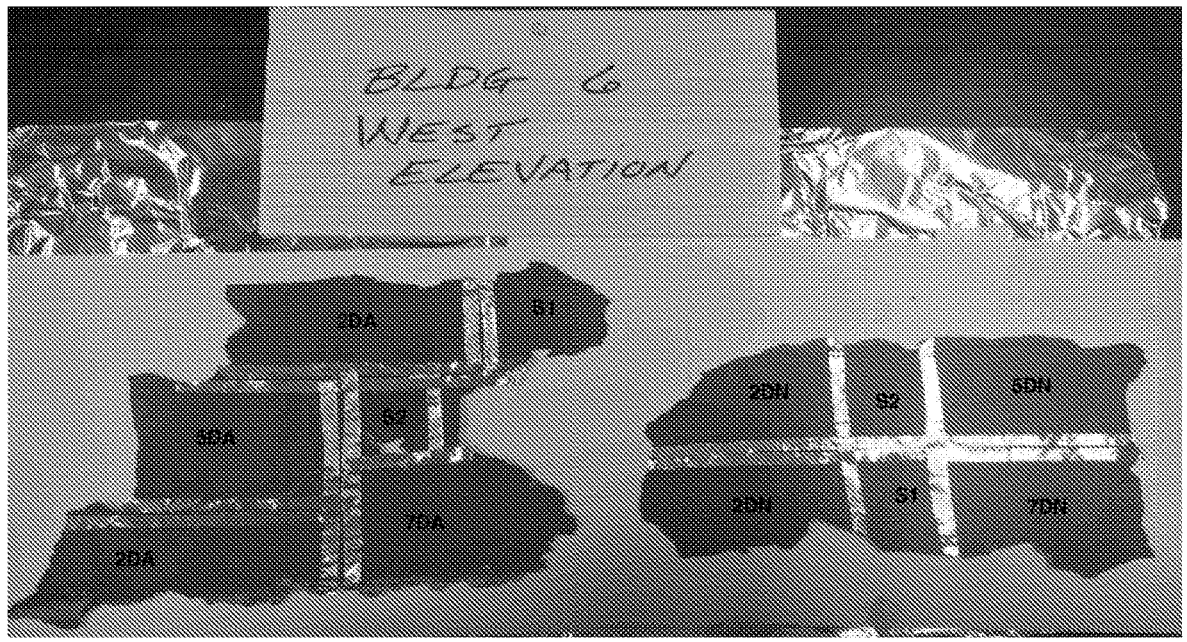
FIG. 15
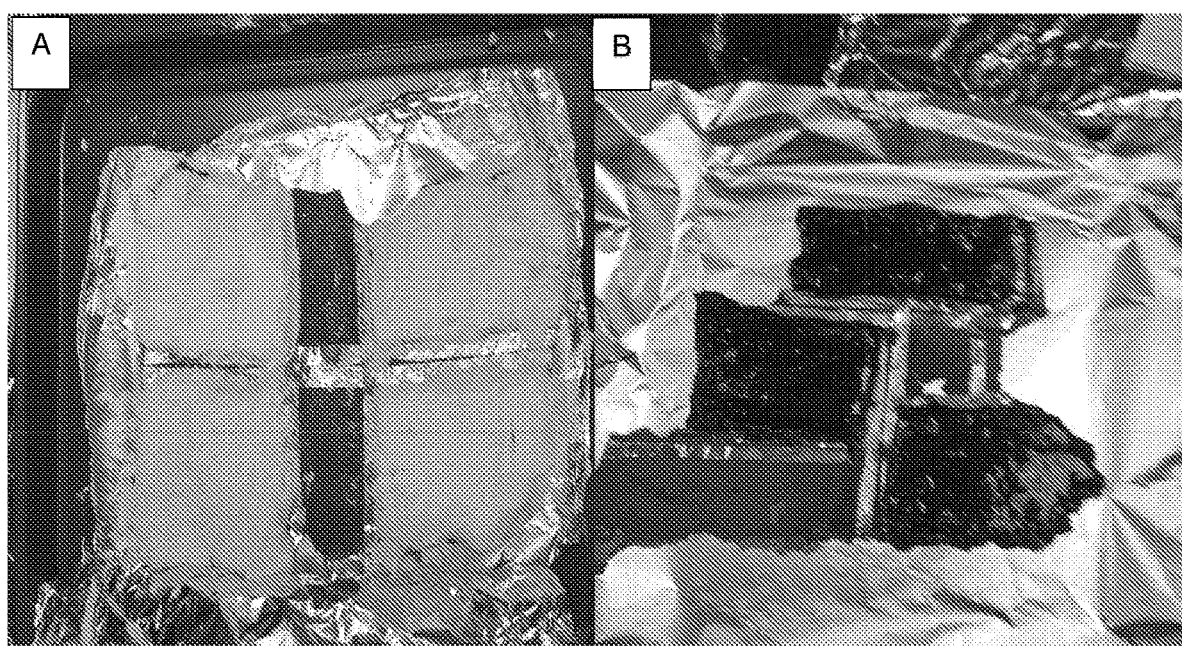
FIG. 16A-B

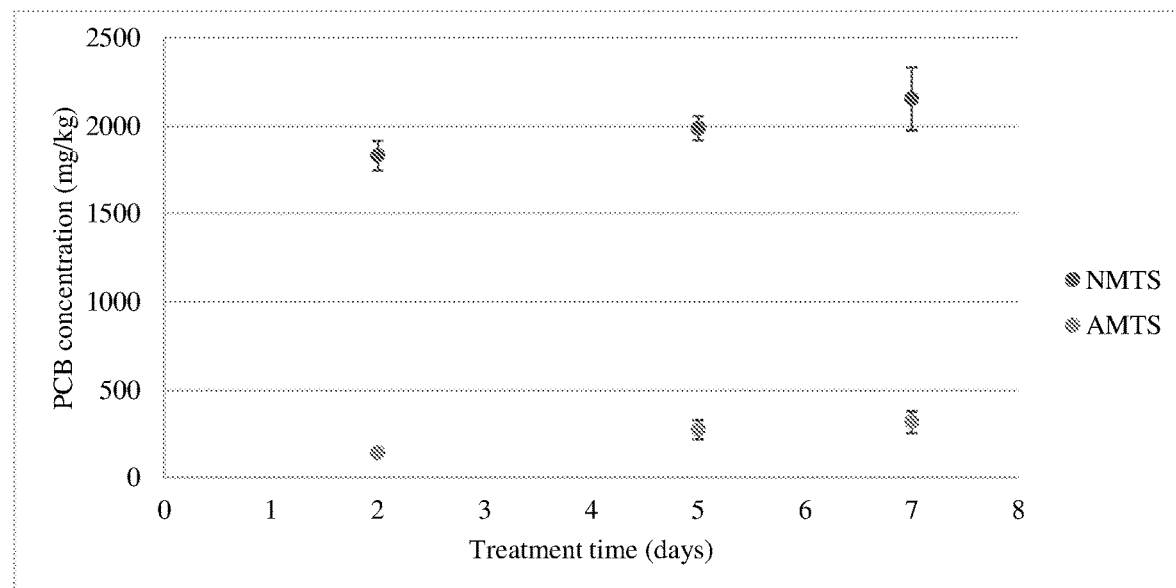
FIG. 19
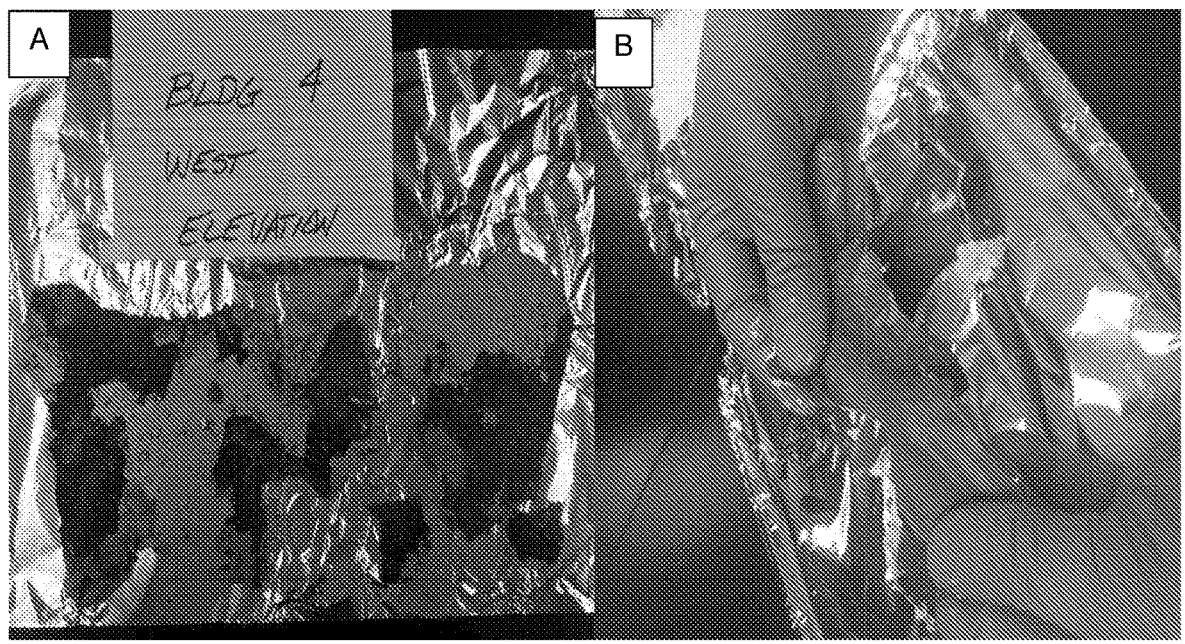
FIG. 20A-B

FIG. 22A-D

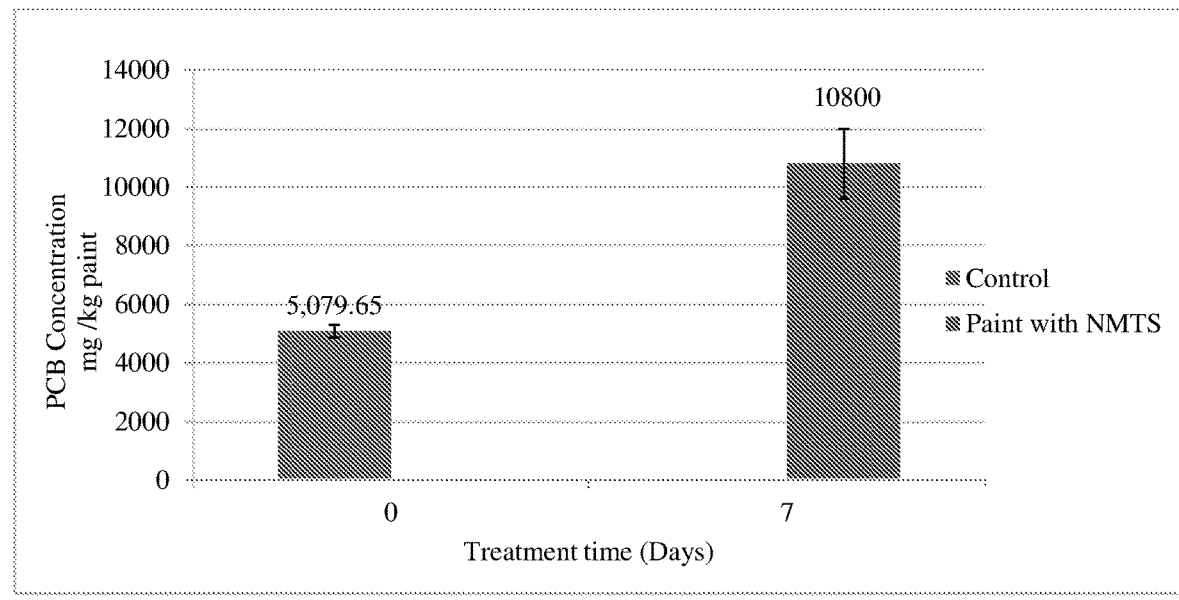
FIG. 25
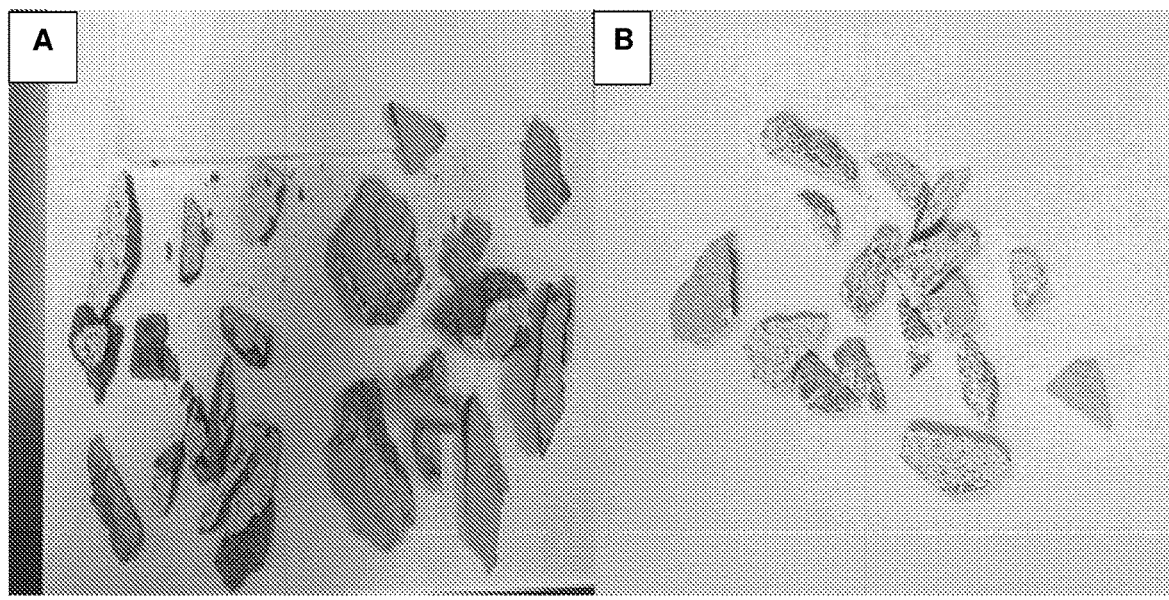
FIG. 26A-B

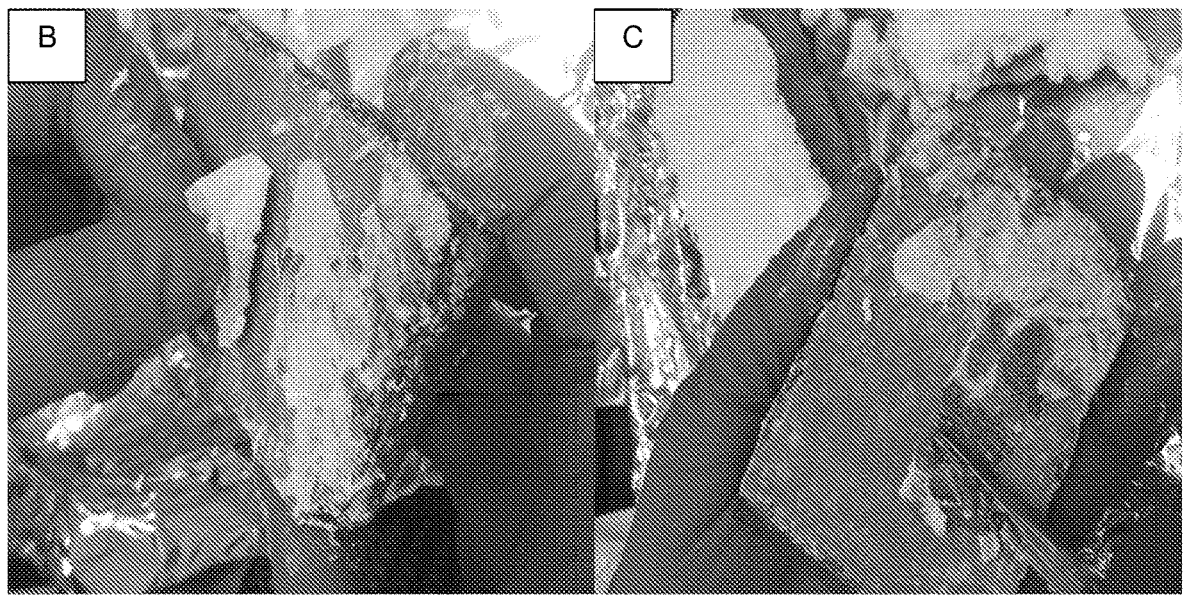
FIG. 30B-C
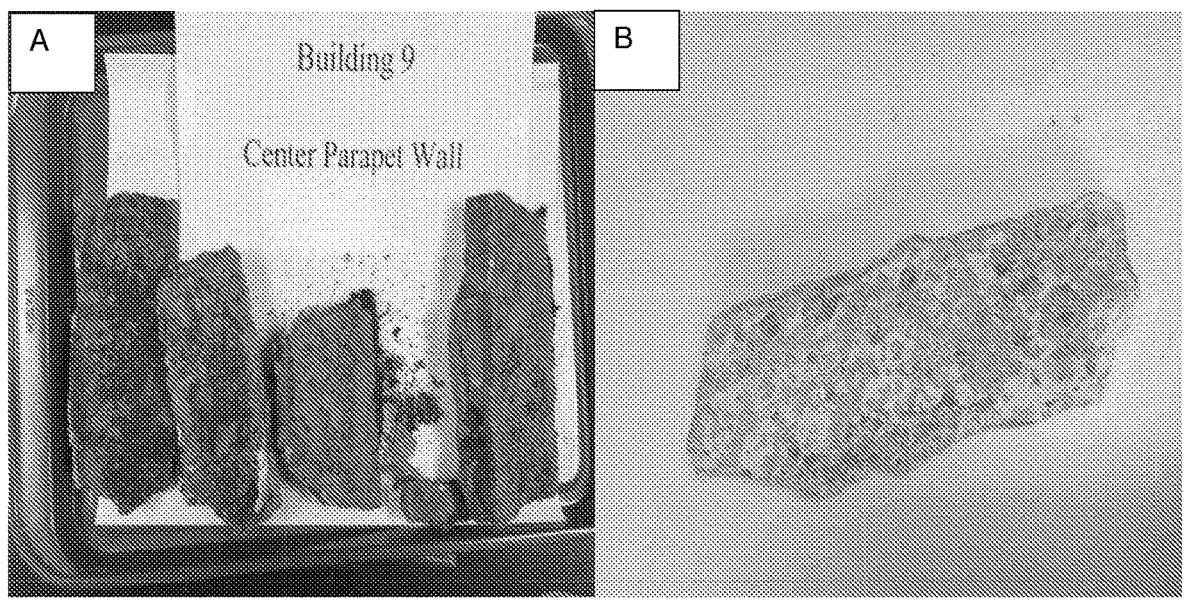
FIG. 31A-B

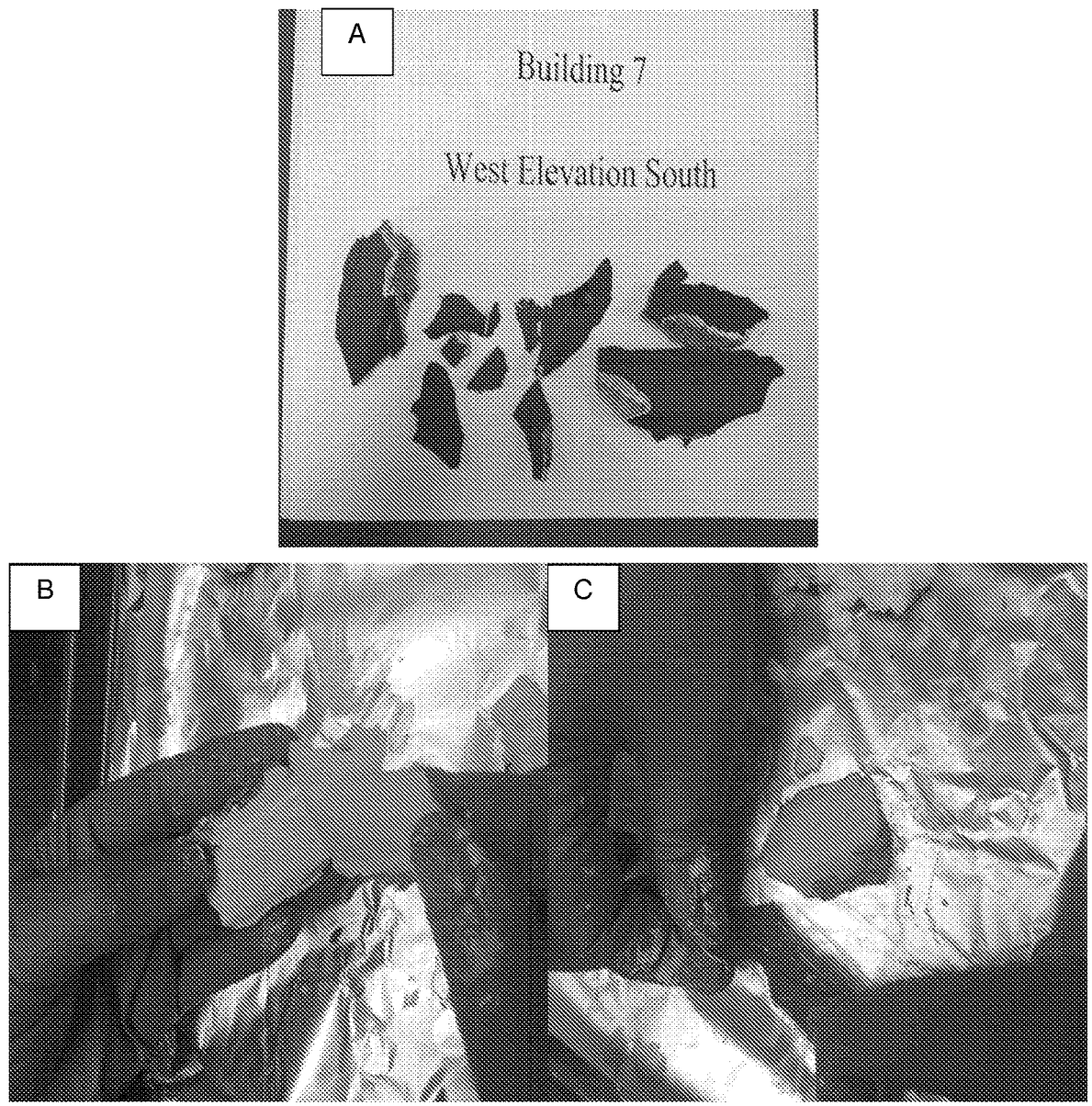
FIG. 32A-C

FIG. 42A-D

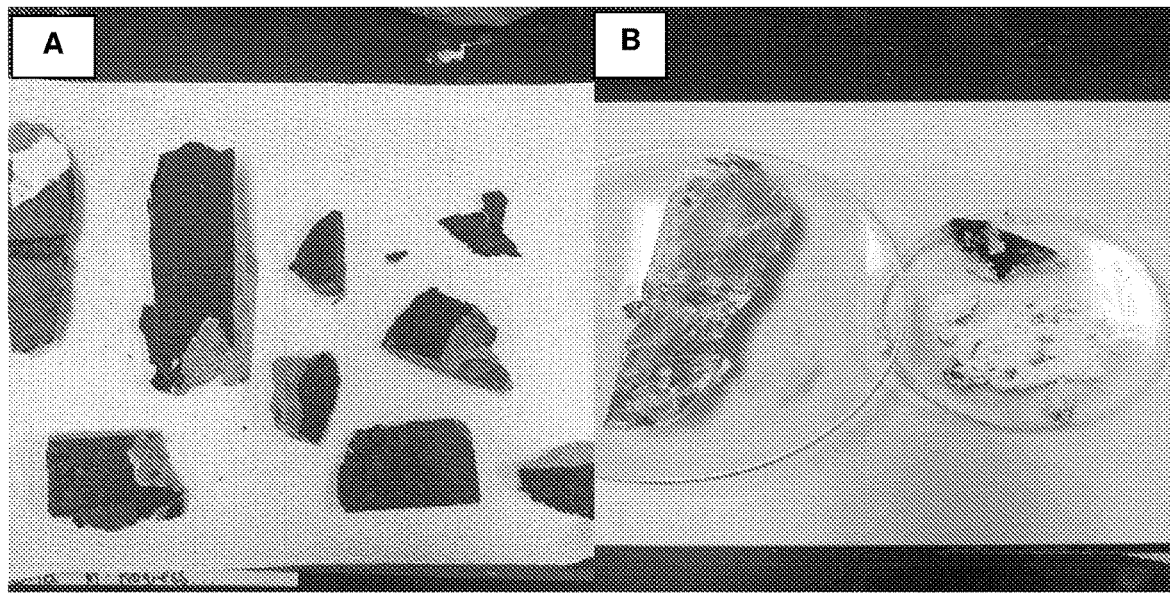
FIG. 47A-B
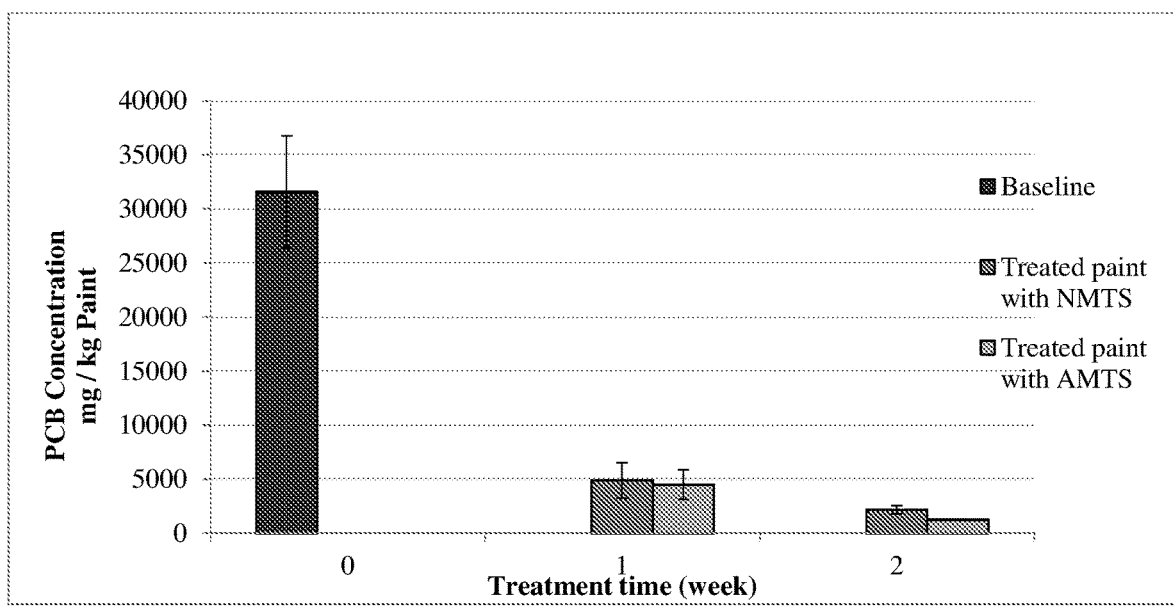
FIG. 48

FIGS. 49A-C

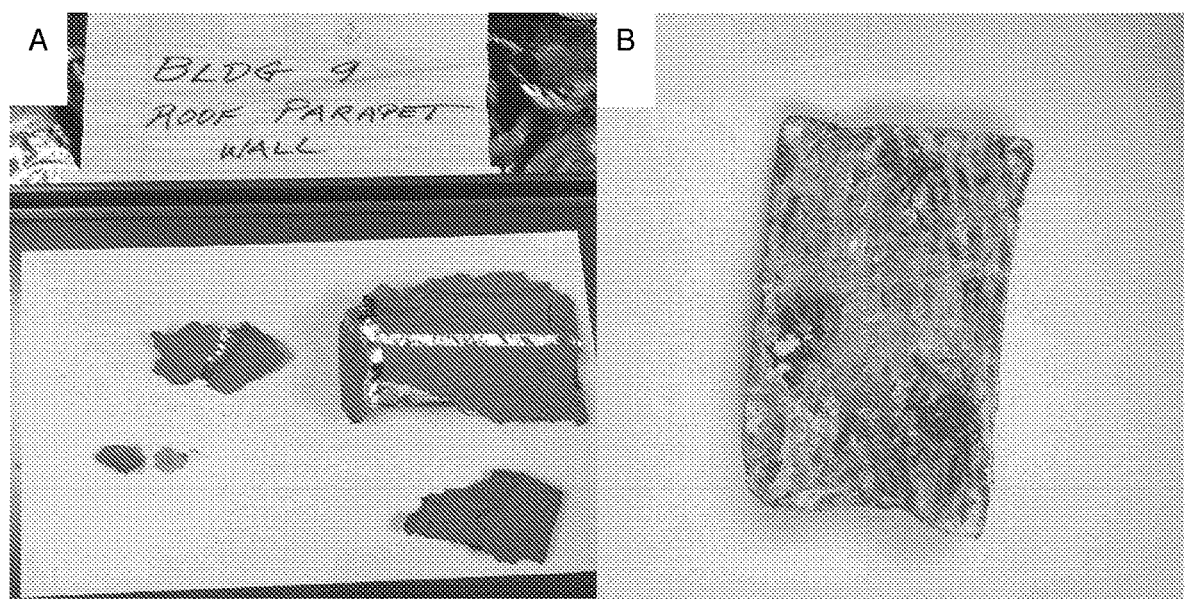
FIG. 68A-B

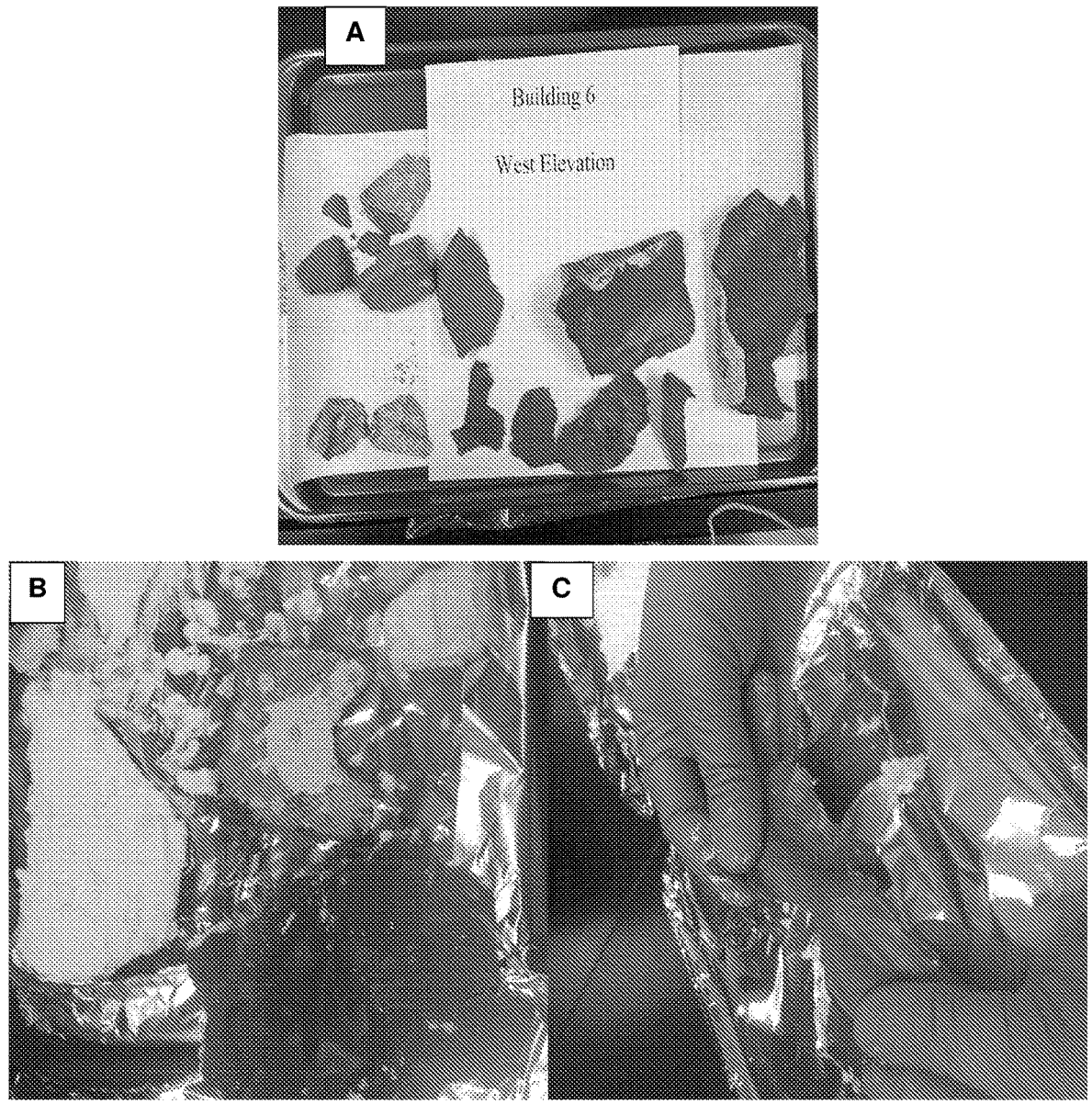
FIG. 69A-C

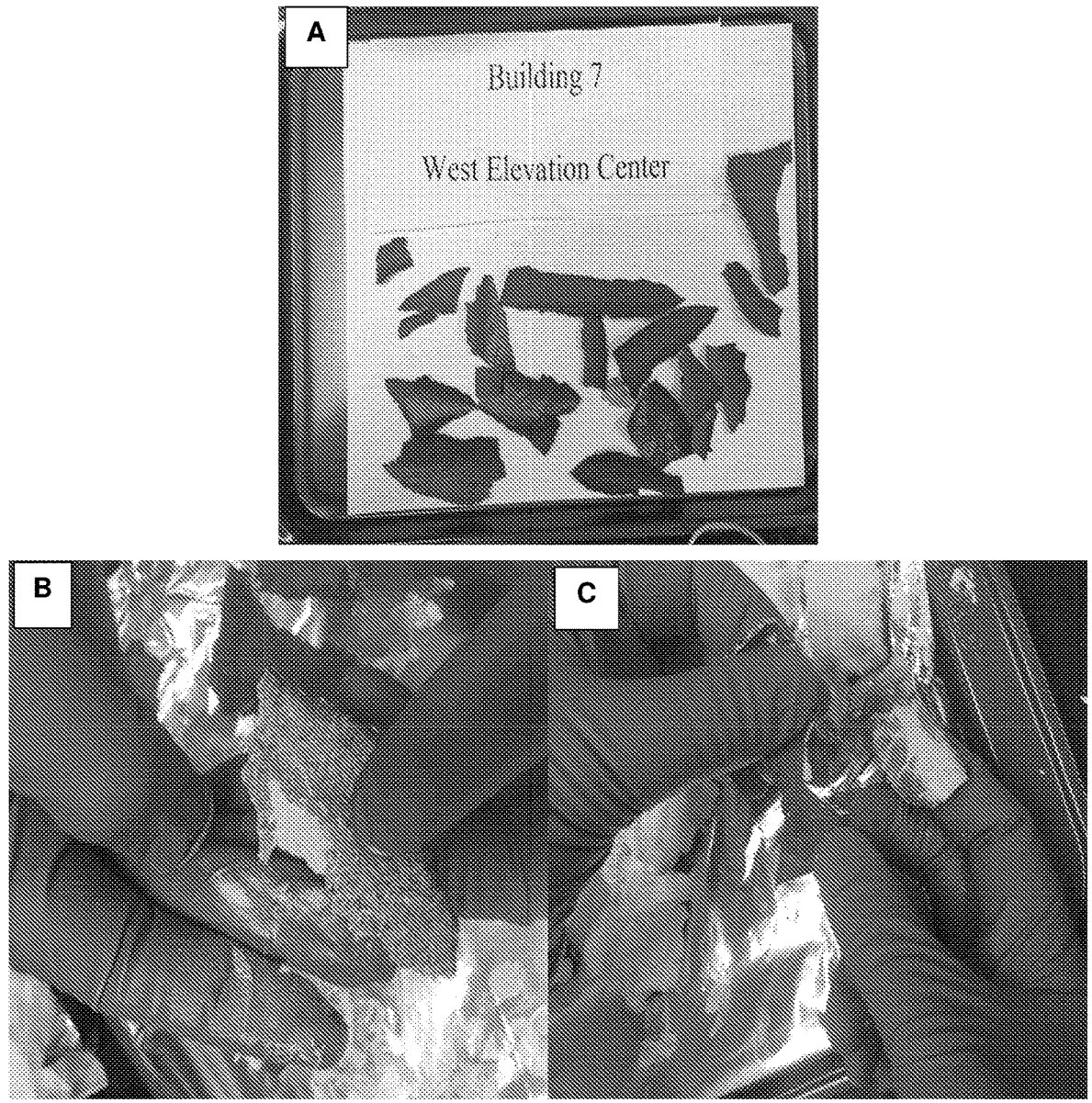
FIG. 70A-C

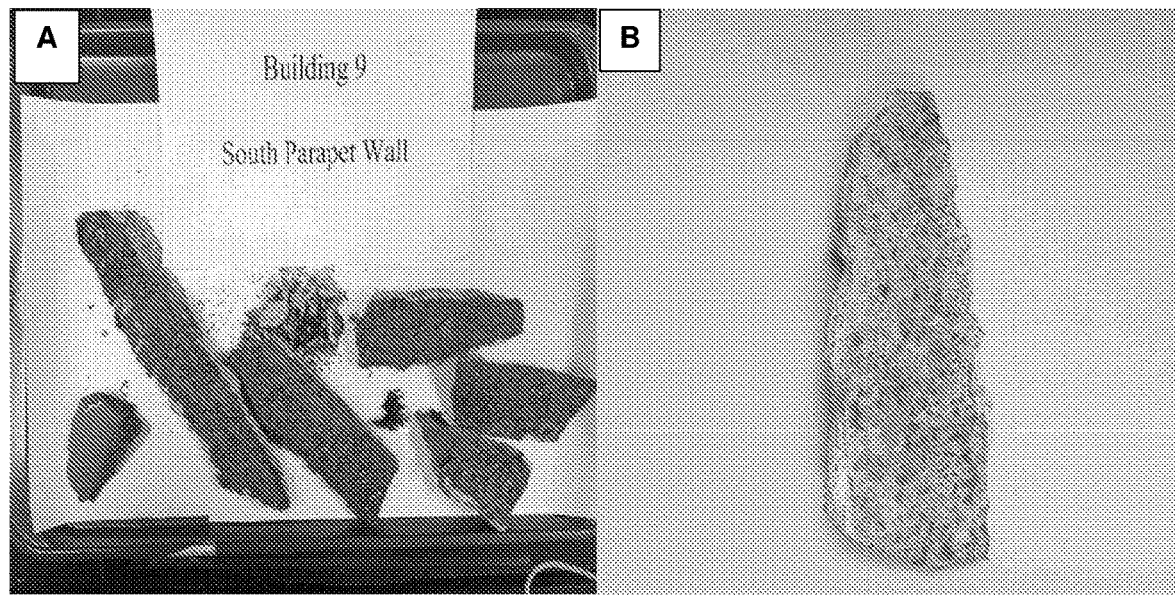
FIG. 71A-B
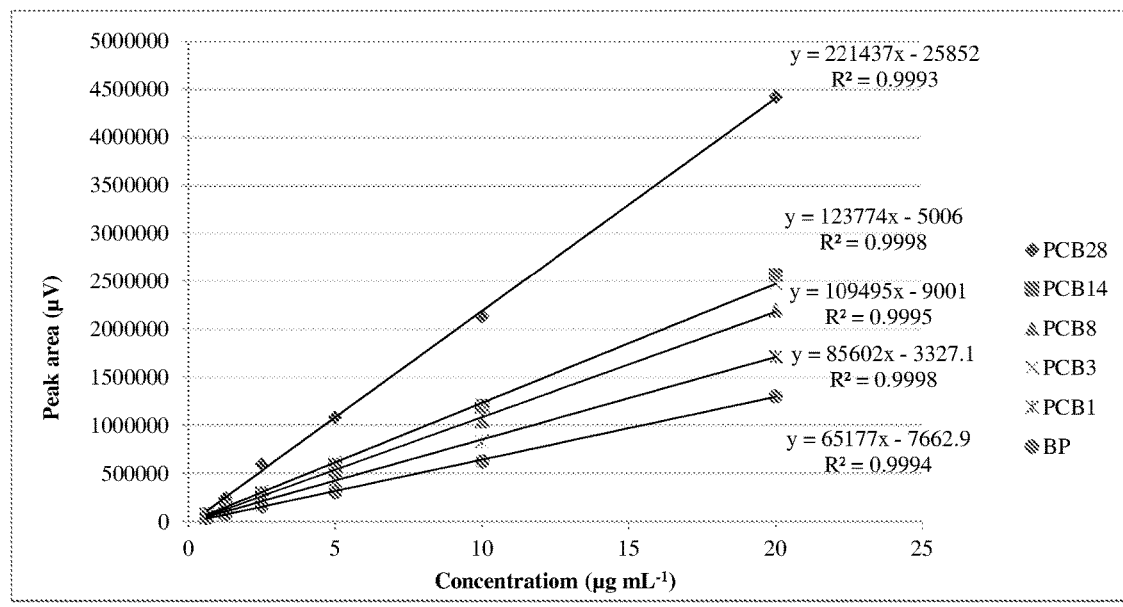
FIG. 72

IN SITU TREATMENT SYSTEMS FOR REMEDIATION OF POLYCHLORINATED BIPHENYL CONTAMINATED BUILDING MATERIALS

CROSS REFERENCE TO RELATED APPLICATION

This application claims the benefit of U.S. Provisional Patent Application No. 62/650,897, filed Mar. 30, 2018, titled IN SITU TREATMENT SYSTEMS FOR REMEDIATION OF POLYCHLORINATED BIPHENYL CONTAMINATED BUILDING MATERIALS, which is incorporated by reference herein in its entirety.

FIELD OF INVENTION

This disclosure relates generally to remediation of polychlorinated biphenyls (PCBs) and more specifically to compositions for remediation of PCBs.

BACKGROUND

The following acronyms and/or abbreviations are used throughout this disclosure:
AMTS Activated metal treatment system
ASTDR Agency for Toxic Substances and Disease Registry
AC Activated carbon
BTS Bimetallic treatment system
CERCLA Comprehensive environmental response, compensation and liability act
DFT Density functional theory
ECD Electron capture detector
EL Ethyl lactate
EtOH Ethanol
GC Gas chromatogram
IARC International agency for research on cancer
$K_{ow}$ Octanol-water partition coefficient
MS Mass spectrometry
NMTS Non-metal treatment system
PCB Polychlorinated biphenyl
PCDD Polychlorinated dibenzo-p-dioxin
PCDF Polychlorinated dibenzofuran
PTFE Polytetrafluroethylene
POP Persistent organic pollutant
SEM Scanning electron microscopy
TSCA Toxic Substances Control Act
USEPA United States Environmental Protection Agency
ZVM Zero-valent metal
ZVMg Zero-valent magnesium Overview of Polychlorinated Biphenyls Polychlorinated biphenyl (PCBs) refers to a family of synthetic organohalides which have been derived from biphenyl. Chlorine can be attached to the biphenyl ring in PCB resulting in a series of 209 possible PCB congeners in ten homologous groups[1]. Formula 1 shows the basic molecular structure indicating the traditional numbering of the chlorine positions[2]. Monsanto Industrial Chemicals Corporation (Madison, NJ, USA) manufactured and marketed most of the worldwide production in the form of nine technical grades under the generic trade name Aroclor®[3]. Although Aroclor® mixtures were well known and commonly used in industry, other competitors such as Kanechlors, Pyralene, and Clophen were also produced[3]. This family of materials were widely used on an industrial scale in a variety of commercial applications for nearly 50 years between 1929 and 1977[4].

Formula 1

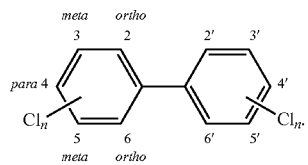

General structure for polychlorinated biphenyl

Arochlors exhibit nonflammable, electrical, and thermal insulating properties that make them valuable for use in closed or semi-closed systems. Various products such as dielectric fluids in capacitors, oil in transformers, and light ballasts were manufactured with PCBs as a key ingredient[4]. In addition to their use in closed applications, over 70 million kilograms of PCBs were sold in the U.S. from 1958 through 1971 for use as plasticizers in "opened" applications[5]. These include rubbers, carbonless copy paper, inks, textile coatings, as well as construction materials (e. g. caulk, adhesives, paints, floor finishes)[5].

Poly-Chlorinated Biphenyls (PCBs) are a family of synthetic organohalides comprising 209 congeners which were previously used as additives in paint. Building materials containing PCB contaminated materials are of major concern since they are a key point source. Even though production of PCBs in the USA has been banned since the late 1970s, their former prevalence and widespread use means many structures are still coated with PCB-laden paints. This contaminated paint can be transferred to soil and water due to renovations and weather conditions leading to increased concentrations[24,33]. Once PCB's enter soil and water ways, removal of these compounds can be difficult and expensive, so removal before these phases progress and enter the environment is beneficial.

The physical and chemical properties of PCBs made them adaptable for using in many construction materials such as caulk, adhesives, paints, and floor finishes[5]. Although no known natural sources for PCBs exist, their use in synthetic materials increases the mobility of PCBs in the environment allowing these chemicals to enter the environmental medial[10,24]. Though they have since been banned, their extensive use has resulted in transport of PCBs from the original primary sources to adjacent materials such as concrete structures[24-25].

Thermal oxidation of PCBs requires strict control of reaction conditions because it usually results in the formation of highly toxic compounds such as polychlorinated dibenzodioxins/dibenzofurans (PCDDs/PCDFs). The high energy associated with this technique makes it prohibitively expensive. Therefore, the development of safe and cost-effective remediation techniques is considered a major challenge.

Many PCB-contaminated sites contain large structures which require demolition and transportation, an expensive method, if not performed correctly, can further contaminate the environment. There are other methods of removal such as incineration of PCB-contaminated material and sandblasting, but they both pose negative results. Incineration of these materials can produce toxic compounds such as dibenzodioxins and dibenzofurans, which can get into soil, and waterways[36]. Dust that is produced by sandblasting can also result in transportation via air currents and hosts[26]. This causes an urgent need for development of a cost-effective method to extract and degrade PCBs from contaminated surfaces.

Although these PCBs have not been used in decades due to restricted regulation, their former prevalence and widespread use means many structures still have PCB-containing materials. Among these materials, PCB-laden paints are considered the most important source for PCBs in the environment due its large surface area and potential to spread to other areas through runoff pose a serious threat to the environment and human health[24]. Therefore, the removal of PCBs from contaminated paint is advantageous before environmental contamination can commence.

PCBs in Environmental Media

Before the banning of PCBs in 1977, more than 1.5 million tons of PCBs were produced worldwide of which a significant fraction of PCBs has continue to leach into the environment[6-7]. Hazardous waste incineration and vaporization of PCBs from contaminated products are possible sources of PCB emissions to air. Treatment of PCBs, improper waste disposal, accidental spills during handling or transport and leaks from PCB-containing products are additional sources for contamination to environmental matrices. Another continuing source of contamination is recycling PCB laden materials (e.g., plastics, paper, glass) which can keep PCBs in circulation for many years[7].

Once released into the environment, PCBs do not readily break down under normal environmental condition and therefore may remain for very long periods of time. The lighter PCB congeners (those with four or less chlorine atoms) can be carried out by water or air for long distances and deposited in areas miles away from the sources of the contamination. Congeners with higher chlorine contents (and lower aqueous solubility and vapor pressure) are more likely to adsorb to organic matter in soils and sediments. As a consequence, PCBs has been detected in almost every compartment in the environment including air, water, snow, soil, and sediments by various remote and bustling countries all over the globe[6-10]. Because the lipophilicity of PCB in nature, they prone to bioaccumulate in organism cells and passed up to food chain. Borja et al[11] has reported that PCBs can accumulate in fish and marine mammals which results in levels that may be higher than that in water. Most countries have currently ban PCBs resulting in reduction of its levels in the environment and food chain, however, there are other countries that still continue to use it[7]. If that is the case, PCB-containing products from those countries continue to be a source of PCB in the environment.

Toxicity and Environmental Impacts

The toxicity of PCBs is still subject to debate because the commercial PCB products generally occur as mixtures of congeners that vary in their toxicity. They also contained small amounts of highly toxic materials such as the polychlorinated dibenzodioxins/dibenzofurans (PCDDs/PCDFs)[12]. Toxicity testing has been done using higher-dosages on animals in a laboratory setting; humans are not necessarily exposed to the same concentrations. Toxicological studies using pure PCB congeners[13] and Epidemiological studies[14] have also been addressed as confounding factors in terms of PCB toxicity. There remains some division in expert opinion as to what would be considered safe levels of PCB concentrations.

It is known that the toxicity of PCBs is congener specific and it increases with increase the degree of chlorination. The long biological half-lives of higher chlorinated congeners in the body and their level in the blood reflect cumulative exposure over time. Though less chlorinated PCBs have a greater chance of metabolic and excretion within the body it does not necessarily indicate less concern for toxicity, because there is increasing evidence that the hydroxylated metabolites are toxic[12]. Non-ortho-substituted and mono-ortho-substituted congeners that have at least four chlorine atoms are classified as 'dioxin-like' and they may express similar toxicologic effects[12].

The health effect of PCBs was not reported until they have been detected in human blood in 1964, although the occupational toxicity of PCBs has been documented since the 1930s[11]. There have been studies that have correlated human PCB exposure with a variety of adverse effects, including skin lesions, changes in the immune system, causing irregular ocular effects, developmental and neurological effects in infants[15]. The results of toxicological studies have implicated the less chlorinated PCBs in immunotoxic, neurotoxic, as well as endocrine effects. According to United States Environmental Protection Agency (U.S. EPA) and International Agency for Research on Cancer (IARC), all PCBs congeners are categorized as probable human carcinogens such as skin and liver cancer based largely on animal and epidemiologic studies[14]. Recent studies have also been linked to PCB concentrations in adipose tissue and non-Hodgkin's lymphoma[16].

In addition to human effects, wildlife that has been exposed to PCBs has also exhibited changes in their biochemical composition and fluctuation in population-levels. It has been documented that PCBs could be responsible for the decreased fertility in some aquatic species. There are indications that PCB have negative adverse effect on phytoplankton populations impacting the oceanic food chain, oxygen production, and carbon dioxide mitigation[11].

PCBs Regulations

Concerns about the environmental persistence of PCBs and their possible health effects resulted in the banned of open and closed applications of PCBs. PCB manufacture and importation were banned in many countries such as Sweden and Japan. By the mid-to-late 1970s, the Toxic Substance Control Act (TSCA) promulgated stringent regulations (which are codified under 40 CFR Part 761) governing the manufacture, importation, use and disposal of PCBs in the United States[17]. These regulations define authorized uses, allowable limits, and disposal practices for PCBs. In May of 1979, the U.S. EPA enacted an outright ban on domestic PCB manufacture[18].

In consideration the bioaccumulative, continued presence, and the mobility of PCBs in the environment, makes it one of the most environmentally impactful materials addressed under the first Stockholm Convention on Persistent Organic Pollutants (POPs)[19]. PCBs are known to be a probable human carcinogen and have been selected as one of the top ten of high priority pollutants by U.S. EPA. In addition, PCBs are included in the 2007 CERCLA (Comprehensive Environmental Response, Compensation, and Liability Act) Priority List of Hazardous Substances.

PCB Contaminated Concrete

PCB contamination of concrete has been documented especially in industrial facilities where PCB-bearing organic liquids were employed, and leaks or spills occurred over time[66]. The organic liquid has ability to penetrate the concrete below the surface to different levels based on the amount of liquid spilled, the time of contact, and the ability of the liquid to wet the concrete[25].

The transport of organic liquid in concrete is influenced by the viscosity of liquid, and capillary forces[67]. Viscous is the dominant forces when the organic liquid start spilling, however, once the organic liquid spreads these forces decrease. Another factor affecting the movement of the liquids is capillary forces, which is a responsible for the entrapment of the organic liquid in the porous medium. Consequently, any compound exists in the organic liquids can be strongly adsorbed and entrapped in the pores of concrete[68]. PCBs entrapped in the pores of concrete can be made available at the concrete surface either by volatilization, or transport with the liquid if a new spill occurs.

PCB-contaminated concrete has become a primary concern for the environment due to PCBs' toxicity and carcinogenic nature. While necessary to protect the environment and health of building occupants, remediation of the contaminated concrete is an expensive and difficult process. Current methods of handling PCB contamination concrete include physical removal of concrete and disposal them as hazardous waste[69], concrete encapsulation, and chemical cleaning, each of which come with unique challenges. Mechanically removing concrete from structures by sandblasting, shot blasting, scabbling and scarification often result in the generation of large quantities of additional waste, and control of dust to prevent cross-contamination is extremely difficult which can spread PCBs to surrounding areas[70]. Disposing of large structures is expensive considering licensed landfill costs are often based on the amount of contaminated material. Encapsulated concrete with one or more layers of epoxy coatings can be ineffective and more complicated due to cracks and expansion joint. In addition, the chemical cleaning techniques achieved PCB removal only from the first inch of concrete and leach-back of PCBs occurred within days after cleaning for all samples due to bleed-back of PCBs[25]. Therefore, development of a cost-effective technology capable of PCB decontamination from concrete materials is of great interest.

Previous studies from this research laboratory resulted in the formulation of a nonmetal treatment system (NMTS) to be applied to porous material surfaces and sealed to minimize evaporation. Acidified ethanol is used as a solvent for the remediation of PCBs in this technology, it can penetrate the concrete surfaces and enter the pore space within concrete to desorb the PCBs into NMTS paste. Combining the NMTS from concrete treatment with zero-valent magnesium (ZVMg) successfully degraded the extracted PCBs[48].

Potential Sources of PCB Exposure in Buildings

A wide range of public and commercial buildings that have been constructed between 1958 and 1971 have a greater chance of containing PCB-laden materials[20]. High concentrations of PCBs are still found in school buildings erected or renovated in this period throughout U.S[21-22]. Various construction products have been manufactured with PCBs include caulk, adhesives, and paints providing a primary source of PCBs in buildings[4]. The caulking materials were the most frequently reported to contain high concentration of PCBs, in some cases in levels of hundreds of thousands of parts per million (ppm)[22]. Paint and adhesives such as floor tile mastic were also reported to be enriched in PCBs, so they may constitute major sources of PCBs in building[15, 23-24].

PCBs released from primary sources can accumulate in porous building materials over time such as concrete and brick, creating secondary sources of PCB contamination in a building[25]. These porous materials can absorb PCBs when adjacent to caulk or other materials manufactured with elevated concentrations of PCBs[26]. Literature indicates that high concentration of PCBs up to 99,000 ppm have been detected in brick, concrete, and mortar[22].

Although the relatively low vapor pressure, PCB have emitted from contaminated building materials to indoor air, dust, soil and other human exposure media over the years[27-28]. Worldwide reports of PCB-containing building have demonstrated relationships between PCBs in sealants and levels in indoor air as well as in soil around the foundations of buildings containing these materials[27, 29-31]. Caulking material containing PCBs, which were used in building construction, have been found in soil up to a meter away from site exposure[20]. Settled dust within buildings has also been reported to contain PCBs due to the use of PCB-containing caulk[32]. PCB in indoor air can migrate and deposit on the adjacent surfaces such as concrete[25] and paint,[33] creating tertiary sources of PCB in buildings[34].

Remediation Methods for PCBs in Building Materials

Building materials contain PCB level exceeding or equal 50 ppm are subject to EPAs PCB regulations. Under these regulations, they are considered as an "unauthorized use" and must be remediated[18]. A great deal of effort has been spent in developing effective technologies to minimize the dangers of PCBs in construction materials. The remediation of PCBs in construction materials generally fall under two categories: mitigation and abatement. Both remediation methods are effective for complying regulatory standards for PCBs and for managing potential exposures to PCBs in building materials.

Mitigation Methods

The purpose of mitigation is to block pathways of PCB transport, limit release of PCBs inside buildings where people may be exposed. This is a temporary solution that allows continued use of the building until a permanent solution is put in place. Mitigation of PCBs is accomplished using four types of engineering controls: contact encapsulation, physical barriers, ventilation, and air cleaning. Contact encapsulation involves the use of certain types of tape, sealants, and epoxides to create a low-permeable film that will reduce PCB exposure. Another engineering control involves the installation of fences or interior walls to separate PCB contaminated material from other areas of a building. Ventilation with clean outdoor air would be ideal as an engineering control regarding the purification of indoor air to lowering the concentration of PCBs released from PCB-laden materials. However, due to the possible migration of these compounds this would be a practical constraint[22].

Abatement Methods

Abatement methods are generally classified as either physical removal of PCB sources or chemical treatment through chemical extraction or degradation of PCBs from the materials. Abatement techniques aim to provide permanent solution to PCBs in building materials. This can be done by removing the PCB source from building or by reducing the mass of PCBs in the materials below the EPA action limit of 50 ppm.

Physical removal, is often the remediation method of choice for the removal of PCB contaminated material such as caulking, porous substances, paint, and other bulk materials. This Involves the site removal, incineration and/or disposal in landfills of this hazardous material. Abrasive blasting techniques include sand, shot, bead, hydro and carbon dioxide blasting are physical removal methods commonly used to remove PCB-laden paint or layers of concrete$_{35}$. Many types of hand tools such as knife, scraper, ripping chisel, and bush hammer are generally employed to pry beads of caulk containing PCBs. Some of the potential issues of this technology are the rise of disposal cost, availability of appropriate transportation of materials to the landfill as well as the stress on landfills. Other considerations are disruption of the surrounding environment associated with using mechanical or hand tools[22], and formation of more toxic byproducts like PCDD/PCDFs if the combustion of PCB is not complete[36].

Various means of chemical extraction PCB from building materials were reported as follow-up step to source removal. For example, a commercial product CAPSUR® (water-based solvent with emulsifiers) has been tested to remove PCBs from vertical and horizontal concrete surfaces[37]. However, the production of waste streams and odor complaints are significant issues with the use of this product[38]. Bleed-back of PCBs after chemical cleaning of concrete can occur due to the oil in which the PCBs are dissolved and the porous structure of concrete. Extraction of PCBs from concrete continues to be evaluated and explored based on the concept of a "sacrificing sealant". In situ trials reported by Ljung (2002),[39] three sacrificing sealants filled 90 small holes from removed contaminated caulk. The results of "sacrificing sealant" showed that this method was not effective at extracting PCBs from the materials studies over an extended period. Devor et al.[41] showed that the PCB dechlorination rate and mechanism may depend on the type of protic solvent employed.

Material's abatement through chemical degradation has garnered significant attention in the in-situ remediation of PCBs without generating hazards waste. Dechlorination of PCB-containing materials has been reported using few commercial products such as AMSTAR[35]. Although these products have shown the ability to extract PCBs from bare metal surfaces, their effectiveness to remove the PCBs from building materials was poor. New chemical degradation method has been developed by researchers at the University of Central Florida (UCF) to extract and dechlorinate PCBs found in building structures. This remediation technology has been applied to the painted surfaces and porous materials as thick paste, covered by an overlying material for the duration of treatment[37]. The treatment paste is designed to dechlorinate the PCB using zero-valent magnesium (ZVMg).

Reductive Metal-Based Treatment System Pastes

In general, degradation of PCBs through using zero-valent metals (ZVMs) has been proven more difficult than chlorinated aliphatic due to the stability of the aromatic structure in PCB requiring non-ambient conditions to break it down[40]. Reactions involving palladized bimetal system, however, have shown a complete reductive dechlorination of PCBs at ambient conditions[41-42]. Using a ball mill grinder, large scale remediation of PCB is a possibility by producing a sufficient amount of bimetal to complete this project[43]. Ball-milled magnesium/palladium (Mg/Pd) have been incorporated with a water-in-solvent emulsion in order to remove PCBs from painted surfaces in the Department of Defense facilities[44]. This in situ remediation technique has been developed at UCF in conjunction with NASA, KSC, it is known as the Bimetallic Treatment System (BTS). In a two day period it can dechlorinate PCB concentrations up to 11,000 mg/kg.[44] However, bimetal emulsion was adopted to be applied as a paste on a vertical surface of structures at Marshall Space Flight Center that were to remain in place. A paste of BTS was formulated by adding bulking agents to the bimetallic particles. The BTS paste was field tested and was shown to be capable of up to 94% removal of PCBs at a pre-treatment concentration of 5131 mg/kg[40, 45].

Hence the use of such mechanical alloy result in high cost due to the Pd, efforts were made to reduce the cost of treatment by using ZVMg and acidified ethanol active ingredients used by Maloney et al[46]. Materials containing PCBs were treated with a paste known as an activated metal treatment system (AMTS). The resulting treatment paste extracted PCBs from the contaminated material into the treatment system paste, where they are dichlorinated by the reactive metallic particles (acid-activated Mg in AMTS, Mg/Pd in BTS). Reduction within the paste system will result in less highly chlorinated PCBs and/or non-chlorinated byproducts.

Non-metal treatment system (NMTS), is a third formulation of treatment paste, was developed by UCF's Industrial and Environmental Laboratory team, comprised all components of AMTS or BTS but with no reactive metallic particles. NMTS has been examined extensively for its PCB sorptive ability and the results show same removal efficiency as AMTS. By applying NMTS, however, PCBs dechlorination can be accomplished in two steps: preliminary extraction of PCBs into NMTS paste followed by adding active Mg particles to degrade the extracted PCBs. FIG. 1 shows a general diagram for the extraction and dechlorination of PCBs in one step and in two-step process using NMTS and AMTS. FIG. 1 shows schematic of remediation of PCBs contaminated building materials using NMTS and AMTS in A) One-step treatment, B) Two-step treatment.

Both NMTS and AMTS were successful in removing PCBs from painted surfaces in a tested field sites. However, NMTS was seen to be more effective at PCB extraction from the surface[47].

While the main focus at the beginning of application these techniques is the treatment of painted surfaces, the sorptive properties of NMTS have also led to the examination of porous surfaces such as concrete, granite and bricks[48]. For these kinds of materials, new formulation of NMTS using PowderSorb has been developed and tested by Legron-Rodriguez for the in situ remediation of PCBs. This treatment system was shown to remove PCBs from contaminated field samples of concrete, brick, and granite.

Reductive dechlorination, or reduction in number of chlorine atoms present, offers a promising in situ strategy for successful remediation of PCB. Replacing chlorines on the biphenyl with hydrogens converts PCBs to less chlorinated products, which is desirable since these low chlorinated compounds show decreased toxicity and are more susceptible to aerobic metabolism[60].

The use of zero-valent metals (ZVMs) is a chemical reduction that effectively offers in situ remediation of PCBs. Degradation by ZVMg is one of the most favorable techniques of PCB reduction due to magnesium's advantages compared to other ZVMs such as zinc and iron. This metal displays a thin oxide shell allowing access to the surface, as a result the dechlorination by Mg continues even after exposure to oxygen[41]. This is particularly advantageous in comparison to metals such as iron, which form a prohibitive oxide layer.

Previous studies conducted at the Industrial Environmental Laboratory at UCF have examined ball-milled ZVMg as well as ZVMg ball-milled with activated carbon (ZVMg/AC) or palladium (ZVMg/Pd) and their ability to dechlorinate different PCBs in the presence of acidified ethanol; good degradation of PCBs was achieved by all systems. These results were employed to create in situ remediation of PCB-impacted building materials. In order to overcome the limitations of this technique due to the evaporation of ethanol, a new system utilizing acidified 2-butoxyethanol was proposed to enhance the dechlorination of PCBs.

PCBs contamination has become a significant environmental concern due to its toxicity and proven harmful effects to humans and animals. These probable cancer-causing compounds were banned for any future production by the TSCA in 1979. However, PCB materials were applied to a large number of buildings built or renovated from the 1950s through 1970s. Studies have confirmed that these buildings still contain PCBs in such products as paint, wood floor finishes, and sealing materials and the PCB levels exceed limits on authorized uses established by US regulations[22]. Soil contamination adjacent to the building can also result from decay of PCB-containing construction materials. Furthermore, volatilization of PCBs into the air and as dust can spread the threat of PCB contamination amongst the building occupants.

Traditional remediation methods for building materials, such as landfill and high temperature incineration, can be cost-prohibitive, infeasible over large buildings, and produce highly toxic compounds associated with incomplete incineration. Thus, the development of in situ remediation methods has received great attention. Reductive dechlorination of PCBs to biodegradable and less toxic products has been an area of significant interest over the past 30 years.

BRIEF SUMMARY

Various embodiments relate to a treatment system capable of remediating a halogenated compound. The treatment system may optionally include a plurality of zero-valent metal particles. The treatment system may include a co-solvent. The co-solvent may include from about 85 to about 90 weight percent of a first organic hydrogen donating solvent. The first organic hydrogen donating solvent may optionally be acidified. According to various embodiments, the first organic hydrogen donating solvent may typically be acidified when the treatment system includes the plurality of zero-valent metal particles. The co-solvent may also include from about 5 to about 10 weight percent of a second organic hydrogen donating solvent.

Various embodiments relate to a treatment system capable of remediating a halogenated compound. The treatment system may optionally include a plurality of zero-valent metal particles. The treatment system may include an organic hydrogen donating solvent of the formula:

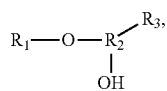

in which $R_1$ is a $C_1$ to $C_6$ hydrocarbon moiety, $R_2$ is a $C_1$ to $C_3$ hydrocarbon moiety, and $R_3$ is selected from hydrogen and a $C_1$ to $C_3$ hydrocarbon moiety. The organic hydrogen donating solvent may optionally acidified. According to various embodiments, the organic hydrogen donating solvent may typically be acidified when the treatment system includes the plurality of zero-valent metal particles.

Various embodiments relate to method of treating a material contaminated with at least one halogenated compound by applying the treatment systems according to various embodiments to the material. Such methods may include extracting the at least one halogenated compound and/or degrading the at least one halogenated compound.

BRIEF DESCRIPTION OF THE DRAWINGS

These and other features, aspects, and advantages of the present disclosure will become better understood with reference to the following description and appended claims, and accompanying drawings where:

FIG. 1A: shows extraction and dechlorination of PCBs from a vertical contaminated surface by NMTS or AMTS in one-step treatment;

FIG. 1B: shows extraction and dechlorination of PCBs from a vertical contaminated surface by NMTS or AMTS in two-step treatment;

FIG. 2: shows repeated runs of PCB reduction by 0.25 ball-milled ZVMg in acidified ethanol;

FIG. 15: shows building 6WE samples prepared for treatment;

FIG. 16A: shows a photo of treatment on paint surfaces with NMTS placed in the surface;

FIG. 16B: shows a photo of treatment on paint surfaces with AMTS placed in the surface;

FIG. 19: shows 6WE PCB level in treatment system at analysis time points;

FIG. 20A: shows samples prior to analysis associated with a removal of PCBs from painted surfaces of Old Seattle Brewery/Rainier Commons 4WE;

FIG. 20B: shows samples after one week of analysis shows paint elasticity after treatment associated with a removal of PCBs from painted surfaces of Old Seattle Brewery/Rainier Commons 4WE;

FIG. 25: shows 8NRP PCB levels at analysis time points;

FIG. 26A: shows samples prior analysis associated with a removal of PCBs from painted surfaces of Old Seattle Brewery/Rainier Commons 9SES;

FIG. 26B: shows samples after one week of treatment associated with a removal of PCBs from painted surfaces of Old Seattle Brewery/Rainier Commons 9SES;

FIG. 30B: shows brick sample after one week of analysis associated with a removal of PCBs from painted surfaces of Old Seattle Brewery/Rainier Commons 9NPW;

FIG. 30C: shows paint elasticity after treatment associated with a removal of PCBs from painted surfaces of Old Seattle Brewery/Rainier Commons 9NPW;

FIG. 31A: shows samples prior treatment associated with a removal of PCBs from painted surfaces of Old Seattle Brewery/Rainier Commons 9CPW;

FIG. 31B: shows a concrete sample after two weeks of treatment associated with a removal of PCBs from painted surfaces of Old Seattle Brewery/Rainier Commons 9CPW;

FIG. 32A: shows samples prior to analysis associated with a removal of paint/PCBs from painted surfaces of Old Seattle Brewery/Rainier Commons 7WES;

FIG. 32B: shows a sandstone sample after one week of analysis associated with a removal of paint/PCBs from painted surfaces of Old Seattle Brewery/Rainier Commons 7WES;

FIG. 32C: shows paint elasticity after treatment associated with a removal of paint/PCBs from painted surfaces of Old Seattle Brewery/Rainier Commons 7WES;

FIG. 47: shows 20 East Elevation samples A) Prior to treatment, B) After one-week treatment with NMTS;

FIG. 48: shows average of PCBs concentration in 20 east elevation paints over treatment time;

FIG. 68A: shows removal of paint/PCBs from painted surfaces of Old Seattle Brewery/Rainier Commons 9RPW samples prior to treatment;

FIG. 68B: shows removal of paint/PCBs from painted surfaces of Old Seattle Brewery/Rainier Commons 9RPW samples after treatment;

FIG. 69A: shows samples prior analysis, associated with a removal of PCBs from painted surfaces of Old Seattle Brewery/Rainier Commons 6WE;

FIG. 69B: shows samples after one week of analysis associated with a removal of PCBs from painted surfaces of Old Seattle Brewery/Rainier Commons 6WE;

FIG. 69C: shows paint elasticity after treatment associated with a removal of PCBs from painted surfaces of Old Seattle Brewery/Rainier Commons 6WE;

FIG. 70A: shows samples prior to analysis associated with a removal of PCBs from painted surfaces of Old Seattle Brewery/Rainier Commons 7WEC;

FIG. 70B: shows samples after one week of analysis associated with a removal of PCBs from painted surfaces of Old Seattle Brewery/Rainier Commons 7WEC;

FIG. 70C: shows paint elasticity after treatment associated with a removal of PCBs from painted surfaces of Old Seattle Brewery/Rainier Commons 7WEC;

FIG. 71A: shows samples prior treatment associated with a removal of PCBs from painted surfaces of Old Seattle Brewery/Rainier Commons 9SPW;

FIG. 71B: shows samples after two weeks of treatment associated with a removal of PCBs from painted surfaces of Old Seattle Brewery/Rainier Commons 9SPW; and FIG. 72: shows GC-MS peak area as a function of PCB 28 and its byproducts concentration.

Figure 3:
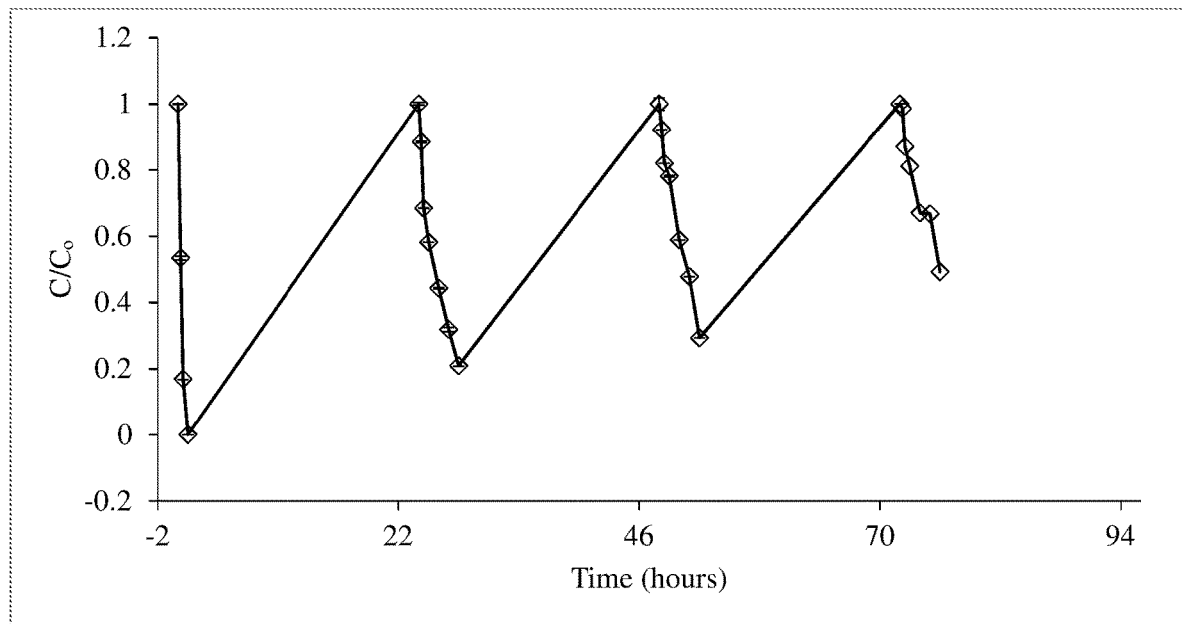
FIG. 3: shows repeated runs of PCB reduction by 0.25 ball-milled ZVMg in acidified ethanol/EL.

The various embodiments disclosed herein are not limited to the arrangements and instrumentalities exemplified by the figures.

DETAILED DESCRIPTION

The present disclosure may be understood more readily by reference to the following detailed description of preferred embodiments of the disclosure as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

As already discussed, buildings containing PCB-laden materials are causes of concern from the threat of contamination being spread amongst the building occupants. As opposed to PCBs in soil and sediments which are treatable by several remediation methods, PCB-contaminated paint and porous materials in buildings have limited remediation options. The overall objective of this research is to explore a novel in situ technique for the extraction and dechlorination of PCBs from a variety of building materials in non-destructive process.

Various embodiments describe two delivery systems for effective deployment of this treatment reaction to field samples: a Non-Metal Treatment System (NTMS) and an Activated Metal Treatment System (AMTS). Both systems are capable of extracting or extracting and degrading trapped PCBs within a variety of building materials.

The green solvent 2-butoxyethanol is approved by both the EPA and the FDA, and is an interesting alternative for the dechlorination of PCBs. Novel versions of NMTS and AMTS were developed by substituting 2-butoxyethanol for ethanol/EL and used on a set of paint chips and building materials from the same field site. PCBs were degraded significantly below their starting concentrations with removal efficiency greater than 99% for all samples after two weeks of treatment as measured by gas chromatography-mass spectrometry and gas chromatography with electron capture detector. The use of acidified 2-butoxyethanol and ZVMg permitted the extraction and degradation through reductive dehalogenation of halogenated compounds, such as PCBs, from contaminated building materials in a one-step treatment. A two-step treatment is also possible, wherein a non-metal treatment system and an optionally acidified solvent is employed. The two-step treatment extracts but may not degrade the halogenated compounds, such as PCBs, therefore, a second step may be included to degrade the halogenated compounds.

Additional studies were conducted on laboratory-prepared concrete where transport of the organic solvents (used in development of NMTS/AMTS) into the concrete structure was studied. PCB concentrations in concrete after treatment were reduced to below the limit of detection.

Previous studies from the University of Central Florida Environmental Chemistry Laboratory resulted in the formulation of a non-metal treatment system (NMTS) and an activated metal treatment system (AMTS) for PCB remediation. These technologies require acidified ethanol and d-limonene as solvents, with ZVMg in the AMTS. However, while NMTS and AMTS offer certain advantages in the treatment of PCBs, they are limited by rapid activity loss from solvent evaporation and are unable to fully extract and dehalogenate all PCBs present in field samples. Another limitation is that d-limonene lacks some physical properties that limit its applicability to remove contaminated paint completely from the surface. Various embodiments provide new formulations of NMTS and AMTS to address all previous limitations. The non-metal treatment systems according to various new embodiments may optionally include an acidified solvent by spiking the solvent with a very small quantity (approximately 0.1% by volume of solvent) of glacial acetic acid or other non-water containing acid, but the acidification of the solvent is not mandatory.

This disclosure describes new formulations of NMTS and AMTS using co-solvents ethanol/EL, while ZVMg over activated carbon was used as a reducing agent in the AMTS. The objectives of this work are to determine the effect of adding EL and AC on the reductive activity of ZVMg, to test the proposed NMTS and AMTS in the remediation of PCBs in laboratory-prepared paint, and to investigate the effectiveness of EL as a paint softener.

This disclosure also describes an extended laboratory study on the removal of PCBs from paint field samples. The effectiveness of NMTS and AMTS were tested on paint chips and building materials received from Old Rainier Brewery in Seattle. Various embodiments relate to solvent systems comprising EL, which may be used to remove the treated paint layers from different porous materials received from the same site, including concrete, brick, and sandstone.

Various embodiments employ the green solvent, 2-butoxyethanol was, a novel proton source for hydrodechlorination of PCBs. The feasibility of employing an optionally acidified 2-butoxyethanol in the presence of ZVMg ball-milled with and without AC to degrade PCBs in mild conditions has been extensively evaluated. Complete kinetic studies for high and low chlorinated PCBs were conducted. Degradation products were identified and degradation pathways are proposed for selected high and low chlorinated PCBs.

Various embodiments relate to a system combining optionally acidified 2-butoxyethanol with ZVMg/AC, which is a novel approach to the hydrodechlorination of PCBs. 2-Butoxyethanol was substituted for ethanol and a marked improvement was observed regarding the degradation of PCBs. It is known that 2-butoxyethanol has surfactant properties and has potential use in removing the paint from painted structures. Therefore, one main advantage anticipated by using this solvent as a substitute for EL in the formulation of NMTS and AMTS is as a paint softener. Various embodiments describe this novel delivery system which improves degradation options available for the remediation of PCB-laden painted structures. This disclosure tests the 2-butoxyethanol NMTS/AMTS in remediation of PCB-contaminated paint field samples, and compares the effectiveness of one-step and two-step processes for paint treatment by these techniques.

Finally, this disclosure evaluates the treatment of PCB-laden concrete using optionally acidified ethanol/EL NMTS/AMTS or optionally acidified 2-butoxyethanol NMTS/AMTS via direct contact. The feasibility of these solvent systems, which are used for NMTS and AMTS preparation, to sorb into the concrete structure was investigated.

Various embodiments relate to the use of a Non-Metal Treatment System (NMTS) to extract PCBs, as well as toan Activated Metal Treatment System (AMTS) to both extract and dechlorinate PCBs[40,49]. These technologies may utilize ethanol, 2-butoxyethanol, and d-limonene as solvents, with ZVMg in the AMTS. There are certain limitations encountered during the remediation of PCB-laden paint structures using NMTS and AMTS, such as rapid activity loss from the formation of oxide layers on the surface of Mg and the solvent loss. Building occupants, after treatment periods, still complain about the odor of d-limonene which serve as a paint softener in both systems.

Ethyl lactate (EL) exhibits valuable properties such as low toxicity, relatively high boiling point, good biodegradability, and high solvating power[50-51]. It also possesses desorption and degradation capabilities with the removals of polycyclic aromatic hydrocarbons from soils. Various embodiments, therefore, utilize EL for combined extraction via NMTS and AMTS.

Various embodiments provide new formulations of NMTS and AMTS. These formulations utilize a co-solvent system of acidified ethanol/EL; while ZVMg ball-milled activated carbon (AC) is used in the AMTS. By coating ZVMg with AC and using acidified ethanol/EL as a solvent, we gain some of the advantages on the reactivity of Mg toward PCB dechlorination. Both NMTS and AMTS formulations were tested in this work for the in-situ remediation of PCBs in laboratory-prepared paint. The ability of EL to soften the paint structure was evaluated. Substituting EL for d-limonene reduces the odor of treatment pastes significantly while still serving to soften the paint structure.

Various embodiments relate to a treatment system capable of remediating a halogenated compound. The treatment system may optionally include a plurality of zero-valent metal particles; and a co-solvent system.

The plurality of zero-valent metal particles may be present in an amount within a range having a lower limit and/or an upper limit. The range may include or exclude the lower limit and/or the upper limit. The lower limit and/or upper limit can be selected from about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90 percent by weight based on the total weight of the treatment system. For example, according to certain embodiments, the plurality of zero-valent metal particles may be present in an amount of from about 40 to about 80 percent by weight based on the total weight of the treatment system, or any combination of lower limits and upper limits described.

The co-solvent may be present in an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 percent by weight based on the total weight of the treatment system. For example, according to certain embodiments, the co-solvent may be present in an amount of from about 5 to about 15 percent by weight based on the total weight of the treatment system, or any combination of lower limits and upper limits described.

The co-solvent system may include an optionally acidified first organic hydrogen donating solvent. The first organic hydrogen donating solvent may be present in the co-solvent in an amount within a range having a lower limit and/or an upper limit. The range may include or exclude the lower limit and/or the upper limit. The lower limit and/or upper limit can be selected from about 75, 76, 77, 78, 79, 80, 81, 82, 83, 84, 85, 86, 87, 88, 89, 90, 91, 92, 93, 94, 95, 96, 97, 98, and 99 weight percent based on the total weight of the co-solvent. For example, according to certain embodiments, the first organic hydrogen donating solvent may be present in the co-solvent in an amount of from about 85 to about 90 weight percent based on the total weight of the co-solvent, or any combination of lower limits and upper limits described.

The co-solvent system may include a second organic hydrogen donating solvent. The second organic hydrogen donating solvent may be present in the co-solvent in an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, 20, 21, 22, 23, 24, and 25 weight percent based on the total weight of the co-solvent. For example, according to certain embodiments, the second organic hydrogen donating solvent may be present in the co-solvent in an amount of from about 5 to about 10 weight percent based on the total weight of the co-solvent, or any combination of lower limits and upper limits described.

The optionally acidified first organic hydrogen donating solvent may be ethanol, 2-butoxyethanol, t-butanol, n-propanol, 1,4 butadiol, ethylenediamine, ethylene glycol, 2,2 diphenylethanol, 2-piperidinethanol, 2-methoxyethanol, or any combination thereof. The optionally acidified first organic hydrogen donating solvent may be any proton donating solvent with capacity to soften paint and sorb into solid surfaces such as concrete or brick. The second organic hydrogen donating solvent may have the formula:

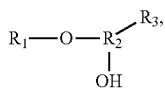

wherein $R_1$ may be a $C_1$ to $C_6$ hydrocarbon moiety,
wherein $R_2$ may be a $C_1$ to $C_3$ hydrocarbon moiety, and
wherein $R_3$ may be hydrogen or a $C_1$ to $C_3$ hydrocarbon moiety. For example, the second organic hydrogen donating solvent may be ethyl laurate.

When applied to a painted surface comprising one or more halogenated compounds, the treatment system may maintain a percentage of its efficiency at extracting the one or more halogenated compounds from the paint over an extended time period. The percentage may be within a range having a lower limit and/or an upper limit. The range may include or exclude the lower limit and/or the upper limit. The lower limit and/or upper limit can be selected from about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100%. For example, according to certain embodiments, the percentage may be more than about 50%, or any combination of lower limits and upper limits described. The extended time period may be within a range having a lower limit and/or an upper limit. The range may include or exclude the lower limit and/or the upper limit. The lower limit and/or upper limit can be selected from about 5, 10, 15, 20, 25, 30, 35, 40, 45, 50, 55, 60, 65, 70, 75, 80, 85, 90, 95, and 100 days. For example, according to certain embodiments, the extended time period may be about 30 days, or any combination of lower limits and upper limits described. For example, when applied to a painted surface comprising one or more halogenated compounds, the treatment system may maintain more than 50% of its efficiency at extracting the one or more halogenated compounds from the paint over a period of at least 30 days. The treatment system may further include activated carbon. The treatment system may further include a thickener. The plurality of zero-valent metal particles may or may not include a coating of a catalytic noble metal. The co-solvent may or may not comprise water. The zero-valent metal particles may be zero-valent magnesium particles.

Various embodiments relate to a treatment system capable of remediating a halogenated compound. Such treatment systems may optionally include a plurality of zero-valent metal particles; and an optionally acidified organic hydrogen donating solvent of the formula:

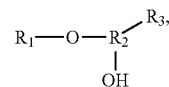

wherein $R_1$ may be a $C_1$ to $C_6$ hydrocarbon moiety,
wherein $R_2$ may be a $C_1$ to $C_3$ hydrocarbon moiety, and
wherein $R_3$ may be hydrogen or a $C_1$ to $C_3$ hydrocarbon moiety. For example, the optionally acidified organic hydrogen donating solvent may be ethanol or 2-butoxyethanol, or a combination thereof, which may optionally be acidified. The optionally acidified organic hydrogen donating solvent may be any proton donating solvent with capacity to soften paint and sorb into solid surfaces such as concrete or brick.

The plurality of zero-valent metal particles may be present in an amount within a range having a lower limit and/or an upper limit. The range may include or exclude the lower limit and/or the upper limit. The lower limit and/or upper limit can be selected from about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90 percent by weight based on the total weight of the treatment system. For example, according to certain embodiments, the plurality of zero-valent metal particles may be present in an amount of from about 40 to about 80 percent by weight based on the total weight of the treatment system, or any combination of lower limits and upper limits described.

The organic hydrogen donating solvent may be present in an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 percent by weight based on the total weight of the treatment system. For example, according to certain embodiments, the organic hydrogen donating solvent may be present in an amount of from about 5 to about 15 percent by weight based on the total weight of the treatment system, or any combination of lower limits and upper limits described.

According to various embodiments, the optionally acidified organic hydrogen donating solvent may have a boiling point greater than 100 degrees Celsius. The optionally acidified organic hydrogen donating solvent may have a boiling point within a range having a lower limit and/or an upper limit. The range may include or exclude the lower limit and/or the upper limit. The lower limit and/or upper limit can be selected from about 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, and 300 degrees Celsius. For example, according to certain embodiments, the optionally acidified organic hydrogen donating solvent may have a boiling point of from about 150 degrees Celsius to about 200 degrees Celsius, or any combination of lower limits and upper limits described. The treatment system may further include activated carbon. The treatment system may further include a thickener. The plurality of zero-valent metal particles may or may not include a coating of a catalytic noble metal. The co-solvent may or may not comprise water. The zero-valent metal particles may be zero-valent magnesium particles.

As discussed above, the treatment systems according to various embodiments may include the co-solvent system and/or the optionally acidified organic hydrogen donating solvent according to the specified formula. The treatment systems according to any of these embodiments may include additional components, such as a sorbent, calcium stearate, polyethylene glycol, glycerol, and an acid.

Calcium stearate and propylene glycol may function as stabilizers and thickeners, according to various embodiments. Calcium stearate may also function a bulking agent for the formulation, according to various embodiments. Glycerin may act as a thickener and may help to maintain a 'moist' surface after the treatment system is applied to a substrate. The acid may be an activator for the metal particles. Other stabilizers, thickeners, bulking agents, moisteners, and activators will be readily apparent to those of ordinary skill in the art and may be employed in any of the embodiments described herein.

The sorbent may be present in the treatment system an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, and 20 percent by weight based on the total weight of the treatment system. For example, according to certain embodiments, the sorbent may be present in the treatment system an amount of from about 4 to about 11 percent by weight based on the total weight of the treatment system, or any combination of lower limits and upper limits described.

The calcium stearate may be present in the treatment system an amount within a range having a lower limit and/or an upper limit. The range may include or exclude the lower limit and/or the upper limit. The lower limit and/or upper limit can be selected from about 5, 6, 7, 8, 9, 10, 11, 12, 13, 14, 15, 16, 17, 18, 19, 20, 21, 22, 23, 24, 25, 26, 27, 28, 29, and 30 percent by weight based on the total weight of the treatment system. For example, according to certain embodiments, the calcium stearate may be present in the treatment system an amount of from about 10 to about 20 percent by weight based on the total weight of the treatment system, or any combination of lower limits and upper limits described.

The polyethylene glycol may be present in the treatment system an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, and 20 percent by weight based on the total weight of the treatment system. For example, according to certain embodiments, the polyethylene glycol may be present in the treatment system an amount of from about 5 to about 10 percent by weight based on the total weight of the treatment system, or any combination of lower limits and upper limits described.

The glycerol may be present in the treatment system an amount within a range having a lower limit and/or an upper limit. The range may include or exclude the lower limit and/or the upper limit. The lower limit and/or upper limit can be selected from about 1, 2, 3, 4, 5, 6, 7, 8, 9, 10, 11, 12, 13, 14, 15, 16, 17, 18, 19, and 20 percent by weight based on the total weight of the treatment system. For example, according to certain embodiments, the glycerol may be present in the treatment system an amount of from about 5 to about 10 percent by weight based on the total weight of the treatment system, or any combination of lower limits and upper limits described.

The acid may be present in the treatment system an amount within a range having a lower limit and/or an upper limit. The range may include or exclude the lower limit and/or the upper limit. The lower limit and/or upper limit can be selected from about 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, and 0.25 percent by weight based on the total weight of the treatment system. For example, according to certain embodiments, the acid may be present in the treatment system an amount of from about 0.04 to about 0.08 percent by weight based on the total weight of the treatment system, or any combination of lower limits and upper limits described.

For example, according to various embodiments, the treatment system may include from about 4 to about 11 percent by weight sorbent; from about 10 to about 20 percent by weight calcium stearate; from about 5 to about 10 percent by weight polyethylene glycol; from about 40 to about 80 percent by weight of a solvent system; from about 5 to about 10 percent by weight of glycerol; from about 5 to about 15 percent by weight of zero-valent metal particles, such as magnesium; and from about 0.04 to about 0.08 percent by weight of an acid, where all weight percentages are based on the total weight of the treatment system. The solvent system may be the co-solvent system described according to various embodiments and/or the optionally acidified organic hydrogen donating solvent described according to various embodiments. More specifically, according to various embodiments, the solvent system may be the optionally acidified organic hydrogen donating solvent of the formula:

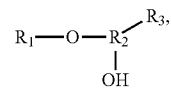

wherein $R_1$ may be a $C_1$ to $C_6$ hydrocarbon moiety, wherein $R_2$ may be a $C_1$ to $C_3$ hydrocarbon moiety, and wherein $R_3$ may be hydrogen or a $C_1$ to $C_3$ hydrocarbon moiety. Alternatively, according to various embodiments, the solvent system may be the co-solvent, already described that may include the optionally acidified first organic hydrogen donating solvent and the second organic hydrogen donating solvent.

Various embodiments relate to a method of extracting halogenated compounds from a substrate. Such methods may include applying a paste to the substrate, wherein the paste comprises an optionally acidified organic hydrogen donating solvent of the formula:

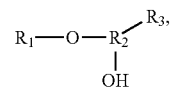

wherein $R_1$ may be a $C_1$ to $C_6$ hydrocarbon moiety,
wherein $R_2$ may be a $C_1$ to $C_3$ hydrocarbon moiety, and
wherein $R_3$ may be hydrogen or a $C_1$ to $C_3$ hydrocarbon moiety. For example, the optionally acidified organic hydrogen donating solvent may be ethanol, 2-butoxyethanol, t-butanol, n-propanol, 1,4 butadiol, ethylenediamine, ethylene glycol, 2,2 diphenylethanol, 2-piperidinethanol, 2-methoxyethanol, or any combination thereof. The optionally acidified first organic hydrogen donating solvent may be any proton donating solvent with capacity to soften paint and sorb into solid surfaces such as concrete or brick.

Other such methods may include applying a paste to the substrate, wherein the paste comprises a co-solvent system. The co-solvent system may include from about 85 to about 90 weight percent of an optionally acidified first organic hydrogen donating solvent, and from about 5 to about 10 weight percent of a second organic hydrogen donating solvent. The optionally acidified first organic hydrogen donating solvent may be ethanol, 2-butoxyethanol, t-butanol, n-propanol, 1,4 butadiol, ethylenediamine, ethylene glycol, 2,2 diphenylethanol, 2-piperidinethanol, 2-methoxyethanol, or any combination thereof. The second organic hydrogen donating solvent may have the formula:

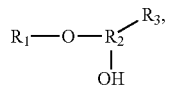

wherein $R_1$ may be a $C_1$ to $C_6$ hydrocarbon moiety,
wherein $R_2$ may be a $C_1$ to $C_3$ hydrocarbon moiety, and
wherein $R_3$ may be hydrogen or a $C_1$ to $C_3$ hydrocarbon moiety. For example, the second organic hydrogen donating solvent may be ethyl laurate.

According to various embodiments, a two-step process may optionally be employed. The two-step process may include applying a non-metal paste, removing the paste after treatment, and then treating the paste to degrade the extracted halogenated compounds, such as PCBs. the acid is not required. For example, a treatment system that does not include the optional plurality of zero-valent metal particles and in which the optionally acidified organic hydrogen donating solvent is not acidified may be employed. Such a treatment system may extract halogenated compounds, but may not degrade the halogenated compounds. After extracting the halogenated compounds, the treatment system may be removed from the material being treated, but the treatment system may still contain nondegraded halogenated compounds. The treatment system, may, therefore, be subjected to an optional additional treatment to degrade the halogenated compounds. The additional treatment may include exposing the treatment system to a plurality of zero-valent metal particles in the presence of an acidified hydrogen-donating solvent or any other suitable treatment. If left untreated, the treatment system containing nondegraded halogenated compounds may be disposed of according regulations and best-practices for handling materials contaminated with halogenated compounds. Treating or disposing of a such a treatment system is significantly less difficult, time-consuming, and expensive than other prior art options for treating or disposing of materials, such as building materials, that are contaminated with halogenated compounds, such as PCBs.

Various embodiments exclude offensive odor materials and maintain the paste structure without requiring a covering. The formulation of previous paste technologies may dry out within a period of hours without extensive effort and cost to cover and seal the paste. The pastes and systems according to various embodiments maintain an environment where PCBs can be 1) degraded within the paste or 2) the paste can be used to extract PCBs from the building materials, removed, and either treated with the active metal for degradation of PCBs, or sent for incineration or landfill.

Various embodiments eliminate the use of d-limonene as a paint softener and replace some or all of the ethanol solvent with 2-butoxyethanol or ethanol/ethyl lactate mixture. These changes make the paste increasingly useful in an industrial environment at prices that can be competitive to other remediation techniques. In addition to removing the contaminated coatings, formulations according to various embodiments consistently draw PCBs from the bulk of concrete materials as deep as six inches. Treatment may occur within the paste when Mg particles are included or after extraction when Mg particles may be added.

EXAMPLES

The following examples are put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments.

Example 1

Chemicals and Materials

PCB congeners in solid form were purchased from Accustandard (New Haven, CT), and used without further purification. Toluene (Optima®, 99.95%), concentrated sulfuric acid (Certified ACS Plus, 98.0%), potassium permanganate (Certified ACS, 99.5%), calcium stearate (powder, technical grade), polyethylene glycol (PEG) 8000 (Carbowax powder), and glycerol (laboratory grade) were obtained from Fisher Scientific (Pittsburgh, PA). Absolute ethanol (USP grade) was obtained from Pharmco-AAPER and used without any further purification. Glacial acetic acid (99.8% purity), ethyl L(-)-lactate (97%) and d-limonene (stabilized, 95% purity) were obtained from Acros Organics, (Morris Plains, NJ). Micro-scale magnesium (2-4 μm) was obtained from Heart Metals (Tamaqua, PA) and activated carbon (charcoal G-60) was obtained from Matheson Coleman & Bell (Gardena, CA). PowderSorb was obtained from Applied Science and Advanced Technologies (Baton Rouge, LA). An alternative to PowderSorb is a commercially available sorbent available from Kepler Absorbents. Generally, the sorbent may be a sodium polyacrylate. Alphagaz™ nitrogen and helium gases for use with GC-ECD were obtained from Air Liquide (Orlando, FL). Nylon filters (0.45 μm pore size) were obtained from Fisher Scientific (Pittsburgh, PA). Rust Stop Ednamel paint, tiles, glass canning jars and aluminum insulation vapor barrier were purchased commercially.

Preparation of Ball-Milled ZVMg and ZVMg/AC Bimetal

In order to regenerate the magnesium surface or to combine magnesium powder with AC, a mechanically ball-milling process that was developed at UCF was employed. The process of ball milling starts with mixing of the powders in the right proportion (85.0 g of ZVMg or 76.5 g ZVMg with 8.5 g of AC) into the galvanized steel canisters along with sixteen stainless steel ball bearing (1.6 cm³ diameter). The mechanical milling was done in an argon gas atmosphere using a twin arm paint shaker milling tool (Red Devil 5400) for 30 minutes. After each batch, the canisters were cleaned by shaking the ball bearings in ethanol for 15 minutes on the paint shaker and dried with acetone.

Dechlorination of PCB in Co-Solvent with Ball-Milled ZVMg and ZVMg/AC

Standard solution of PCB congener 153 (2,2',4,4',5,5'-Hexachloro-1,1'-biphenyl) was prepared by diluting the neat standard with absolute ethanol and EL (90:10). Batch experiments were conducted in 20 mL glass screw-top vials capped with polytetrafluoroethylene (PTFE) lined. These vials contain 0.25 g of ball-milled ZVMg or ZVMg/AC with 4.95 mL of 10 µg mL$^{-1}$ PCB solution. Dechlorination experiments were initiated by adding of 50 µL glacial acetic acid. The vials were then placed on a Lab Companion Series K-57013 Reciprocating Shaker table (speed 200 rpm) at 26° C. until the designed reaction time. Blank experiments without metal were carried out in parallel. All experiments were done in duplicate.

Respiking experiments were carried out to examine the reactivity of the ZVMg. Herein, three different systems were designed and compared. 5 mL of PCB 153 in ethanol solution was spiked in the first system containing 0.25 g ZVMg, no EL was added in this system. Same amount of PCB 153 in ethanol/EL (90:10) co-solvent were added to reaction vials containing 0.25 g of ZVMg in the first system, and vials containing 0.25 g of ZVMg/AC in the second system. Then 50 µL of glacial acetic acid was added to all vials to create active metal surfaces and initiate the dechlorination reactions. All systems were continually exposed to additional three sequential spiking of PCB 153 at 24 hours intervals without amending the amount of metal and the rate of reaction was determined for all sequential spiking.

pH Study

To understand the role of including EL and AC in the degradation reaction, the pH variations during the first 168 hours of reaction were studied. PCB degradation was conducted in non-aqueous systems. Measuring the pH in the reaction vials is difficult therefore, separate experiments were conducted to measure the pH during time of reaction. Ethanol solvent and ethanol/EL co-solvent (5 mL) were added to the reaction vials containing 0.25 g of ball-milled ZVMg while ethanol/ethyl lactate (5 mL) was added to the reaction vials containing 0.25 g of ball-milled ZVMg/AC. To all vials, 50 µL of glacial acetic acid was added to initiate the reaction. Using a pH meter (Accumet Research AR15), 1 mL of the reaction mixture, extracted at select times, and 10 mL's of distilled water were placed into clean vials and the pH was measured. The concentration of hydrogen ions was back-calculated to determine the pH in the non-aqueous solvents. Another version of this experiment was also conducted on ball-milled ZVMg with varying degrees of EL in the acidified ethanol/EL.

Preparation of the Treatment Systems

New formulations of the NMTS and AMTS were proposed in this study. These systems were formulated in the same way as wet-PowderSorb paste, except that ethanol/EL (90:10) was substituted in place of the ethanol and d-limonene. The weight percentage of NMTS components are listed in Table 1. An AMTS is prepared using one gram of ball-milled ZVMg/AC coated in glycerol (50:50 weight percentages). For every four grams of NMTS used, one gram of AMTS was added. Once combined, acidified ethanol/EL (10% glacial acetic acid (v/v)) was added in a 10% volume to mass ratio. This reaction mixture is very exothermic; therefore, heatproof gloves should be used when working with large quantities of the treatment system paste. Table 1 indicates NMTS components and their corresponding percentages by mass.

TABLE 1

| Reagent | Weight Percentages % |
|---|---|
| PowderSorb | 5.5 |
| Calcium Stearate | 11 |
| Polyethylene Glycol (PEG 8000) | 5.5 |
| Glycerol | 5.5 |
| Absolute Ethanol/EL (90:10) | 71.5 |
| Glacial Acetic Acid | 1 |

PCB Degradation in Laboratory Prepared Paint Through NMTS and AMTS

A 1 mL aliquot of 2500 µg/mL PCB congener 153 was combined with 0.046 kg of Rust Stop Enamel Paint. Six coats of paint were applied using a paint roller that was 7.5 cm wide to 10 tile surfaces in a 46 cm² area. There was a 24-hour time interval drying period in between each coat. Four tiles were treated with the NMTS and four tiles were treated with the AMTS by applying the treatment paste directly to the contaminated paint surfaces. Then all eight tiles were sealed with an aluminum vapor barrier and aluminum tape. Two tiles were left untreated as a control. All tiles were sampled in triplicate after one, three and seven days.

Sample Extraction and Cleanup

In order to extract PCBs from ethanol/EL co-solvent system or from ethanol, a liquid-liquid extraction was performed with equal volumes of toluene and water. The extract was then centrifuged at 3140-3300 rpm for 5 minutes for the ethanol-based samples, or 20 minutes for the samples containing EL. A second water wash was performed for the EL-based samples and the supernatants were collected for analysis.

Extraction of PCBs from treatment pastes and paint was determined based on the EPA Method 3550C (Ultrasonic Extraction)[52]. Portions of 1.0 g dried and crushed samples were weighed in 20 mL vials and then ultrasonically extracted into 10.0 mL toluene using a VWR Scientific Aquasonic Model 750D ultrasound bath. After 90 minutes, the samples were then transferred and centrifuged for five minutes to isolate the supernatant from the solution. Prior to analysis the extracted samples were sequentially treated with a one-to-one (v/v) sulfuric acid and one-to-one (v/v) aqueous potassium permanganate solution (5%) as per EPA Method 3665 (Sulfuric Acid/Permanganate Clean-Up)[53]. The treatment pastes were subjected to an extra sulfuric acid wash followed by a final wash with 5% sodium bicarbonate in water to destroy any possibly remaining acidity. The supernatants were collected and stored for analysis as described below.

Analysis

A Perkin-Elmer Clarus 580 gas chromatograph equipped with an electron capture detector (GC-ECD) and an Agilent Technologies 6850 GC/MS system were both used in the analysis of the extracted and cleaned samples of PCB. Both are equipped with a Restek RTX®-5 column (30 m×0.25 mm i. d., 0.25 µm film thickness). In the ECD, ultra-high purity nitrogen was used at a flow of 30 mL/min while helium acted as the carrier gas in both instruments with a constant flow of 1.3 mL/min. The injector port temperature was held at 275° C. while the detector was held at 325° C. using the GC-ECD. On the GC/MS, the injector temperature was held at 250° C., and the ion source temperature was 280° C.

PCB153 degradation was measured and confirmed via the correlation between the decrease in the starting material and the increase in its lower chlorinated congeners. The analytical method used for the measurement of PCBs was a modification of the EPA Method 8082A (Polychlorinated Biphenyls by Gas Chromatography)[54]. 2,2',3,3',4,4',5,5',6,6'-Decachlorobiphenyl (PCB 209) and 2,2',3,4,4',5,6'-Heptachlorobiphenyl (PCB 182) were used as internal standards for GC/ECD and GC/MS quantitation, respectively. A five-point calibration curve ($R^2 \geq 0.99$) was used to determine the unknown concentrations of single PCB congeners.

Results and Discussion

Activity of ZVMg in Different Treatment Systems

Figure 4:
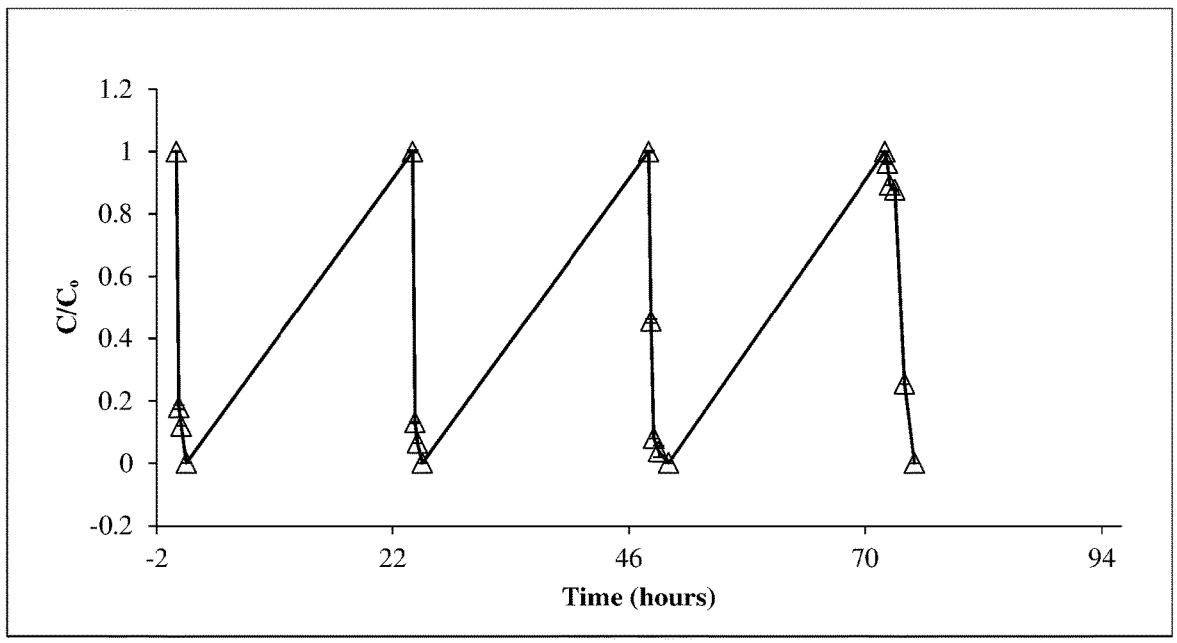
FIG. 4: shows repeated runs of PCB reduction by 0.25 ball-milled ZVMg/C in acidified ethanol/EL.
Figure 5:
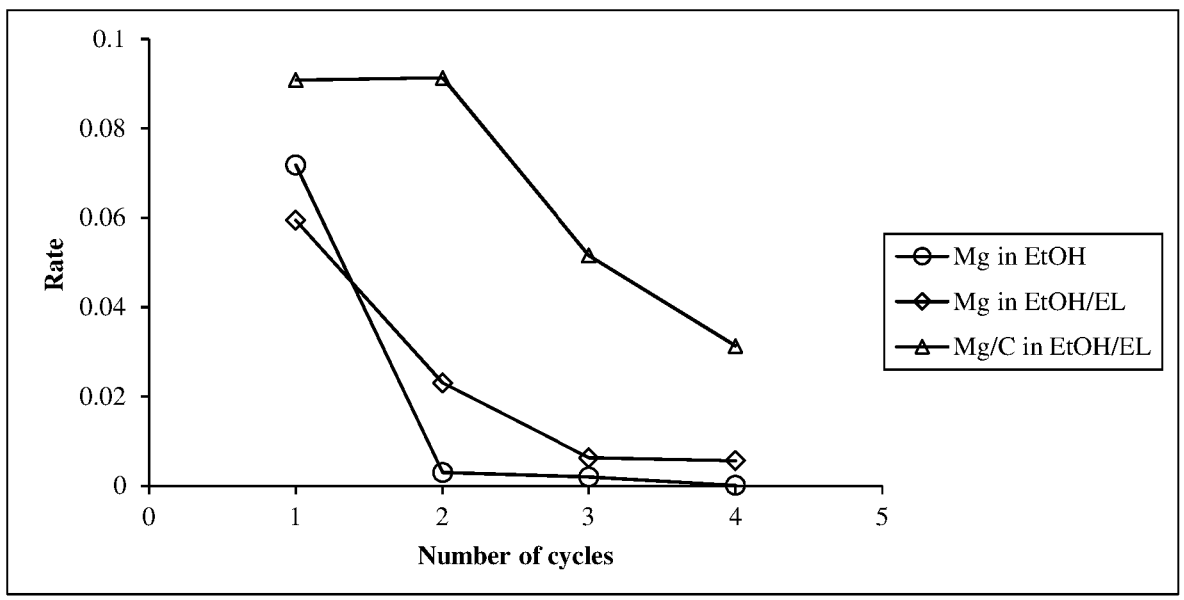
FIG. 5: shows rate constants as a function of sequential spike cycle of reduction PCB153 in different systems.

Studies were conducted to see if the incorporation of an EL into the reaction matrix would extend the activity of the reducing metal. These studies attempted to determine the effect of EL on the rate of PCB 153 degradation using ZVMg ball-milled with and without AC. Three different systems were proposed and the performance of metal in each system was evaluated by repeatedly spiking the medium with PCB 153 solution. FIG. 2, FIG. 3, and FIG. 4 shows PCB 153 treated with 0.25 mg of ZVMg in the presence of acidified ethanol in the first system, acidified ethanol/EL (90:10) in the second system, and with ZVMg over AC in the presence of acidified ethanol/EL (90:10) in the third system. The kinetics of PCB 153 reduction were fit to pseudo-first-order model for each of the four sequential re-spikes for all three systems. The values of $k_{obs}$ (the pseudo-first order apparent rate constant) were obtained in each cycle for all systems and the results are shown in FIG. 5.

FIG. 2 shows repeated runs of PCB reduction by 0.25 ball-milled ZVMg in acidified ethanol. FIG. 3 shows repeated runs of PCB reduction by 0.25 ball-milled ZVMg in acidified ethanol/EL. FIG. 4 shows repeated runs of PCB reduction by 0.25 ball-milled ZVMg/C in acidified ethanol/EL. FIG. 5 shows rate constants as a function of sequential spike cycle of reduction PCB153 in different systems.

As shown in FIG. 2, when using acidified ethanol as a solvent (system 1), ZVMg ceased after two cycles and no further degradation of PCB 153 was observed within the first four hours. When acidified ethanol/EL is used as a solvent in the second system, full PCB degradation had been reached by the end of cycle 1, however, starting from cycle 2, PCB degradation was not total but still observed even though the end of cycle 4 (FIG. 3). Complete PCB 153 degradation within four hours from spiking the selected congener over the four cycles was observed only with using ball-milled ZVMg/C in acidified ethanol/EL (FIG. 4).

The $k_{obs}$ values decreased for all systems with each re-spike. This is because the interactions between Mg and PCB is disrupted by the build-up of magnesium oxides/ethoxide within the solution. The $k_{obs}$ values does show an increasing trend in the order of system1<system 2<system3.

The Role of EL and AC

Looking at the experimental data, the combination of co-solvent ethanol/EL and AC both enhances the rate of PCBs dechlorination by ZVMg and keeps the system active. To understand the role of EL and AC on the activity of magnesium, the pH in the previous systems as well as in systems containing different percentages of EL were studied and compared. ZVMg, ball-milled with and without AC, was observed using a scanning electron microscope (SEM) with energy-dispersive X-ray spectroscopy (EDX). This was used before and after the dechlorination reaction in order to investigate the advantage of coating magnesium surface with AC.

Figure 6:
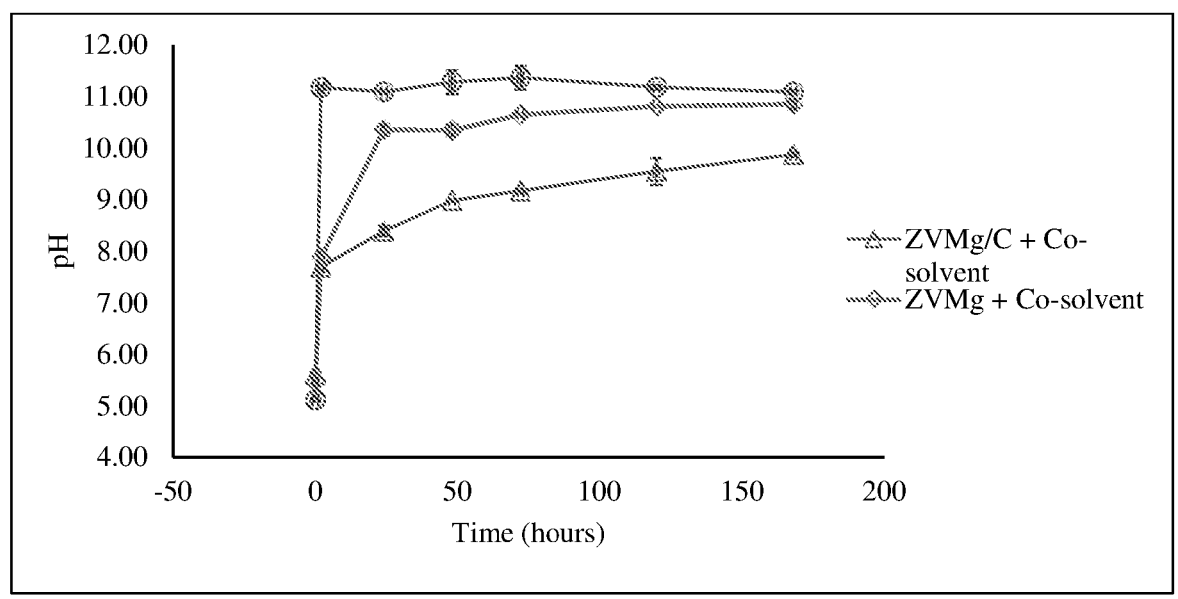
FIG. 6: shows pH of various systems over time.
Figure 7:
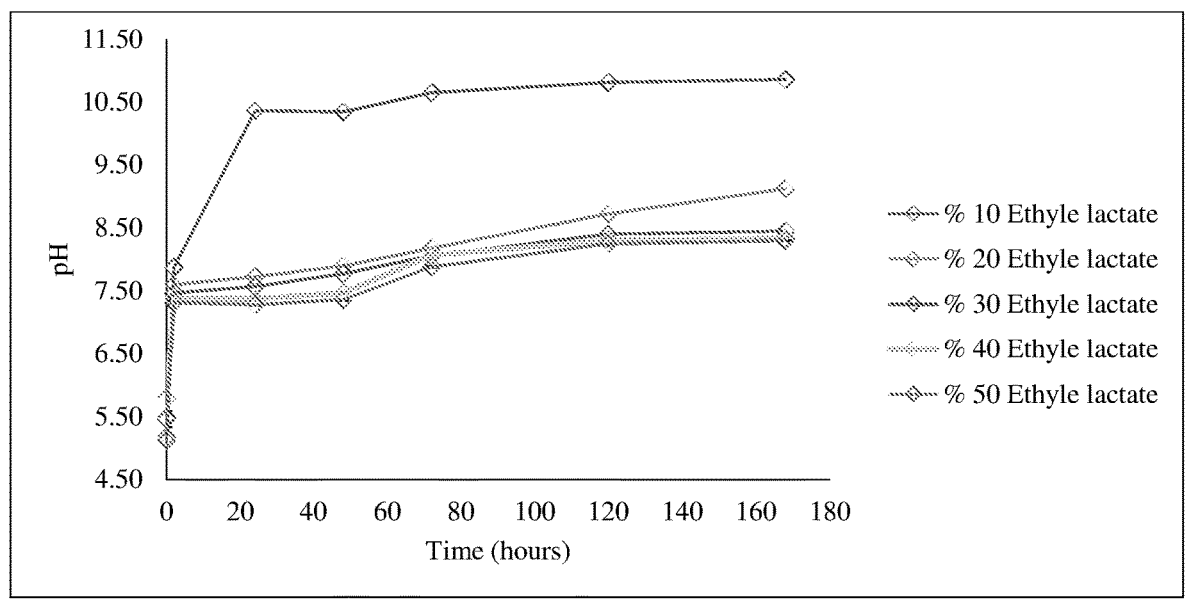
FIG. 7: shows pH of ball-milled ZVMg in acidified ethanol/EL system using various percentages of EL over time.

In the conducted studies, the pH of all systems was studied upon addition of the acetic acid to the systems. FIG. 6 shows that the basicity of all three solutions had increased due to the forming of magnesium oxides/ethoxides over time. However, the ZVMg/AC containing acidified ethanol/EL (90:10) stabilized the systems over an extended period. A neutralized pH solution has been shown to reduce the formation of MgO and $Mg(OH)_2$ and increases the adsorbance onto the active sites of the magnesium metal surface[55]. As illustrated in FIG. 7, the pH values decreased as EL percentage increased in the system. EL reduced the overall polarity of the solutions in our experiments which weak the affinity of the water molecules from air to magnesium surface and thus prevents formation of $Mg(OH)_2$ keeping the surface clean[56]. Although high percentage of EL maintains the pH less basic, increasing EL more than %10 in the PCB solution is not desirable because of difficulties in the extraction of PCBs.

Figure 8:
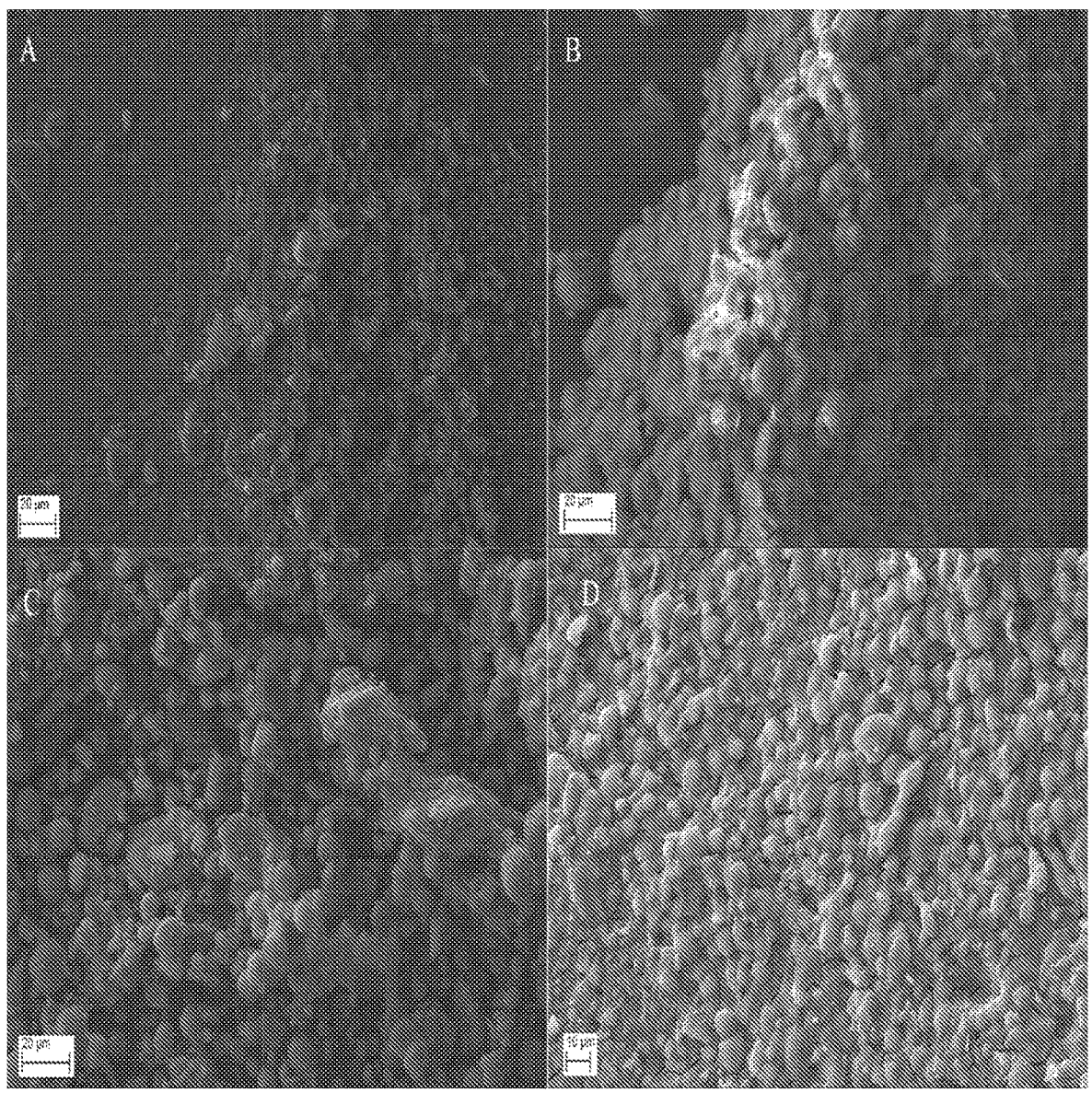
FIG. 8A: shows an SEM image of ball-milled ZVMg prior to reaction.
FIG. 8B: shows an SEM image of ball-milled ZVMg after 24 hours exposure to PCB 153 in ethanol/EL (90:10), which was sputtered with gold/palladium to compensate for charging.
FIG. 8C: shows an SEM image of ball-milled ZVMg/AC prior to reaction.
FIG. 8D: shows an SEM image of ball-milled ZVMg/AC after 24 hours exposure to PCB 153 in ethanol/EL (90:10), which was sputtered with gold/palladium to compensate for charging.

SEM was performed on samples of ball-milled magnesium particles with and without AC before and after their use in PCB dechlorination in acidified EtOH/EL (90:10) (FIG. 8). The results indicate that the abundance of oxygen and carbon relative to magnesium increase with exposure time due to the formation of passivating oxide/ethoxide layers on the magnesium surface. ZVMg without AC showed a greater abundance of oxygen and carbon comparing to ZVMg with AC. This can be a result of the layers of graphite offering the magnesium surface more protection. FIG. 8: SEM images of A) ball-milled ZVMg prior to reaction, B) ball-milled ZVMg after 24 hours exposure to PCB 153 in ethanol/EL (90:10), C) ball-milled ZVMg/AC prior to reaction, and D) ball-milled ZVMg/AC after 24 hours exposure to PCB 153 in ethanol/EL (90:10). Samples B and D were sputtered with gold/palladium to compensate for charging.

Degradation of PCB 153 by Ball-Milled ZVMg/AC

The sorption of many compounds including PCBs on the AC surface has been documented in many studies[57-55]. In the case of PCB, a planar adsorption onto the hexagonal AC surface is expected where the π cloud overlaps with the hexagonal carbons resulting in the chlorine substituents of the PCB lying inside the pores of the hexagonal structure. The adsorption effect is stronger in coplanar PCBs which exhibit torsion angle less than 90. The adsorption on AC may affect PCB degradation and analysis. They may present false depletion or unavailable at all for degradation if the PCBs were unable to be extracted completely or absorbed onto the carbon. Therefore, the mass balance during the dechlorination time of PCB 153 by ZVMg/AC was calculated to ensure complete extraction of PCBs from the AC surface and to understand the effect of AC on the dechlorination of PCB.

Figure 9:
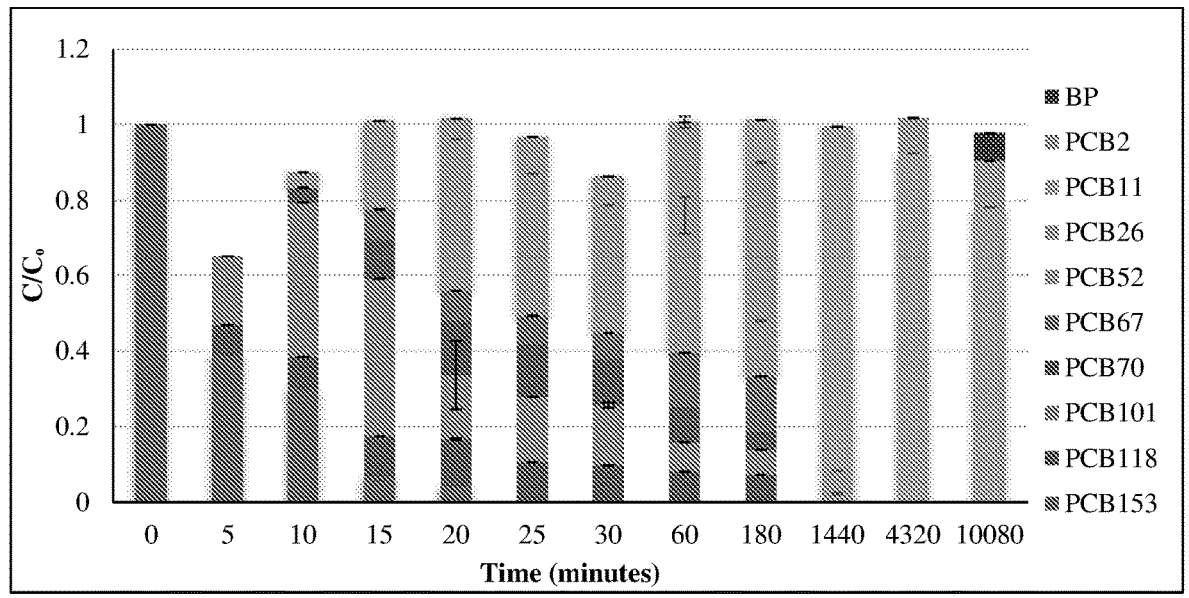
FIG. 9: shows dechlorination of PCB 153 under ball milled ZVMg over AC in acidified ethanol/EL (90:10)
Figure 10:
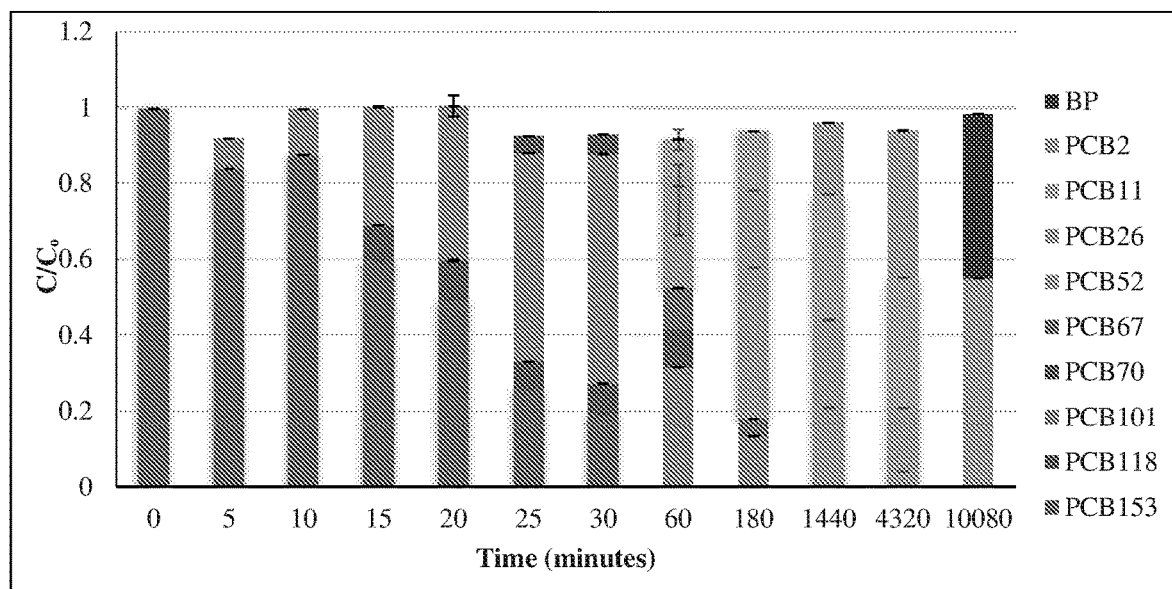
FIG. 10: shows dechlorination of PCB 153 under ball milled ZVMg in acidified ethanol/EL (90:10)

The byproducts produced in the dechlorination reaction by ZVMg/AC were confirmed by (GC-MS) and presented in FIG. 9. A rapid decrease in the concentration of original congener have been done within 20 minutes. During seven days of PCB 153 dechlorination, the appearance and disappearance of many byproducts were observed with carbon mass balance above 80%. However, complete degradation to biphenyl was not accomplished after one week of reaction. The low conversion to biphenyl indicates that AC inhibits removal of the last chlorines in 3,3'-dichlorobiphenyl (PCB11) and 3-chlorobiphenyl (PCB 2) with torsion angles 36. for both congeners, a phenomenon seen in similar study on degradation PCB 26 by ZVMg/AC[59]. Higher conversion to biphenyl (%40) was achieved with degradation of PCB 153 under ball-milled ZVMg without AC and this can prove the adsorption effect of AC on the degradation of low chlorinated biphenyl in presence of ethanol/EL (FIG. 10). FIG. 9 shows dechlorination of PCB 153 under ball milled ZVMg over AC in acidified ethanol/EL (90:10). FIG. 10 shows dechlorination of PCB 153 under ball milled ZVMg in acidified ethanol/EL (90:10).

Testing of a Novel NMTS and AMTS Pastes

According to the previous conducted studies, ball-milled ZVMg/AC in acidified ethanol/EL (90:10) was shown to hold degradation over an extended period. Thus, acidified ethanol/EL was utilized to generate the treatment system pastes, and ball-milled ZVMg/AC was used as an alternative to magnesium powder for the degradation of PCBs in AMTS.

NMTS paste was prepared using acidified ethanol/EL (90:10) as solvents according to the mixing guideline outlined in Table 1. Ball-milled ZVMg/AC coated in glycerol was added to NMTS along with additional amount of acidified solvents to activate the system to degrade PCBs. All the following studies utilize both systems to extract and/or degrade the selected congener standard before moving on to degrade Aroclors in field samples received from Seattle.

Longevity of AMTS

Figure 11A:
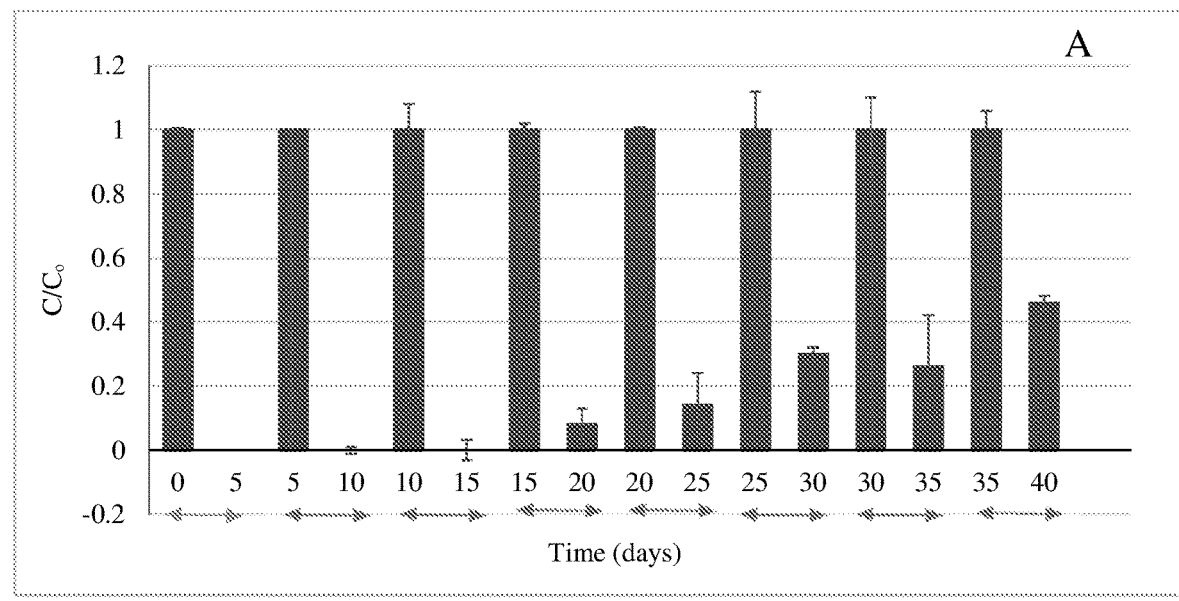
FIG. 11A: shows repeated runs of PCB 153 reduction by 10 g AMTS.
Figure 11B:
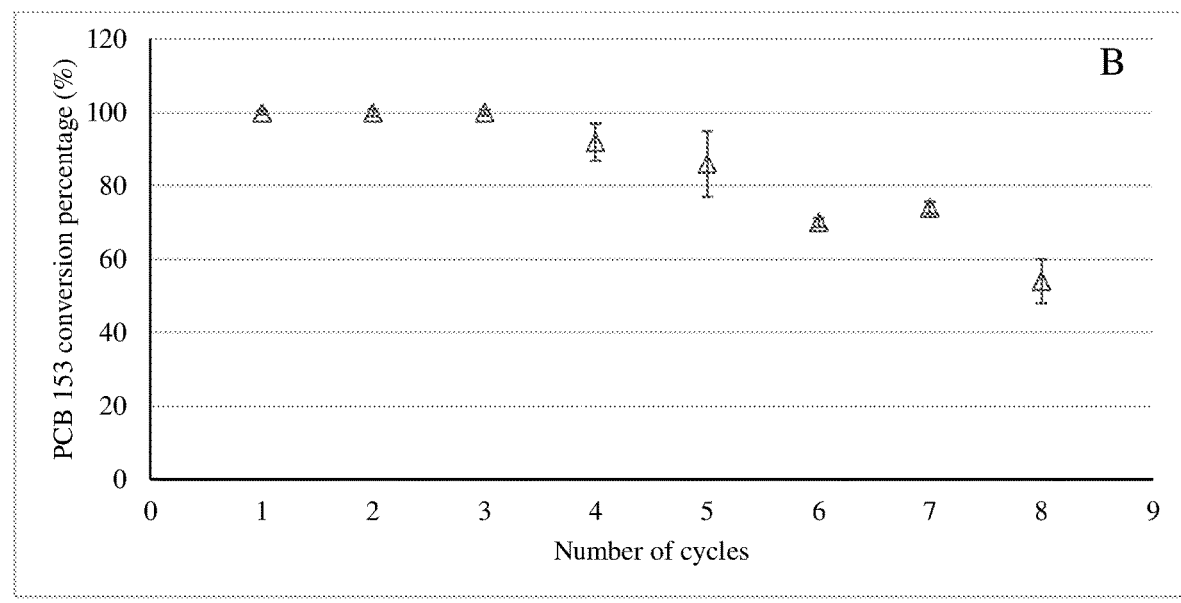
FIG. 11B: shows removal efficiency of AMTS over eight cycles.

Another experiment was carried out to evaluate the potential long-term performance of AMTS. This experiment consisted of repeatedly additions of 250 μl of a 50 μg/mL solution of the chosen PCB congener in ethanol/EL to AMTS paste for eight cycles in 40 days. To set up this experiment, 150 gm of AMTS were produced in which 10 gm of the paste were transferred to a canning glass jar with an airtight cap. To each jar 1 mL of PCB solution was added and stirred in thoroughly using the tip of a Pasteur pipet. The jars allowed to sit on the benchtop for 40 days. At the designed time of each cycle, two jars were sampled to analyze, and the others are expose to new cycle of PCB addition. Degradation of PCB 153 was confirmed by the characterization (GC-ECD) of the byproducts produced in the reaction. The results for the degradation of PCB 153 with the AMTS over eight cycles are presented in FIG. 11. AMTS showed high efficiency for PCB removal as it maintained more than %50 of its original activity even after eight cycles (FIG. 11B). Both AC and EL keep the ZVMg in the treatment system paste active for more than one month. FIG. 11A shows repeated runs of PCB 153 reduction by 10 g AMTS. FIG. 11B shows the removal efficiency of AMTS over eight cycles.

EL as a Paint Softener

Figure 12:
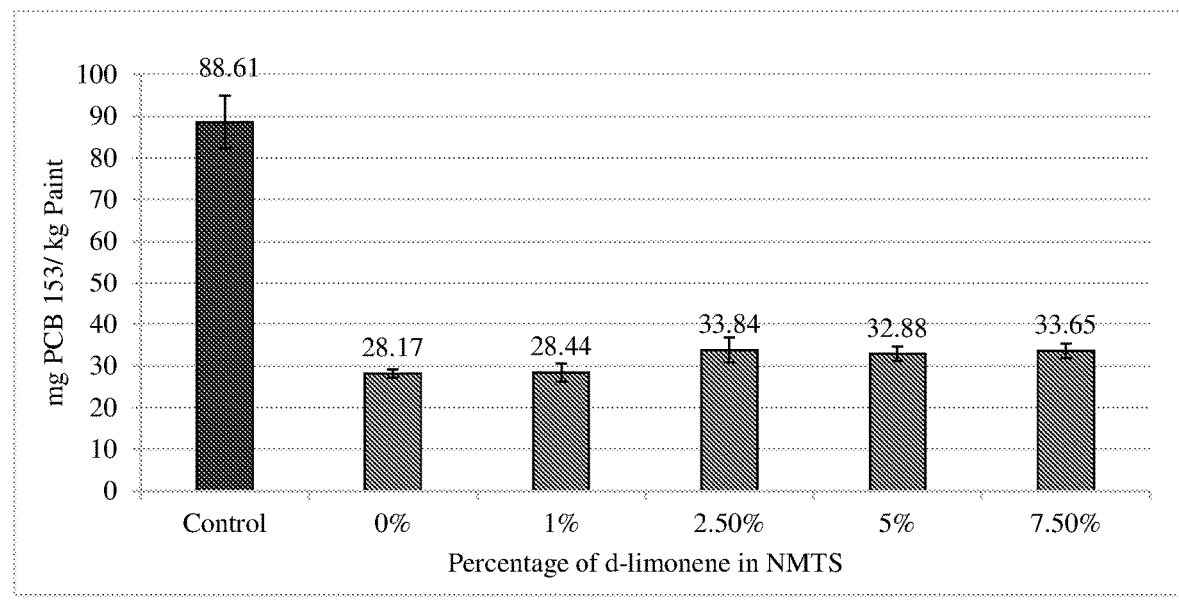
FIG. 12: shows concentrations of PCB 153 in paint after one-day of treatment at varying percentages of d-limonene in NMTS.
Figure 13:
FIG. 13: shows removal of paint from tile surface after treatment.

EL was chosen because it was assumed to be a suitable paint softener like d-limonene. Set of experiments were conducted to see if there is need to add d-limonene to the proposed formulation of treatment systems. To this end, five formulations of NMTS with varying percentage of d-limonene were formulated, the amount of d-limonene is displayed in the FIG. 12. A 25 cm² area of each version of NMTS was applied to the painted tile surface via direct contact to a thickness of 1.27 cm. The treated tiles were then sealed with aluminum foil. After one day of the initial application, NMTS was removed and the paint layers were easily removed from the tiles surfaces and were left to dry. The paint samples were cut into small pieces and then portions of 1.0 g were extracted in 10 mL toluene and subjected to a sulfuric acid and potassium permanganate cleanup. The treatment results by GC-ECD are graphically presented in FIG. 12, which shows concentrations of PCB 153 in paint after one-day of treatment at varying percentages of d-limonene in NMTS. The treatment pastes containing EL have been shown to soften and remove PCBs from painted tile in all NMTS formulations even without d-limonene. The EL within the paste allows the solvent to penetrate the paint layers resulting in all the layers coming off in one piece as shown in FIG. 13, which shows removal of paint from tile surface after treatment.

Tests for Remediation of PCB Spiking Laboratory-Painted Surface

Figure 14:
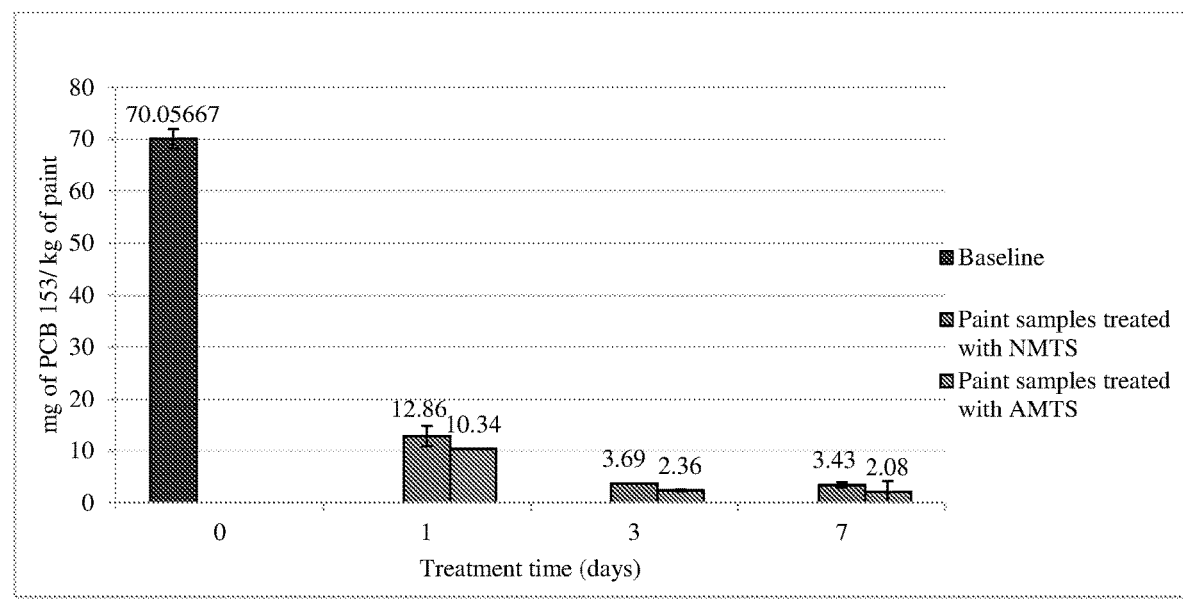
FIG. 14: shows concentrations of PCB 153 in paint over treatment time.

An analysis of the NMTS and AMTS ability to remove PCBs from painted surface was conducted on tile surface. Both NMTS and AMTS were successful in removing %99 of PCB153 from painted tiles, with the majority occurring before the one-day sampling point. Concentrations of PCB153 in paint throughout the treatment process are graphically presented in FIG. 14. The two treatment formulations showing similar effective at removing PCBs from contaminated paint. The average concentrations of PCB 153 in NMTS and AMTS are presented in Table 2. Most likely due to simultaneous dechlorination, the concentrations of PCB 153 in AMTS were below the level of quantification. Table 2 indicates average PCB 153 concentration in dried paste at different sampling times.

TABLE 2

| Treatment System | 1 Day Concentration (mg/kg of paste) | 3 Day Concentration (mg/kg of paste) | 7 Day Concentration (mg/kg of paste) |
| --- | --- | --- | --- |
| NMTS | 1.66 ± 0.01 | 1.78 ± 0.04 | 2.04 ± 0.35 |
| AMTS | N.D. | N.D. | N.D. |

Figure 67:
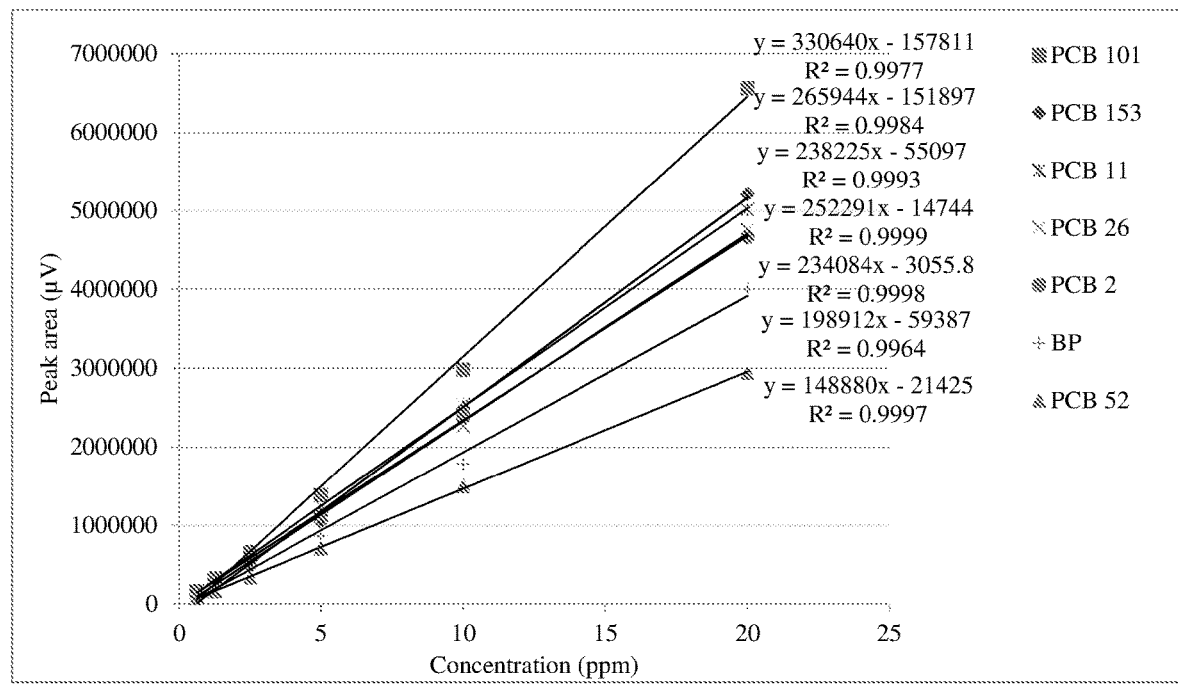
FIG. 67: shows GC-MS peak area as a function of PCB 153 and its byproducts concentration.

FIG. 67 shows GC-MS peak area as a function of PCB 153 and its byproducts concentration.

Conclusion

The novel treatment systems formulation using acidified ethanol/EL (90:10) and ball-milled ZVMg/AC were proposed in this work. Both AC and EL enhanced the rate of the reduction of PCBs by ball-milled ZVMg in the treatment system. The results of laboratory testing for the NMTS and AMTS method demonstrates that these treatment pastes are effective for the remediation and degradation PCBs from coating materials. The removal efficiency was greater than 99% for all samples after seven days of treatment. EL which maintains the neutral pH of the treatment system throughout dechlorination reaction serve as paint softener in the treatment systems.

Example 2

The purpose of this example is to provide an extended laboratory study of NMTS and AMTS using Ethanol/EL for remediation of PCB-contaminated paint field samples.

The Rainier Commons facility, known as the "Old Rainier Brewery", is a 4.6-acre site with 24 buildings of varying ages, located in Seattle, Washington. Most of the buildings are multi-floored, up to eight levels, with painted brick, concrete, and sandstone exteriors. Dried applied paint containing PCBs above the regulated limit 50 ppm) has been identified in some exterior surfaces of buildings, therefore, the paint is considered an unauthorized use of PCBs. The demolition and dismantling of the building was not considered an option therefore the agency goal is complete removal of the paint and re-paint the buildings. Using sandblasting to remove PCB-laden paint could expose workers to unacceptable levels of PCBs and produce contaminated sand which can spread PCBs to surrounding areas. For this, AMTS and NMTS were suggested as treatment methods.

It has been shown previously in this dissertation that the NMTS and AMTS can be successfully degrade PCBs in laboratory-prepared paint. These remediation technologies are designed to extract and dechlorinate PCBs from the paint structure. Ethyl lactate (EL) works as paint softener in both systems which allows ethanol to dissolve and extract PCBs into the paste. Ball milled ZVMg coated with AC shows high dechlorination rate of extracted PCBs from paint. The treated paint then can be mechanically stripped, and the surface re-painted after drying. An extended laboratory study for the removal of PCBs from paint field samples received from Old Rainier Brewery in Seattle was performed in this work. The ability of EL to remove the treated paint layers from concrete, brick, and sandstone materials was investigated.

Experimental

Materials and Chemicals

Neat Aroclor 1260 and 1254 standards were purchased from Accustandard and their stock solutions were prepared in absolute ethanol (Pharmco-AAPER). Micro-scale magnesium powder (2-4 μm) was obtained from Hart Metals Inc and activated carbon (charcoal G-60) was obtained from Matheson Coleman & Bell (Gardena, CA). Toluene (Optima®, 99.95%), concentrated sulfuric acid (Certified ACS Plus, 98.0%), potassium permanganate (Certified ACS, 99.5%), calcium stearate (powder, technical grade), polyethylene glycol (PEG) 8000 (Carbowax powder), and glycerol (laboratory grade) were purchased from Fisher Scientific (Pittsburgh, PA) and used as received. Glacial acetic acid (99.8% purity), and ethyl L(−)-lactate (97%) were obtained from Acros Organics, (Morris Plains, NJ). PowderSorb was obtained from Applied Science and Advanced Technologies (Baton Rouge, LA). "Dennyfoil" aluminum-backed paper vapor barrier was purchased through Denny Sales Co. (Pompano Beach, FL).

Field Samples

Seven bags of PCB contaminated paint chips and building parts were sent to UCF from the site for analysis prior to the actual field study. These samples were obtained from different sites of seven buildings from Old Seattle Brewery in Seattle. A complete description of the field samples is summarized in the Table 3. Table 3 indicates descriptions of paint samples and their masses.

TABLE 3

| Sample | Descriptions | Paint color | Mass (gm) |
|---|---|---|---|
| 6 West Elevation (6WE) | Two chips of paint | Red on one side and beige on the other with some greyish color | 31.49<br>39.41 |
| 4 West Elevation (4WE) | Two chips of paint | Red on one side and dark beige on the other | 26.77<br>60.03 |
| 5 North Elevation (5NE) | Chip of paint and two pieces of sandstones each of which was covered in two layers of paints | The top layer was green with yellow, and the bottom was dark beige | 4.60<br>34.32<br>26.70 |

TABLE 3-continued

| Sample | Descriptions | Paint color | Mass (gm) |
|---|---|---|---|
| 8 North Roof Parapet (8NRP) | One piece of painted sandstone | The top layer was red, and the bottom layers were beige | 78.27 |
| 9 South Elevator Shaft (9SES) | Small painted concrete pieces | Yellow paint | 7.40<br>3.46<br>1.11<br>0.83 |
| 9 Roof Parapet Wall (9RPW) | Three pieces of painted bricks | The top layer was red, and the bottom was beige | 35.15<br>26.57<br>14.75 |
| 10 South Elevator (10SE) | Small piece of painted sandstone and paint chip | Red in one side and the other side being beige | 27.32<br>8.61 |

Production of Ball-milled ZVMg/AC

The mechanically ball-milling process of ZVMg/AC included mixing 76.5 g magnesium powder with 8.5 g of AC into the galvanized steel canisters (17.80 cm length and 5.03 cm in internal diameter). To each canister, sixteen stainless steel ball bearing (1.6 $cm^3$ diameter) were placed. The ball-milled of components were done in an argon atmosphere for 30 min using a Series 5400 Red Devil Paint Shaker.

Production of Treatment Systems

NMTS can be prepared in any quantity using the same proportions outlined in Table 1. For the field samples received from Seattle, 280 gm of NMTS was formulated. To start, 15.4 gm of sorbent was coated with 15.4 gm of glycerol in 2 L glass jar with an airtight lid. 30.8 gm of calcium stearate and 15.4 gm polyethylene glycol (8000 PEG) were transferred to the jar and mixed carefully by auger bit. In a separate container, 250.6 mL of co-solvent of absolute ethanol/EL (90:10) and 2.7 mL of glacial acetic acid were combined. The liquid mixture was then added to the bulking agent jar with constant mixing for few minutes to ensure homogeneity. The airtight jar was closed and allowed to sit for at least 2-3 hours for the NMTS to thicken before use.

To create AMTS, 35 gm of ZVMg/AC was combined with 35 gm of glycerol and mixed until the metal was thoroughly coated with glycerol. This mixture was then added to NMTS paste and at this point the mixture has a new mass of 350 gm. The liquid containing 3.5 mL of glacial acetic acid and 31.5 mL of co-solvent ethanol/EL was added to the jar.

Initial Analysis of Field Samples

Upon receipt of the first set of field samples, 1.0 gm of paint from each sample was collected and analyzed to determine the concentration of PCBs. The samples designated 5NE and 9SES were not analyzed prior to treatment due to the small mass of paint; therefore, the respective concentrations of PCBs given by the supplier were used as baseline values.

Application of Treatment Systems

Figure 17:
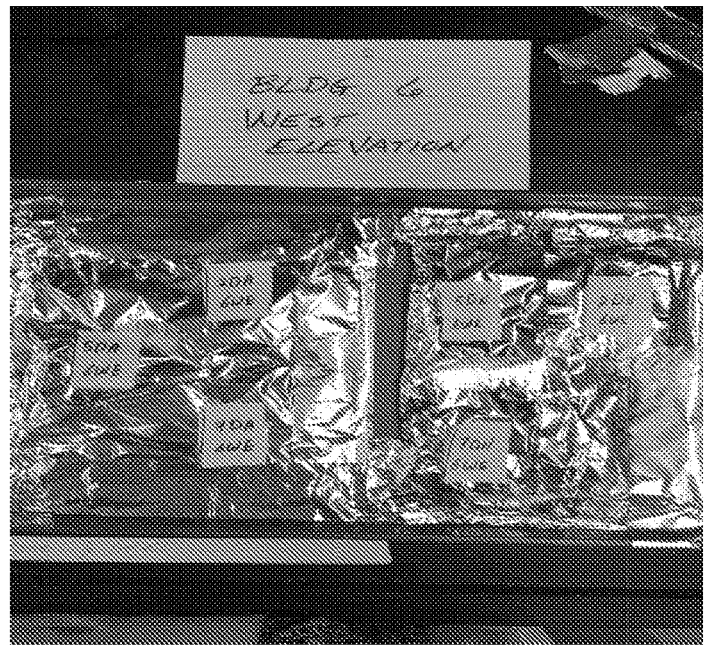
FIG. 17: shows a photo of sealed treatment systems with aluminum foil and aluminum tape.

For the first and second samples (6WE and 4WE), four rectangles of 6.35 cm by 7.62 cm were drawn on the painted surface, leaving approximately 1.27 cm between squares. The area around each rectangle was then covered with aluminum tape. Each area was kept separate from those around it to mitigate any interference from the surroundings. FIG. 15 and FIG. 16 below show field sample 6WE and a schematic of the treatment plan. Paint samples were designated 2D or 5D for two or five days of treatment, respectively, while N and A indicate NMTS and AMTS, respectively. Two sections per sample (S1 and S2) were also designated as "spares", to be used to replace one of the other samples if problems occurred during application or sampling. A 0.5-inch thick template was used to apply the treatment paste onto the sample areas then carefully removed. Aluminum foil was applied to cover the treatment paste with an additional margin, and then all four sides were sealed with aluminum roofing tape (FIG. 17). The treatment systems were stored on a bench top at ambient conditions for two, five, and seven days prior to analysis. FIG. 15 shows building 6WE samples prepared for treatment. FIG. 16 shows photos of treatment on paint surfaces A) NMTS placed in the surface. B) AMTS placed in the surface. FIG. 17 shows a photo of sealed treatment systems with aluminum foil and aluminum tape.

The remaining five samples (5NE, 8NRP, 9SES, 9RPW, and 10SE) were treated with NMTS applied to the painted surfaces via direct contact. The treatment systems were sealed with aluminum foil and aluminum tape and remained in contact with the paint samples for five or seven days prior to analysis.

Sampling was conducted by removing the foil layer protecting the treatment system and collecting the treatment system for analysis. Paint samples without substrate were then cut around the treatment area to facilitate paint removal, while paint samples on concrete or brick substrates were manually removed using a paint scraper. To remove any residual paste on the paint surfaces, the paint was wiped with denatured alcohol.

Analysis

Concentrations of PCBs present on paint and treatment samples were analyzed by GC-ECD and GC-MS. The analytical instruments used for the quantitative analysis of extracted and cleaned samples of PCB congeners were a Perkin-Elmer Clarus 580 gas chromatograph equipped with an electron capture detector (GC-ECD) and an Agilent Technologies 6850 GC/MS system Both equipped with a Restek RTX®-5 column (30 m×0.25 mm i. d., 0.25 μm film thickness). Ultra-high purity nitrogen was used as the ECD makeup gas at a flow of 30 mL/min. Helium acted as the carrier gas in both instruments, a constant flow of 1.3 mL/min was set. On the GC-ECD, the injector port temperature was held at 275° C. and the detector was at 325° C. On the GC/MS, the injector temperature was 250° C., and the ion source temperature was 280° C.

The analytical method used for quantitation of PCBs was a modification of EPA Method 8082A (Polychlorinated Biphenyls by Gas Chromatography)[54]. PCB 209 was used as the internal standards for GC/ECD and GC/MS quantitation, respectively.

The determination of unknown Aroclor concentrations involved the use of a multi-point calibration curve. Five prominent (at least 25% of the height of the largest peak) peaks characteristic of the Aroclor were chosen at five different concentrations, resulting in a 25-point calibration ($R2 \geq 0.99$). Unknown concentrations were determined by the average linear fit of all five prominent peaks.

Results and Discussion

Treatment of First Set of Field Samples

Initial extractions of PCBs from the paint samples into toluene found all samples to be contaminated with Aroclor 1254 and Aroclor 1260. Measurements with error bars were conducted in duplicate; measurements without error bars reflect loss of a duplicate sample during cleanup. The results from each building are discussed below.

Treatment of Paint Chips

Figure 18:
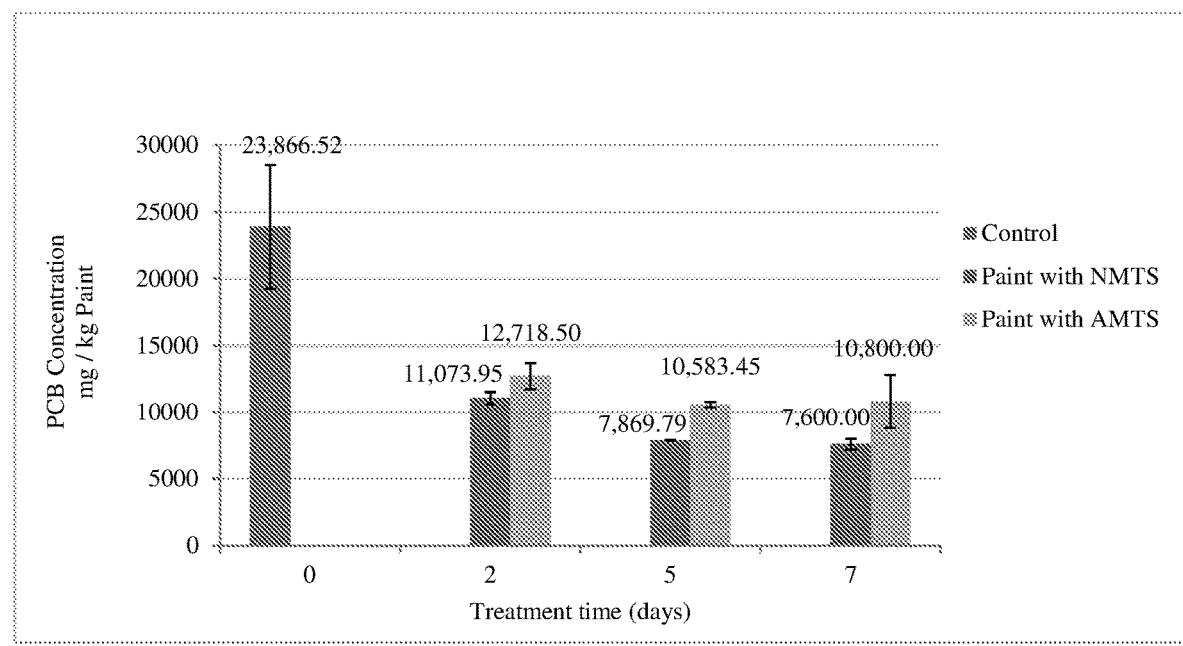
FIG. 18: shows 6WE PCB levels in paint at analysis time points.

The 6WE paint samples were found to be contaminated with high concentrations of PCBs. The average concentration of the baseline samples was 23,900±4,600 mg PCB/kg paint. Upon removal, each layer of the paint was very soft and pliable, each layer easily being removed from the others in one piece. This indicates that both treatment pastes are effective paint softeners and allow a good deal of solvent to enter the paint. FIG. 18 below shows the results of treatment of these paint chips with NMTS and AMTS. Both of treatment systems were comparable in removing % 45-68 of the PCBs in which the majority of PCB removal in the paint occurred within two days. FIG. 18 shows 6WE PCB levels in paint at analysis time points.

FIG. 19 illustrate the concentration of PCBs in the treatment system pastes. The NMTS data consistent with the predicted behavior of PCB extraction as the PCB concentration in the paint decreases over time while the PCB concentration of the treatment system paste increases. The metal which initiated degradation in AMTS samples kept the PCB concentration lower than the NMTS. However, PCB concentration in AMTS samples continues to rise within treatment period, indicating that sorption processes have overtaken dechlorination processes. NMTS was more effective at removing PCBs. This phenomenon may be due to the template used to apply the treatment pastes. When the template area was filled, volume applied the treatment paste. However, the AMTS is markedly less dense than the NMTS due to the formation of hydrogen bubbles, resulting in less mass of actual paste per given volume. FIG. 19 shows 6WE PCB level in treatment system at analysis time points.

In building 4WE, it is important to note the variation in the concentration of PCBs in the two baseline samples designated 4WE: the concentration of PCBs in one sample was 21,095.85 mg PCB/kg paint while the other one was 18 mg PCB/kg paint. The large deviation for these type of samples is expected because PCB concentrations on aged structures often vary even within small distances of sampling points[24]. This result implies that the building surface was either not evenly coated with PCB-laden paint to begin with, that the PCBs have migrated into the substrate or the external environment, or that the contaminated layer(s) of paint had flaked off in some areas over time.

Figure 21:
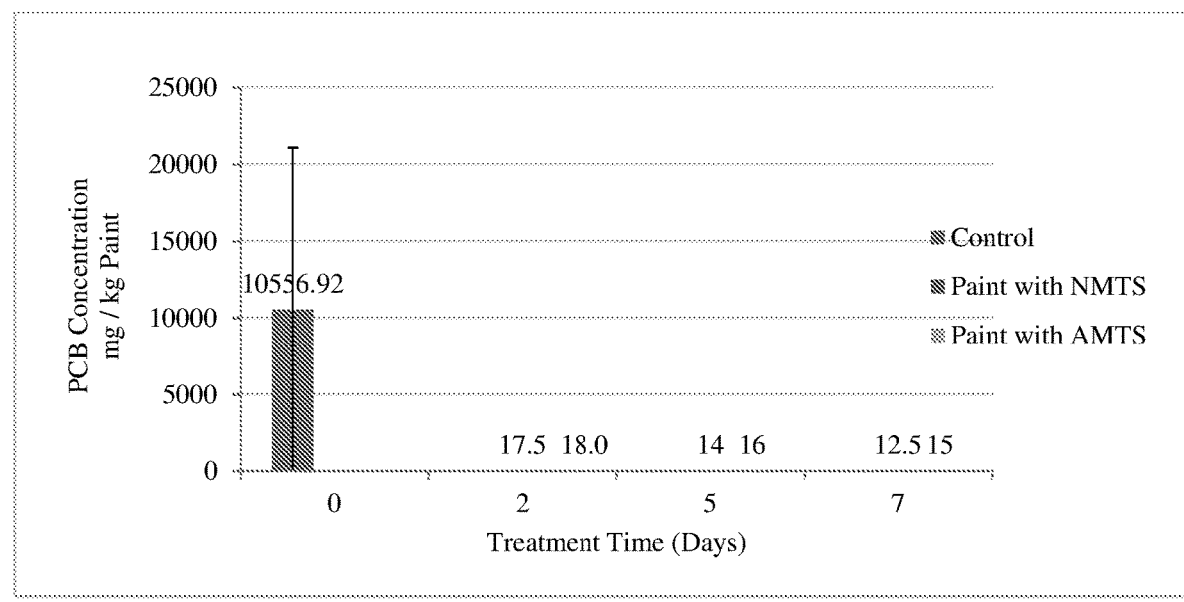
FIG. 21: shows 4WE PCB levels in paint at analysis time points.
Figure 22:
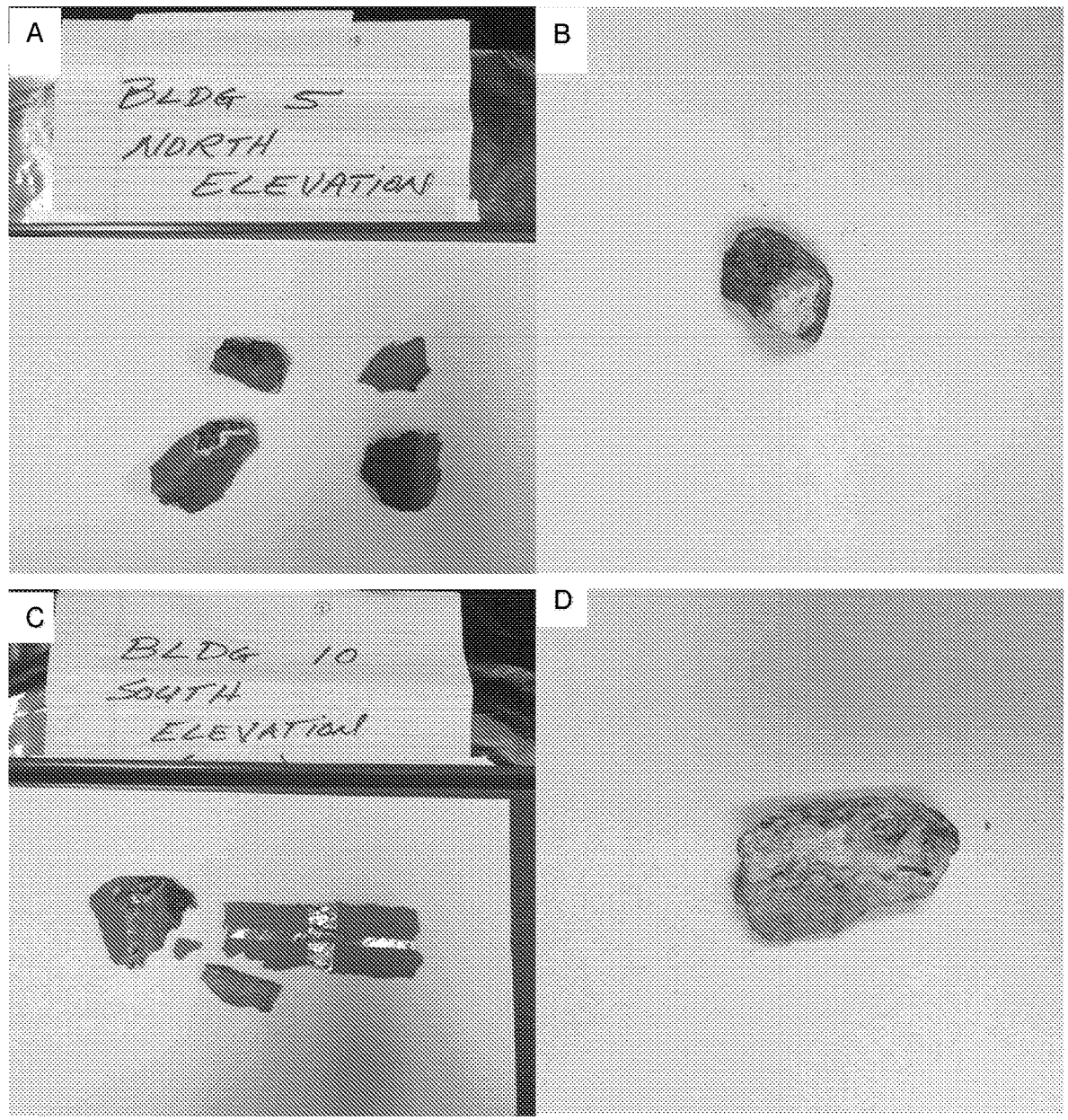
FIG. 22A: shows 5NE samples prior to analysis associated with a removal of paint/PCBs from painted surfaces of Old Seattle Brewery/Rainier Commons 5NE.
FIG. 22B: shows 5NE samples after one week of analysis associated with a removal of paint/PCBs from painted surfaces of Old Seattle Brewery/Rainier Commons 5NE.
FIG. 22C: shows 10SE samples prior to analysis associated with a removal of paint/PCBs from painted surfaces of Old Seattle Brewery/Rainier Commons 5NE.
FIG. 22D: shows 10SE samples after one week of analysis associated with a removal of paint/PCBs from painted surfaces of Old Seattle Brewery/Rainier Commons 5NE.
Figure 23:
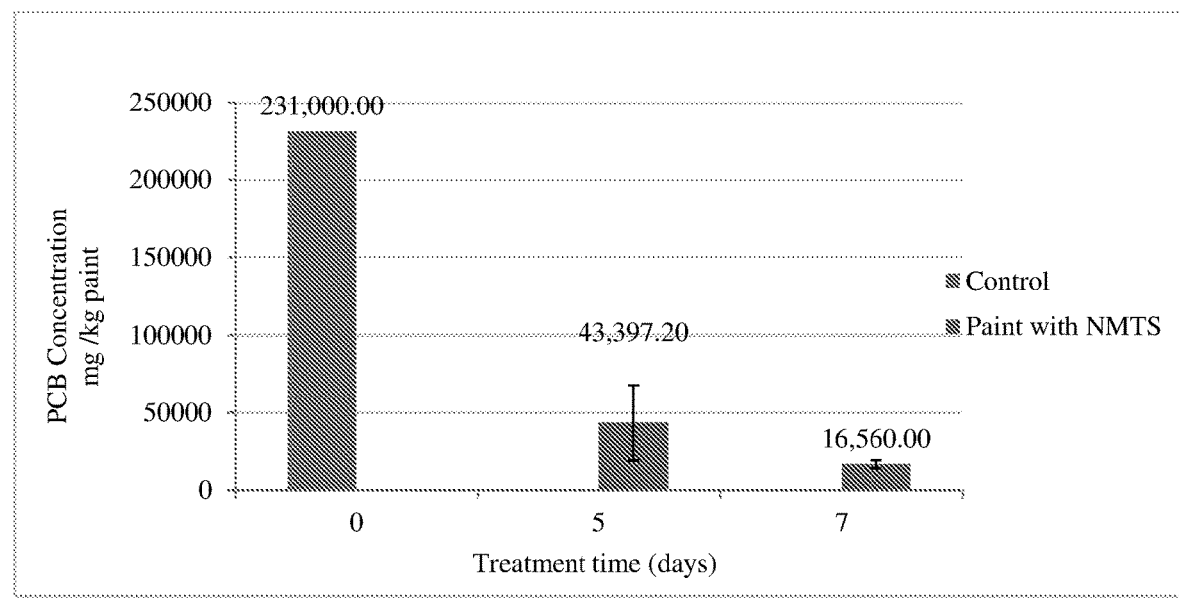
FIG. 23: shows 5NE PCB levels at analysis time points.
Figure 24:
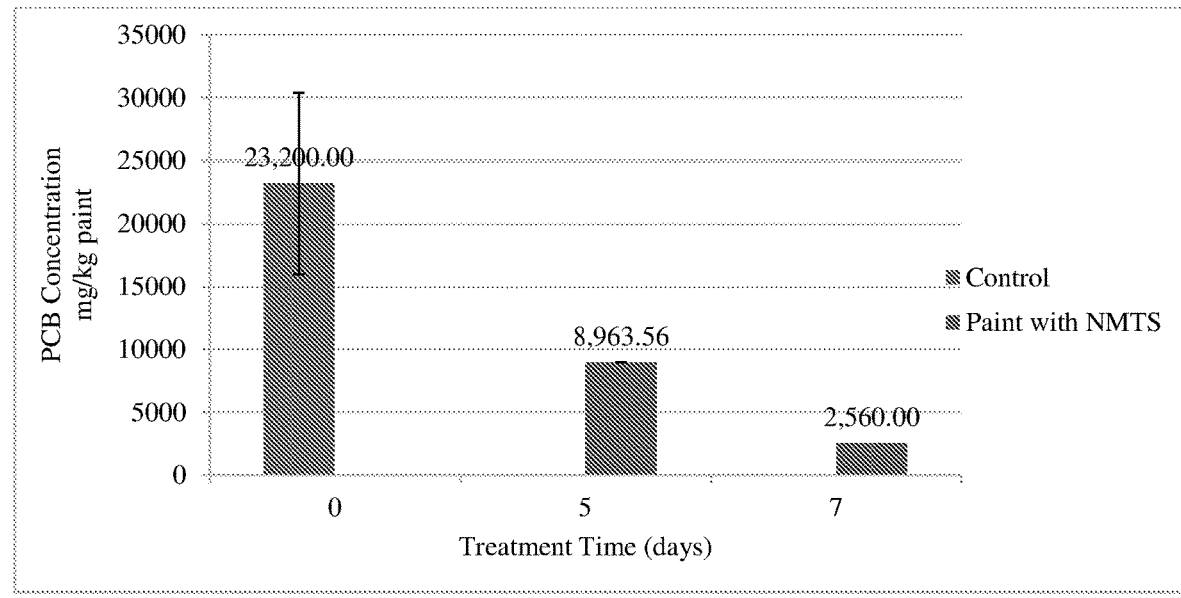
FIG. 24: shows 10SE PCB levels at analysis time points.

FIG. 20 shows the samples for building 4WE prior to analysis and after one week of treatment with NMTS. After removing the NMTS and AMTS paste the paint samples were very soft and the layers were easily separated. Concentrations of PCBs in the red and beige paint layers throughout the treatment process were measured separately and the detected concentration was below the regulated limit (FIG. 21). FIG. 20 shows removal of PCBs from painted surfaces of Old Seattle Brewery/Rainier Commons 4WE. A) Samples prior to analysis, B) Samples after one week of analysis shows paint elasticity after treatment. FIG. 21 shows 4WE PCB levels in paint at analysis time points Treatment of Painted Sandstones Painted sandstones were collected from three buildings in Old Seattle Brewery: 5NE, 10SE, and 8NRP. FIG. 22 shows the samples for building 5NE and 10SE prior to analysis and after one week of treatment with NMTS. FIG. 22 shows removal of paint/PCBs from painted surfaces of Old Seattle Brewery/Rainier Commons 5NE. A) 5NE samples prior to analysis, B) 5NE samples after one week of analysis, C) 10SE samples prior to analysis, D) 10SE samples after one week of analysis. In sampling the NMTS paste, it was noted that some of the beige paint stuck to the underlying substrate and the residual paint was quite difficult to remove by scraping (FIG. 23 B, 24 D). The 5NE sandstones covered with paint had the highest concentration of 231,000 mg Aroclor/kg paint. The NMTS was seen to have the capability of reducing PCB concentrations in painted pieces to 16,560±3 mg PCB/kg over the course of seven days of treatment (FIG. 23). FIG. 23 shows 5NE PCB levels at analysis time points. Similar results seen in 10SE samples where the PCB concentrations in paint significantly decreased after seven days of treatment and 90% of the initial PCB concentration was removed (FIG. 24). FIG. 24 shows 10SE PCB levels at analysis time points.

Compared to the 6WE samples, where PCBs were removed around 68%, and the PCB concentrations in paint from the 10SE averaged around 92.83.8% removal even they had close PCB concentrations. This is most likely due to the difference in physical properties of the paint.

The NMTS successfully removed the majority of PCBs from painted sandstones surfaces within one week but the treatment results of 8NPR samples deviated from this trend. FIG. 25 shows that 138% of the PCB initial concentration is present on the paint surface after seven days of treatment which indicates the underlying pieces is likely contaminated with PCBs. The solvent in the treatment system penetrated both the paint and the porous surface of sandstone to draw the PCBs to the paint surface, a phenomenon seen in similar studies on remediating porous painted surfaces[48-49]. FIG. 25 shows 8NRP PCB levels at analysis time points.

Treatment of Painted Concrete

Figure 27:
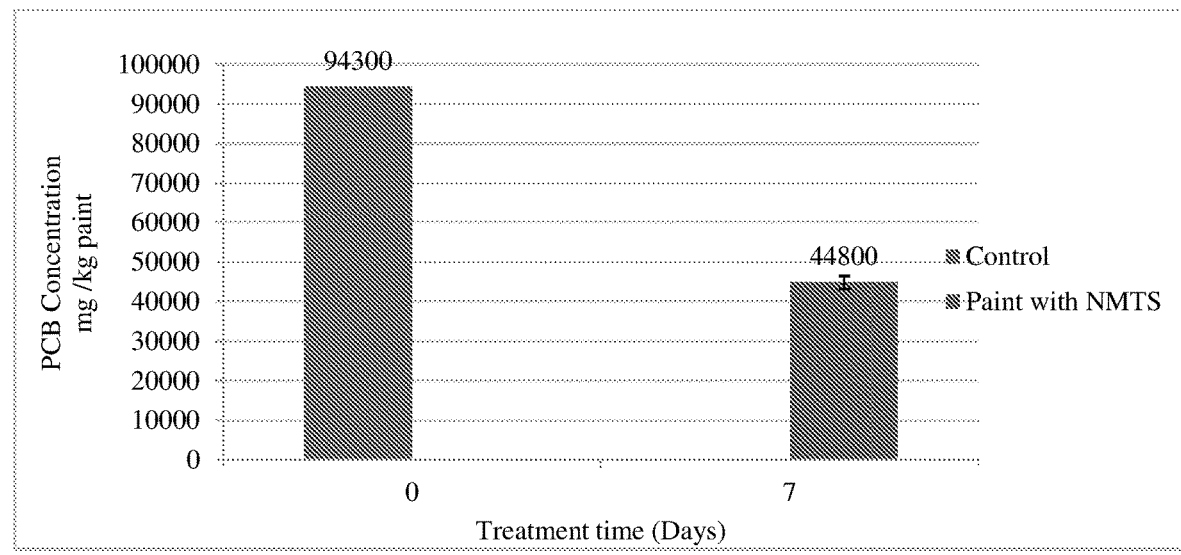
FIG. 27: shows 9SES PCB levels at analysis time points.

FIG. 26 shows removal of PCBs from painted surfaces of Old Seattle Brewery/Rainier Commons 9SES. A) Samples prior analysis, B) Samples after one week of treatment. Small sizes (between 2 cm to 4 cm) of concrete painted surface samples was received from the contaminated site corresponding to sample set 9SES (FIG. 26 A). Treatment for seven days with NMTS resulted in a 52.5% decrease in PCB concentration in the paint, as can be seen in FIG. 27. FIG. 27 shows 9SES PCB levels at analysis time points. Although the underlying materials became wet after treatment and the yellow paint became pliable, scraped off paint for sampling was difficult since the paint still adhered to the concrete substrate (FIG. 26 B). We noted that for painted concrete pieces, which were allowed to dry after paste removal instead of being scraped away, allowed the paint to regain its former appearance and adhesion to the concrete.

Treatment of Painted Brick

Figure 28:
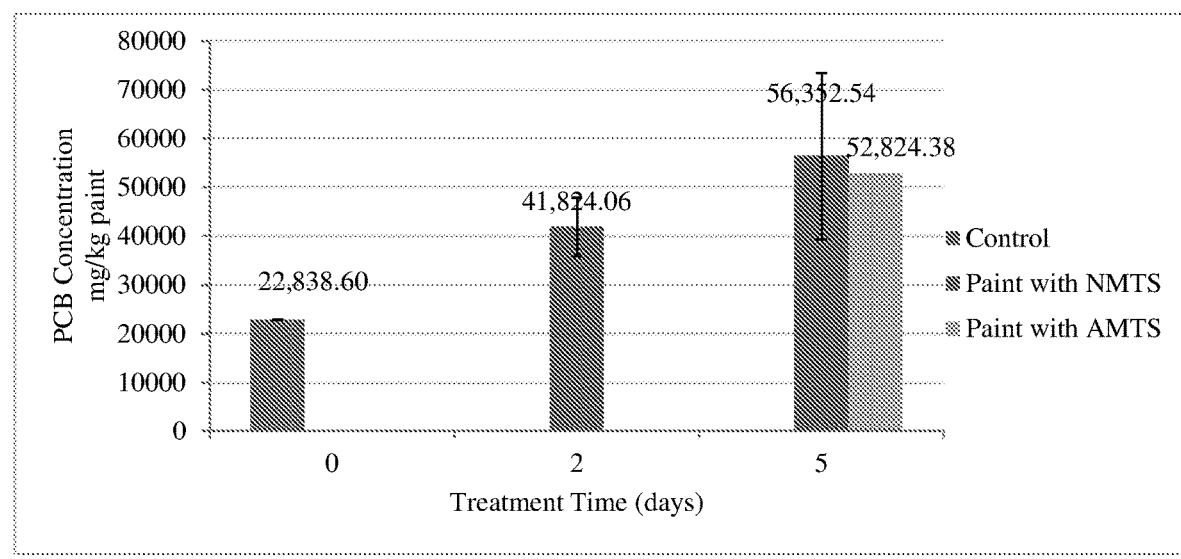
FIG. 28: shows 9RPW PCB levels at analysis time points.

The remediation in 9RPW samples occurred on bricks painted with PCB-contaminated paint. PCB concentrations in paint and the treatment system from sample 9RPW except for the day 5 paint and AMTS samples which were not included due to the lack of samples are displayed in FIG. 28. In this building, the PCB concentrations in paint samples increased after five and seven days of treatment, like the results seen in building 8NRP. This suggests that the underlying brick may have been contaminated and the PCBs drawn through the brick to the paint by the treatment system. FIG. 28 shows 9RPW PCB levels at analysis time points.

Study Limitations

In our study, it was shown that the PCBs could be effectively removed by both NMTS and AMTS. However, reduction of PCBs amount in the received paint samples from Seattle to the concentration <50 mg/kg was not achieved due to the elevated concentration of PCBs. Moisture content of the NMTS and AMTS pastes were evaluated after removing from the field samples to insure sufficient solvent is present in the paste. After one week of treatment, all pastes were still moist indicates that they were still active for extraction and degradation of PCBs. Therefore, it was suggested that the PCB removal process for these samples should exceed seven days to achieve more extraction and degradation of PCBs. PCB contamination is not homogenous on the paint surface of some samples that we analyzed, more statistical analysis needs to be done to have a more precise and accurate results. To address these limitations, more samples were received from the Seattle site: to evaluate the length of time that treatment systems need to be applied to achieve extraction of the PCBs from samples with high concentrations of PCBs; and to evaluate the ability of NMTS for complete removal of all layers of paint from underlying materials.

Treatment of Second Set of Field Samples
Remediation of Painted Surfaces

To test the ability of NMTS for removing all layers of paint coated with different type of substrates and to evaluate the length of time that the paste need to apply to reduce PCB contents under 50 mg/kg, our lab received another paint samples from Old Seattle Brewery. These samples were obtained from different sites of three buildings.

For initial evaluation, 1 gm of crushed paint was collected from each sample and 0.25 inches masonry drill bit was used to sample 0.5 gm of the concrete, sandstone, and bricks at depth from 0.0-0.5 inches from uncovered side of substrate. The paint and substrate samples were extracted and analyzed for PCBs. The initial results indicate all samples were contaminated with PCB mixtures including Aroclor 1254 and 1260, of which ranged from 24,095 to 104,291 mg/kg in paint and from 92.1 to 14,537 mg/kg in substrate materials (Table 4). Table 4 shows a description of samples from building sites and their initial PCB concentrations.

TABLE 4

| Sample # | Substrate material | Initial Conc. of PCBs (mg/kg) | Paint color | Initial Conc. of PCBs (mg/kg) |
|---|---|---|---|---|
| 6 West elevation (6WE) | Bricks | 157 ± 0.60 | Red on beige | 24,095 ± 2459 |
| 7 West elevation center (7WEC) | NA | NA | Red on beige on grayish | 48,406 |
| 7 West elevation south (7WES) | Sandstones | 272 ± 10.7 | Dark red on beige | 34,609 ± 2923 |
| 9 North parapet wall (9N PW) | Bricks | 92 ± 4.60 | Red on beige | 31,759 ± 1681.1 |
| 9 Center parapet wall (9CPW) | Concrete | 14,537 ± 1137 | Red on beige | 26,952 ± 1753 |
| 9 South Parapet Wall (9SPW) | Concrete | 261 ± 7.74 | Red on beige | 61,577 ± 12008 |
| 9 South Elevator Shaft (9SE5) | Concrete | 794 ± 350 | Yellow on beige | 104,291 ± 9991 |

Since all paint samples had high concentration of PCBs they were treated under the same conditions where a 0.5 in (thickness) of NMTS was applied to each sample, aluminum foil was used to cover the treatment paste with an additional margin, and then all four sides were sealed with aluminum roofing tape. The treatment systems were stored on a bench top at ambient conditions for one week prior to analysis. Later, another NMTS treatment was applied under the same conditions described previously for an additional week.

Figure 29:
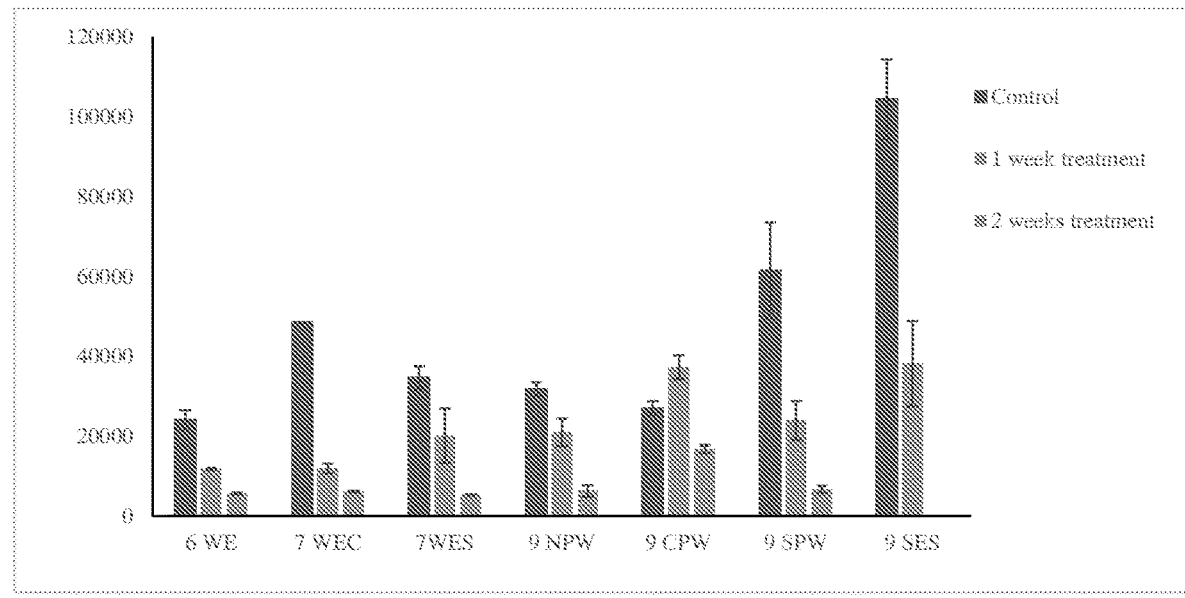
FIG. 29: shows PCB levels in different samples from second set of field samples at analysis time points.

Weekly concentrations of PCBs present on paint and underlying samples were analyzed by GC-MS. PCBs concentration in the paint over treatment time are graphically presented in FIG. 29 while Table 5 shows the results from concrete, sandstones, and bricks. FIG. 29 shows PCB levels in different samples from second set of field samples at analysis time points. Table 5 shows PCB concentration on substrate materials from building sites before and after treatment.

TABLE 5

| Sample # | Initial Con. (mg Aroclor/kg) | $1^{st}$ treatment | $2^{nd}$ treatment | Average % Removal |
|---|---|---|---|---|
| 6WE (brick) | 157 ± 0.60 | 94.9 ± 38.6 | 24.4 ± 6.22 | 84.5 |
| 7WES (sandstone) | 272 ± 10.7 | 132 ± 0.27 | 49.1 ± 3.50 | 81.9 |
| 9NPW (brick) | 92.1 ± 4.60 | 47.2 ± 8.00 | N.D. | 100 |
| 9CPW (concrete) | 14,537 ± 1137 | 3154 ± 72.80 | 1063 ± 51.2 | 92.7 |
| 9SPW (concrete) | 261 ± 7.74 | 136 ± 53.2 | 48.3 ± 10.4 | 81.5 |
| 9SES (concrete) | 794 ± 350 | 581 ± 39.3 | 267 ± 24.6 | 66.4 |

N.D. Not detectable

Paint samples and underlying materials (concrete, bricks, and sandstone) from all of the received materials were extracted in toluene and ethanol, respectively after one and two weeks of exposure to NMTS. Analysis shows that approximately 10-23% of the original PCB concentration remained on paint surface (FIG. 29) and from 0-7% remained on underlying materials (Table 5). Most of the concentration of substrate materials were brought below the action limit by the end of week 2, however, 9CPW and 9SES results deviated from this trend due to the possibly high concentration of PCBs in the original materials. This also can explain the increasing in the concentration of the paint surface in sample collected from building 9 CPW after one week of treatment.

Condition of Paints after Treatment

Figure 30A:
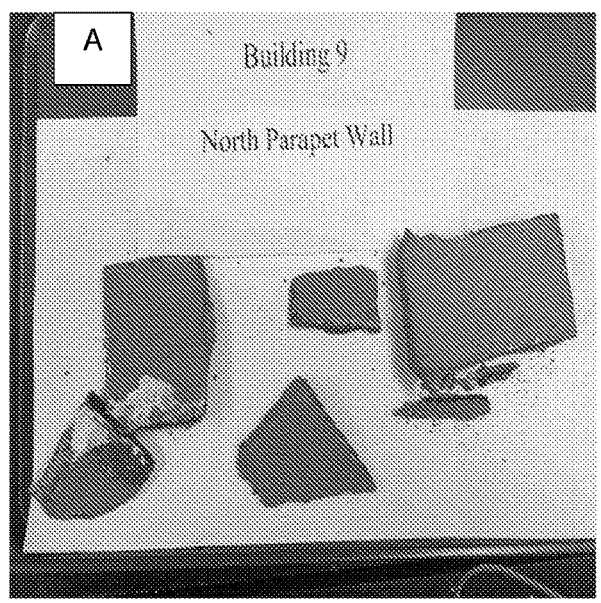
FIG. 30A: shows samples prior analysis associated with a removal of PCBs from painted surfaces of Old Seattle Brewery/Rainier Commons 9NPW.

FIG. 30-33 show three different field samples prior to analysis and after one and/or two weeks of treatment with NMTS. After one week of treatment the outer and inner layers of brick's paint were very soft, however, they needed to be scraped off to remove all the contaminated paint from the surface (FIGS. 30 B and C). Regarding the paint covered concrete FIG. 31 shows the sample for building 9CPW prior to analysis and after two weeks of treatment with NMTS. The outer red paint was completely removed leaving the inner beige paint on the surface of concrete even after scraping the material. Although the concrete surface under the layers of paint was wet with extraction solvent, the paint layer was hard to scrape due to the porous structure of concrete. Similar results were observed after two weeks treatment of sample 7WES where the outer layers of paint came off in one piece and the inner beige paint stayed on the sandstone surface (FIGS. 32 B and C). The inner beige layers were softened however, complete removal wasn't achieved from the sandstone piece. As it was being sampled, the beige paint had a consistency similar to that of gum, deforming easily and adhering to the removal tools.

FIG. 30 shows removal of PCBs from painted surfaces of Old Seattle Brewery/Rainier Commons 9NPW. A) Samples prior analysis, B) Brick sample after one week of analysis, C) Paint elasticity after treatment. FIG. 31 shows removal of PCBs from painted surfaces of Old Seattle Brewery/Rainier Commons 9CPW. A) Samples prior treatment, B) Concrete sample after two weeks of treatment. FIG. 32 shows removal of paint/PCBs from painted surfaces of Old Seattle Brewery/Rainier Commons 7WES. A) Samples prior to analysis, B) Sandstone sample after one week of analysis, C) Paint elasticity after treatment.

FIG. 68 shows removal of paint/PCBs from painted surfaces of Old Seattle Brewery/Rainier Commons 9RPW samples. A) Prior to treatment, B) After treatment.

FIG. 69 shows removal of PCBs from painted surfaces of Old Seattle Brewery/Rainier Commons 6WE. A) Samples prior analysis, B) Samples after one week of analysis, C) Paint elasticity after treatment.

FIG. 70 shows removal of PCBs from painted surfaces of Old Seattle Brewery/Rainier Commons 7WEC. A) Samples prior to analysis, B) Samples after one week of analysis, C) Paint elasticity after treatment.

FIG. 71 shows removal of PCBs from painted surfaces of Old Seattle Brewery/Rainier Commons 9SPW. A) Samples prior treatment, B) Samples after two weeks of treatment.

Conclusion

The described field samples study has been an invaluable step towards the progression of the NMTS and AMTS proof of concept from laboratory studies to large scale application. The components of NMTS removed PCBs from paint while the ZVMg/AC in AMTS initiated PCB degradation. NMTS and AMTS were capable of reducing the PCBs in painted materials up to 94% with the greatest removal occurring within one week. One of the challenges of this was the adhesion of contaminated paint to the underlying material surfaces and the inability of EL to achieve complete removal to the all layers of paint. Therefore, new solvent should be used to remove the paint completely. The starting concentration of the paint was shown to be an important factor when considering the period of treatment by NMTS or AMTS. Structures with high PCB concentrations should be better suited for more than one-week treatment, while paint containing low concentrations of PCBs could be remediated within one week.

Example 3

The purpose of this example was to demonstrate dichlorination of PCB 153 and PCB 28 with ZVMg and ZVMg/AC in acidified 2-butoxyethanol.

2-Butoxyethanol is an environmentally sound solvent which belongs to the glycol ether group, having the chemical formula $BuOC_2H_4OH$ (Formula 2). This solvent falls in the polar solvent category due to the presence of two functional groups: alcohol and ether. 2-Butoxyethanol is commonly used as a solvent for paints and surface coatings, as well as cleaning products and ink. Other known applications of this solvent are in consumer products such as cosmetics (hair dyes, nail polishes removers and skin cleansers) and food additives, as well as pharmaceuticals[61-62]. 2-Butoxyethanol has received FDA approval and is also approved by the EPA as a primary ingredient in COREXIT® 9527, an oil dispersant used to combat the environmental disaster caused by the Deep Water Horizon oil spill[63]. It has also been observed that 2-butoxyethanol prefers aqueous environments with a partition percentage of 83.93% into water, and has incredibly low partitioning rates of 0.05% and 0.04% into soil and sediment, respectively. 2-Butoxyethanol has a lifetime of ~20 days in open water environments, after which nearly 88% of the compound has completely degraded to carbon dioxide and water[63-64].

Formula 2

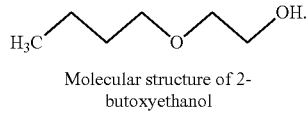

Molecular structure of 2-butoxyethanol

As a green solvent, 2-butoxyethanol was chosen in this work to be a novel proton source for hydrodechlorination of PCBs. The feasibility of employing acidified 2-butoxyethanol in the presence of ZVMg ball-milled with and without AC to degrade PCBs in mild conditions is evaluated. PCB 153 and PCB 28 were used as models for a high chlorinated and a low chlorinated PCB, respectively. Kinetic irregularities seen during the reaction of PCB degradation studies conducted in 2-butoxyethanol were investigated. Degradation products are identified and degradation pathways are proposed for high and low chlorinated PCBs.

Experimental

Chemicals and Materials

Neat PCB congeners in solid form were acquired from Accustandard (New Haven, CT), and stock solutions were prepared in 2-butoxyethanol. Glacial acetic acid (99.8) was purchased from Acros Organics through Fisher Scientific. Optima® grade toluene was obtained from Fisher Scientific. Micro-scale un-milled magnesium (2-4 µm) was obtained from Heart Metals (Tamaqua, PA) and used as received. Activated carbon (charcoal G-60) was obtained from Matheson Coleman & Bell (Gardena, CA). Nylon filters (0.45 µm pore size) were obtained from Fisher Scientific (Pittsburgh, PA).

Preparation of Ball-Milled ZVMg and ZVMg/AC Bimetal

A mechanically ball-milled ZVMg/AC was prepared by mixing o 76.5 g ZVMg with 8.5 g of AC in the galvanized steel canisters. The materials were milled with sixteen stainless steel balls of 1.5 cm diameter having a total mass of 261.15 g, using a twin arm paint shaker milling tool (Red Devil 5400) for 30 minutes in argon atmosphere. Ball-milled ZVMg was prepared in a similar procedure using 85.0 g of ZVMg powder.

Dechlorination of PCBs in 2-Butoxyethanol

A solution containing 10 µg mL$^{-1}$ of PCB 153 or 20 µg mL$^{-1}$ of PCB 28 were prepared in 2-butoxyethanol. A 20 mL glass screw-top vials containing 4.95 mL of individual PCB solution, 0.25 of ZVMg or ZVMg/AC and 50 µL of glacial acetic acid were conducted. These vials were placed on a Lab Companion Series K-57013 Reciprocating Shaker table (speed 200 rpm) at 26° C. until the designed extraction time. All experiments were done in duplicate and blank experiments without metal were carried out in parallel.

Sample Extraction and Analysis

Exactly 5 mL of toluene was added to each vial and the mixture was shaken for 2 minutes by hand. The mixture then was transferred into a 40 mL vial and 12 mL of mixture containing 0.3 M of sulfuric acid and 6.3 M of acetic acid was added to the vial in order to protonate the ether-oxygen in 2-butoxyethanol. Then 5 mL of distilled water was transferred into the vials and the mixture was then shaken by hand for 2 minutes followed by centrifugation for 20 min. Two more water washes were performed for the top organic layer which was collected and dried over Na$_2$SO$_4$. The extracted samples were filtered and collected in clean 4 mL glass screw-cap vials for further analysis.

Analysis of the extracted samples were performed on an Agilent Technologies 5977E GC/MS system, using an RTX-5 column (30 m, 0.25 mm i.d., 0.25 µm film thickness). Helium acted as the carrier gas with a constant flow of 2 mL/min and an average gas velocity of 51.016 cm/s. The injector and the ion source temperatures were 250° C., and 280° C., respectively. An initial oven temperature of 120° C. was used, and then ramped up to 320° C. Identification of each of the single PCB congeners was based upon the retention times of known standards and verified via their mass spectrum.

Computational Methods

All calculations in the research were performed using the Gaussian 09 package with DFT/B3LYP functionality. In the study, 6-31+G(d,p) basis set was applied for all elements in order to obtain results with satisfactory accuracy. In all calculations, optimization and frequency calculations were performed for each structure. Intrinsic reaction coordinate (IRC) calculations were performed for transition states to verify the reaction pathway between substrates and products. Unless specified, Gibbs free energies were discussed in this paper.

Results and Discussion

Because of the electron withdrawing group ether, 2-butoxyethanol is highly acidic solvent making 2-butoxyethanol an attractive proton source in reductive reactions. Therefore, the combination of 2-butoxyethanol with ZVM have led to induce a dehalogenation chemical reaction of PCBs. The reaction between ball-milled ZVMg or ZVMg/AC and an acidified PCB/2-butoxyethanol solution is characterized by the production of biphenyl, magnesium 2-butoxyethoxide and magnesium chloride (Reaction 1).

Reaction 1: Dechlorination reaction of PCBs in acidified 2-butoxyethanol.

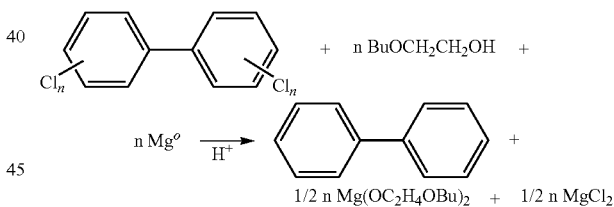

Efficacy of the System for Dechlorination of High Chlorinated Biphenyls

Figure 33:
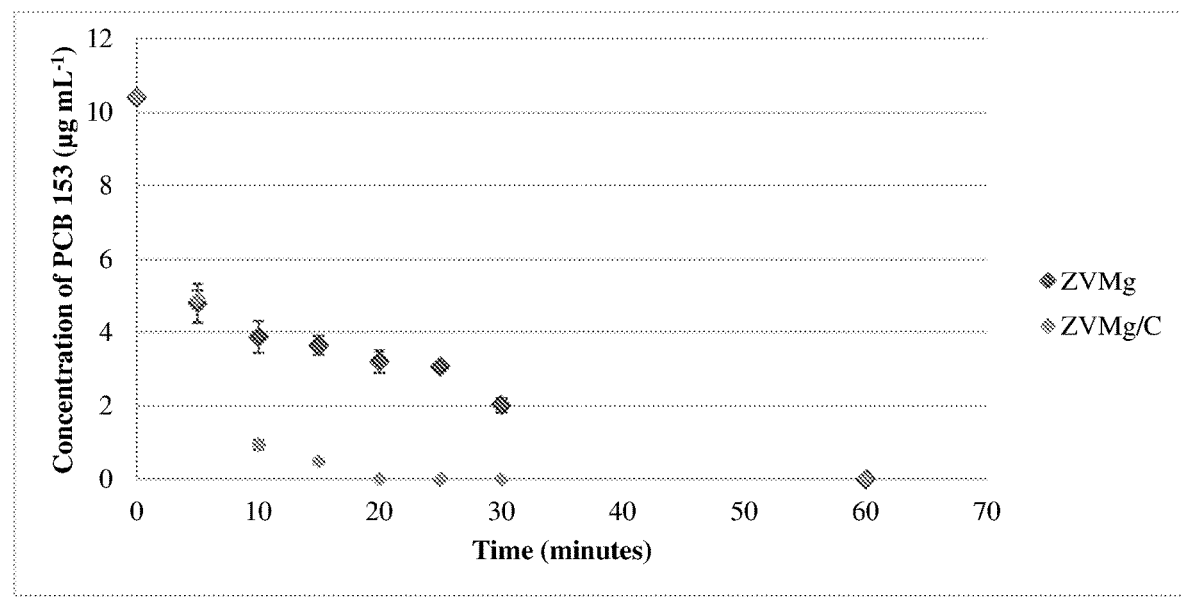
FIG. 33: shows Comparison of the degradation of PCB 153 with the ZVMg, and ZVMg/AC of treatment in acidified 2-butoxyethanol.

PCB 153 was chosen as a model compound of high chlorinated PCBs, in order to test the efficiency of using 2-butoxyethanol solvent in reduction reactions. A dechlorination study of PCB 153 was conducted in an acidified 2-butoxyethanol solution with ZVMg and ZVg/AC at room temperature. Full degradation of a 10 µg mL$^{-1}$ of PCB 153 was accomplished within 30 minutes under ZVMg. Faster degradation in 20 minutes for same amount of PCB 153 was done in the presence of AC (FIG. 33). FIG. 33 shows a comparison of the degradation of PCB 153 with the ZVMg, and ZVMg/AC of treatment in acidified 2-butoxyethanol.

Dechlorination of PCB 153 Rate Constants

Figure 34:
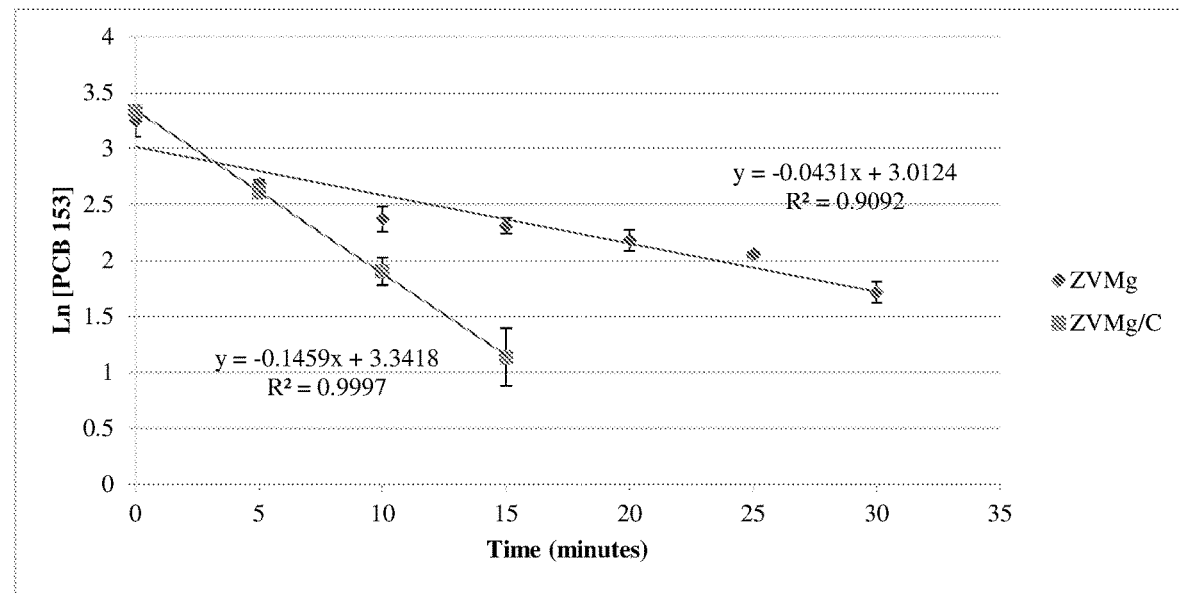
FIG. 34: shows pseudo first order plot of the degradation of PCB 153 using ZVMg and ZVMg/C in an acidified 2-butoxyethanol.

A kinetic study of PCB 153 in an acidified 2-utoxyethanol system was carried out in the presence of ball-milled ZVMg with and without AC. Pseudo-first order kinetic plots of each reaction are shown in FIG. 34. The reaction of ZVMg/AC and PCB 153 yielded faster kinetics than the reaction with ball-milled ZVMg. The pseudo-first order PCB dechlorination rate constants were determined from the rate of the parent congener disappearance. For the reaction with ZVMg/AC the pseudo-first order rate constant was $k=0.1459$ $min^{-1}$ while the value for the reaction with ZVMg was $k=0.0431$ $min^{-1}$. FIG. 34 shows pseudo first order plot of the degradation of PCB 153 using ZVMg and ZVMg/C in an acidified 2-butoxyethanol.

Identification and Characterization of PCB 153 Degradation Products

Figure 35:
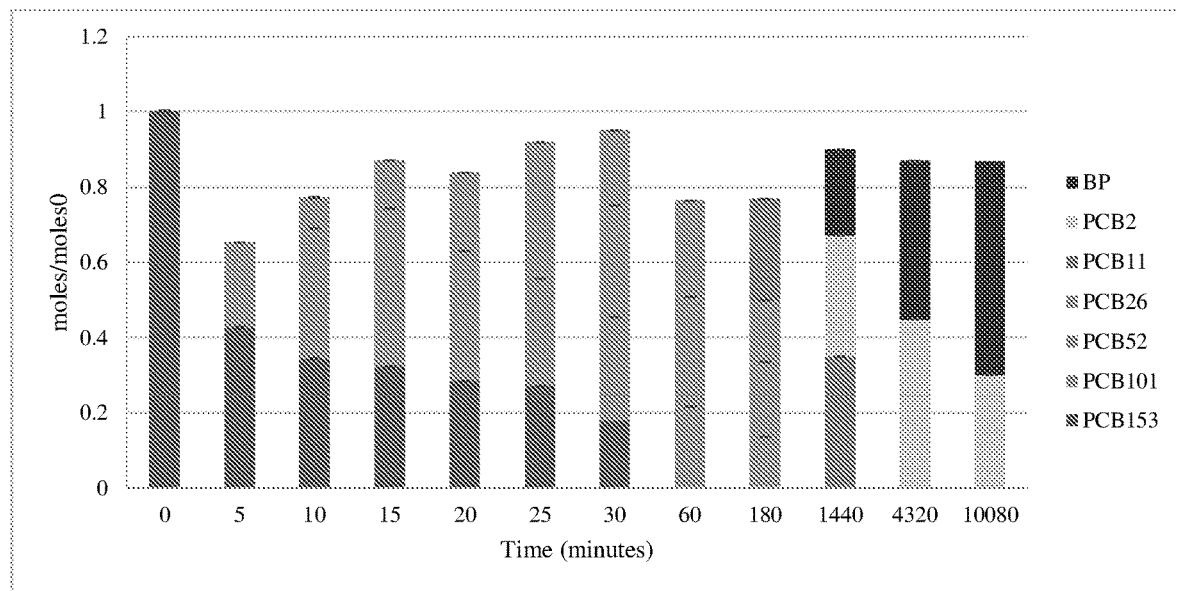
FIG. 35: shows distribution of product resulting from PCB 153 reduction by ZVMg in acidified 2-butoxyethanol.
Figure 36:
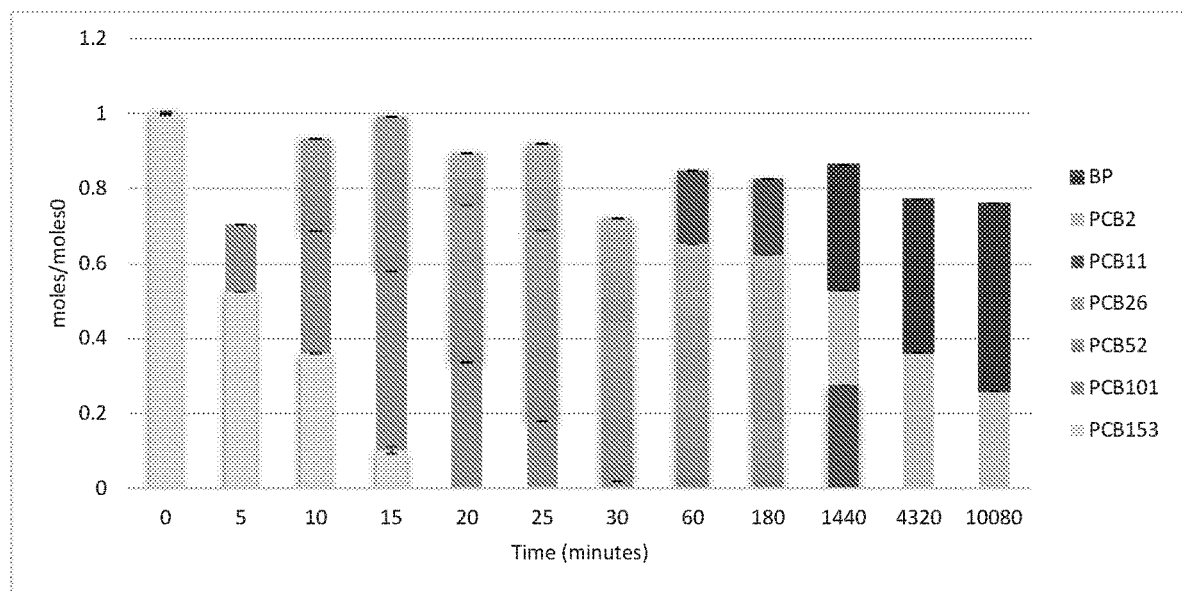
FIG. 36: shows distribution of product resulting from PCB 153 reduction by ZVMg/AC in acidified 2-butoxyethanol.

Mass spectrometry (GC-MS) analysis revealed that the degradation of PCB 153 yielded six byproducts in both reactions. FIG. 35 and FIG. 36 summarize the product distribution analysis of the chemical reduction of PCB 153 with ZVMg and ZVMg/AC in acidified 2-butoxyethanol, respectively. The mass balance at each sampling point was calculated as the ratio of the total PCB congeners measured to the initial PCB mass measured in the system. FIG. 35 shows a distribution of product resulting from PCB 153 reduction by ZVMg in acidified 2-butoxyethanol. FIG. 36 shows a distribution of product resulting from PCB 153 reduction by ZVMg/AC in acidified 2-butoxyethanol.

Schematic of the proposed dechlorination pathway for PCB153 by ZVMg and ZVMg/AC in acidified 2-butoxyethanol in Reaction 2 based on all byproducts observed at different times of the reaction over seven days by GC-MS. The green arrows indicate the pathway of the byproducts detected in these reactions. The congeners indicated in other two pathways represent the expected congeners based on the degradation results by acidified ethanol/EL. Interestingly, PCB 118 and its byproducts PCB 70 and PCB 67 were not detectable in this case even though they were observed when ethanol//EL was used as a solvent. PCB 101 is a plausible dechlorination product of PCB 153 indicating that the removal of chlorines in position para is preferable. Further dechlorination of PCB 101 resulted in the formation of PCB 52, and a plausible dechlorination product of the detected tetra congeners is 2,3',5-Trichlorobiphenyl (PCB 26) followed by the formation of 3,3'-dichlorobiphenyl (PCB 11). The later, was converted after 24 hours to form 3-chlorobiphenyl (PCB 2), and then the final product of the dechlorination reactions is biphenyl.

Reaction pathway 2 shows a schematic of the proposed dechlorination pathway for PCB 153 by ball-milled ZVMg or ZVMg/C in acidified 2-butoxyetanol based on degradation products observed.

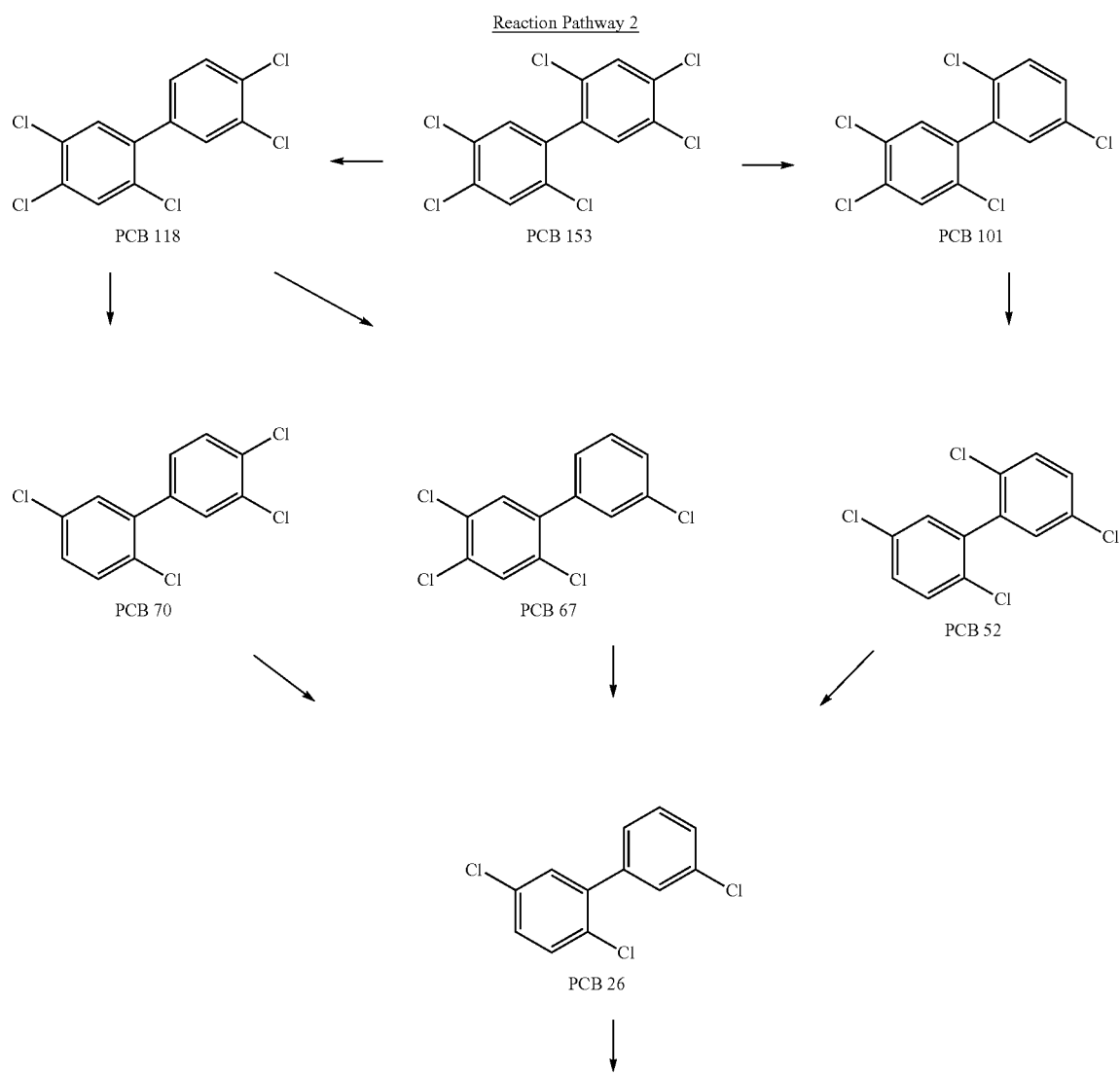

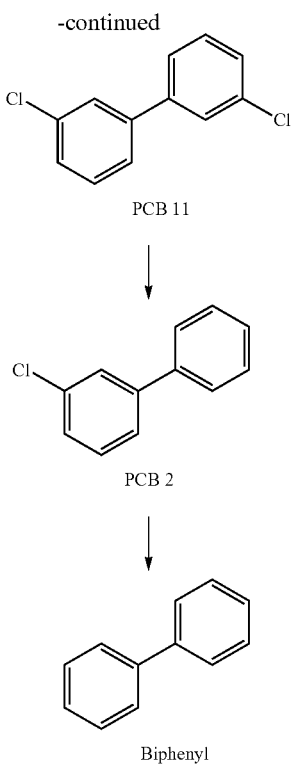

PCB 11

PCB 2

Biphenyl

Experimentally, the degradation products of PCB 153 that has been detected by GC-MS were confirmed by computational studies. The activation energies were calculated using ZVMg as a reduced metal and 2-butoxyethanol as solvent, though AC was still present within the solution it was omitted to simplify the calculations. The activation energies for each dichlorination reaction are presented in Table 6. More specifically, Table 6 shows the activation energies of PCB 153 dechlorination by ZVMg in acidified 2-butoxyethanol.

TABLE 6

| Pathway 1 | Ea (kcal/mol) | Pathway 2 | Ea (kcal/mol) | Pathway 3 | Ea (kcal/mol) |
|---|---|---|---|---|---|
| 153 to 101 | 21.481 | 153 to 118 | 25.775 | 153 to 118 | 25.775 |
| 101 to 52 | 21.175 | 118 to 70 | 22.334 | 118 to 67 | 22.429 |
| 52 to 26 | 27.958 | 70 to 26 | 23.212 | 67 to 26 | 21.538 |
| 26 to 11 | 26.473 | 26 to 11 | 26.473 | 26 to 11 | 26.473 |
| 11 to 2 | 29.569 | 11 to 2 | 29.569 | 11 to 2 | 29.569 |
| 2 to biphenyl | 30.072 | 2 to biphenyl | 30.072 | 2 to biphenyl | 30.072 |

Ea Activation energy

As can be seen in this table, the activation energies for removal chlorine from para positions are lower than the removal of ortho positions' chlorines. For example, the activation energy of formation PCB 101 by removal chlorine in para position is lower than the removal of chlorine from the ortho chlorine, and this prove the detection of PCB 101. The higher activation energy for removal the chlorine ortho from PCB 153 to form PCB 118 (25.78 kcal/mol) compared to the activation energy corresponding to the formation PCB 118 using ethanol/EL (23.65 kcal/mol) explain why it was not detected experimentally in the case of using 2-butoxyethanol. In conclusion, it seems that the activation energy remains lower with the dechlorination of congeners encompassing a torsion angle close to 90o compared to the ones that are more coplanar.

Efficacy of the System for Dechlorination of Low Chlorinated Biphenyls

Figure 37:
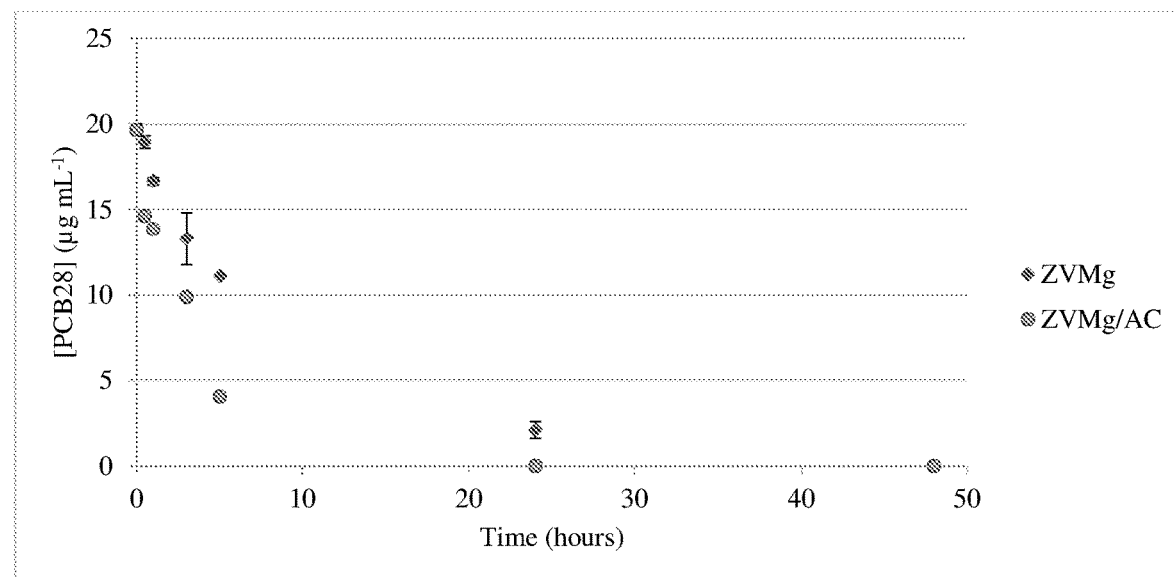
FIG. 37: shows comparison of the degradation of PCB 28 with the ZVMg, and ZVMg/AC of treatment in acidified 2-butoxyethanol.

To ensure that complete dechlorination is achieved over time by this new system 2,-4,4'-trichlorobiphenyl (PCB 28) was exposed to the same conditions as PCB 153 and the degradation kinetics were studied over time by GC-MS. The change of PCB 28 concentration vs. reaction time is graphically shown in FIG. 37. The degradation of PCB 28 occurred within the first 24 hours in both systems with a slightly faster reduction using ZVMg/AC. The combination of acidified 2-butoxyethanol with ZVMG removed PCB 28 from the initial 20 μg mL$^{-1}$ to almost 2 μg mL$^{-1}$ for 24 hours while complete transformation was achieved over ZVMg/AC. FIG. 37 shows a comparison of the degradation of PCB 28 with the ZVMg, and ZVMg/AC of treatment in acidified 2-butoxyethanol.

Dechlorination of PCB 28 Rate Constants

Figure 38:
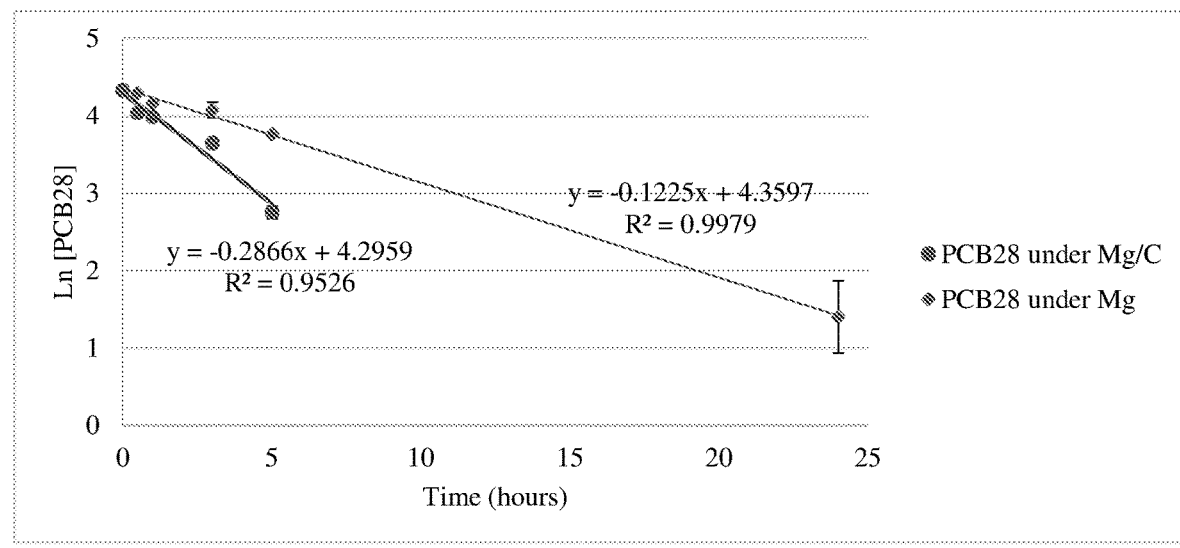
FIG. 38: shows pseudo first order plot of the degradation of PCB 28 using ZVMg and ZVMg/AC in an acidified 2-butoxyethanol.

Previous kinetic studies conducted on low chlorinated biphenyl has shown a pseudo-first order reaction in the presence of excess ZVM in different solvent systems include alcohols and co-solvent system[41, 59]. A similar trend was observed in the present systems in this study, FIG. 38 shows a pseudo-first order decay model with respect to the disappearance of PCB 28. The reaction with ball-milled ZVMg/AC yielded faster kinetics than the reaction with ball-milled ZVMg. This can be explained by the fact that AC can facilitate the activation process leading to improve the reaction kinetics of Mg[65]. The pseudo-first order rate constants obtained were k=0.2866 h$^{-1}$ for the reaction with ZVMg/AC and k=0.1225 h$^{-1}$ for the reaction with ZVMg. FIG. 38 shows pseudo first order plot of the degradation of PCB 28 using ZVMg and ZVMg/AC in an acidified 2-butoxyethanol.

Identification and Characterization of PCB 28 Degradation Products

Figure 39:
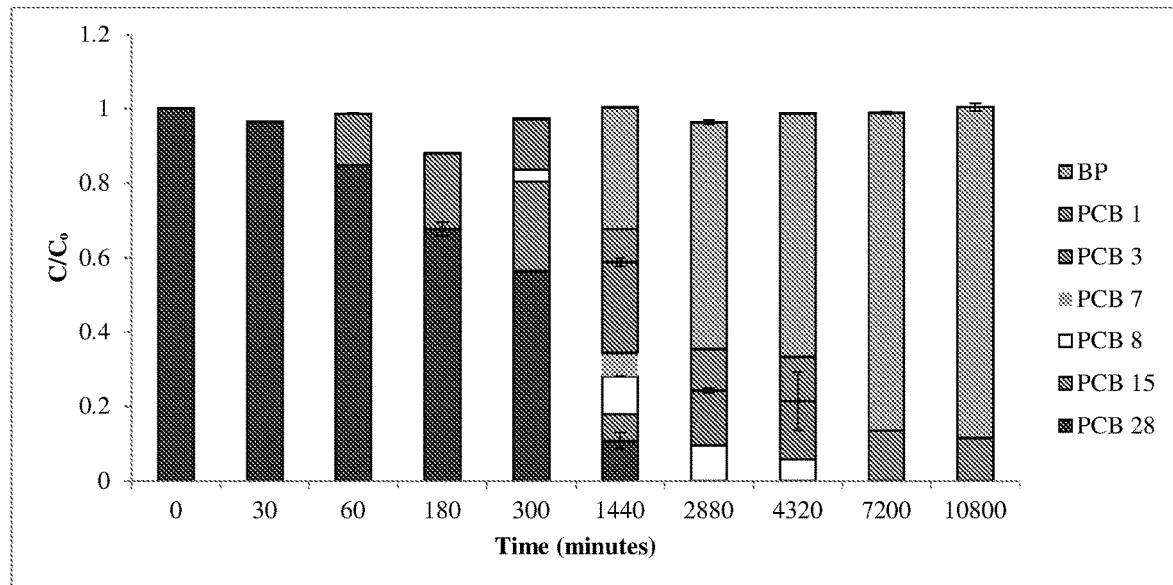
FIG. 39: shows distribution of degradation products resulting from PCB 28 reduction in acidified 2-butoxyethanol over ZVMg.
Figure 40:
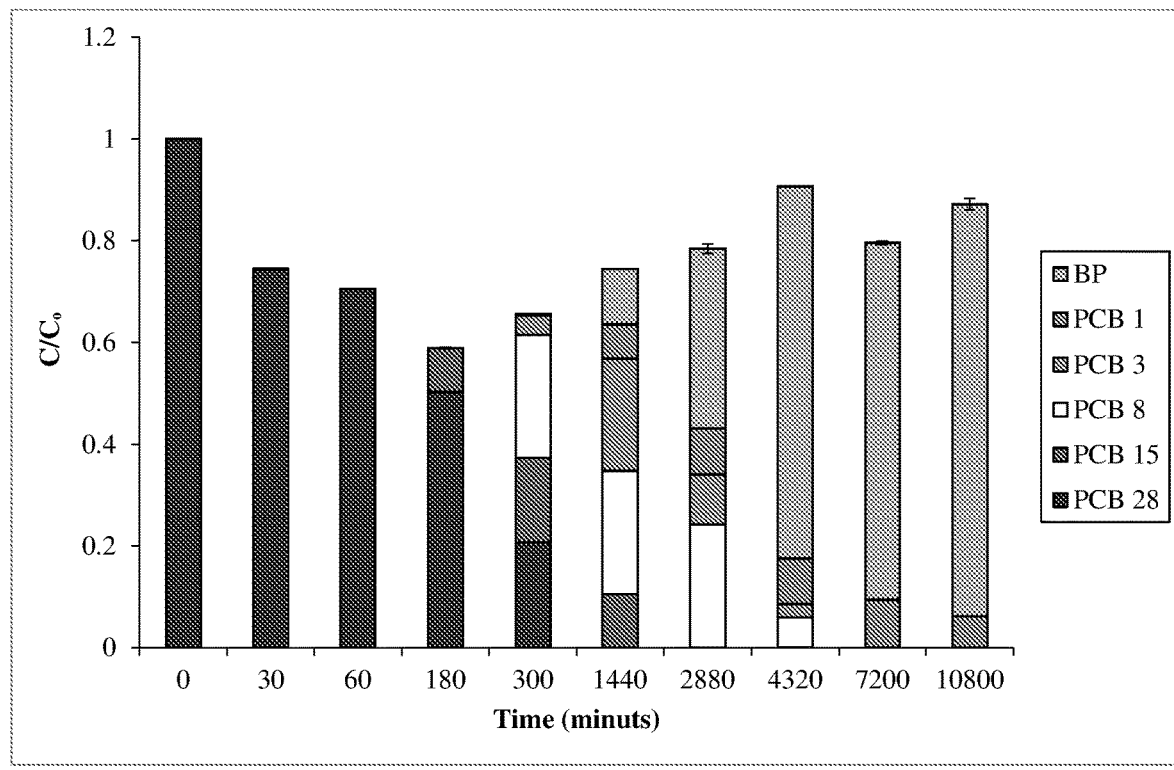
FIG. 40: shows distribution of degradation products resulting from PCB 28 reduction in acidified 2-butoxyethanol over ZVMg/AC.

Degradation of PCB 28 in 2-butoxyethanol by ZVMg and ZVMg/AC was confirmed by the disappearance of the parent congener and appearance of low chlorinated byproducts through GC-MS. The characterization of degradation products and the calculated mass balance at each sample point over one week are shown in FIG. 39 and FIG. 40. Time intervals between 5 and 24 hours and between 72 and 120 hours were omitted since the preliminary studies showed that no significant change in the concentration at these time intervals. A 90% conversion to biphenyl were obtained with ZVMg or ZVMg/AC in the presence of acidified 2-butoxyethanol. FIG. 39 shows distribution of degradation products resulting from PCB 28 reduction in acidified 2-butoxyethanol over ZVMg. FIG. 40 shows distribution of degradation products resulting from PCB 28 reduction in acidified 2-butoxyethanol over ZVMg/AC.

Based on the above results, the reductions of PCB 28 by ZVMg with and without AC in acidified 2-butoxyethanol proceeds through the pathway outlined in Reaction 3. Dechlorination of PCB 28 preferentially removes para-chlorines leading to form 2,4-dichlorobiphenyl (PCB 7) and 2,4'-dichlorobiphenyl (PCB 8). This outcome is expected due to the dechlorination of the meta and para-chlorines resulting in the elimination of co-planer like congener. However, low concentration of 4,4'-dichlorobiphenyl (PCB 15), which resulted from removal ortho chlorine of PCB 28, was observed in both reactions. Two isomers of monochlorobiphenyl (PCB 1 and PCB 3) were produced before the formation of biphenyl. Reaction 3 is a schematic of the proposed dechlorination pathway for PCB 28 by ball-milled ZVMg or ZVMg/C in acidified 2-butoxyetanol based on degradation products observed.

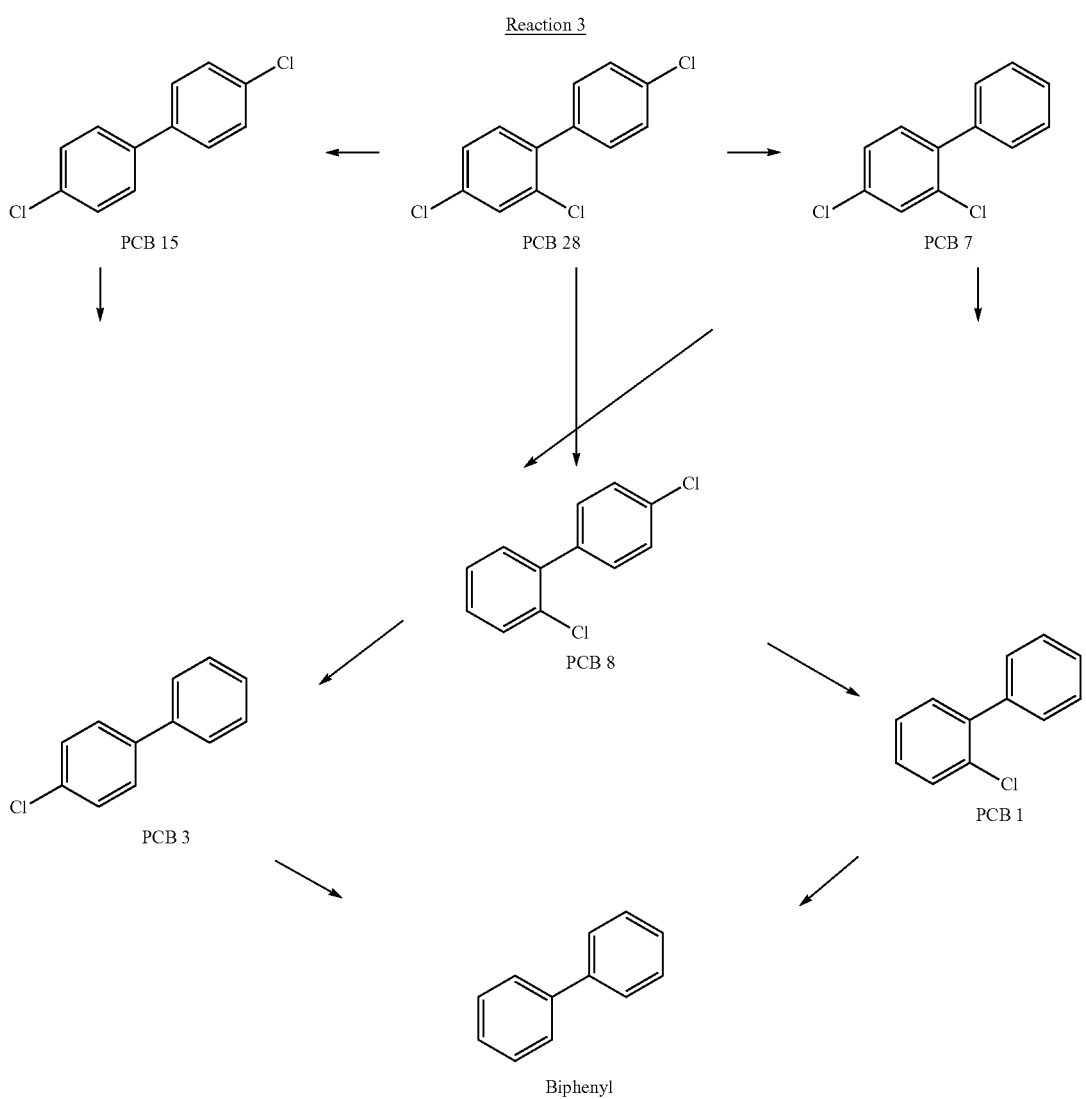

Reaction 3

Three pathways were proposed for the degradation of PCB 28 by ZVMg and ZVMg ball-milled with AC incorporated in acidified 2-butoxyethanol. The congeners concentration in pathway 1 (green arrows) and pathway 2 (red arrows) are generally higher than those in the third pathway with black arrows. Chlorine removal may take place at favorable sites that minimize steric hindrance which explain the appearance of 4,4'-Dichlorobiphenyl (PCB 15) within three hours before other di-congeners. However, the dominant congeners resulting from substituting the first chlorine in PCB 28 with hydrogen were PCB 15 and 2,4'-Dichlorobiphenyl (PCB 8), while 2,4-Dichlorobiphenyl (PCB 7) was close to the limit of quantification and was not detected with using ZVMg/AC. This observation was supported by calculating the activation energies of each dechlorination step (Table 7. From PCB 28 to PCB 15 or PCB 8 the activation energies were 26.556 and 26.915 kcal/mol, respectively, versus 28.432 kcal/mol for PCB 28 to PCB 7. Table 7 shows the activation energies of PCB 28 dechlorination by ZVMg in acidified 2-butoxyethanol.

TABLE 7

| Pathway 1 | Ea (kcal/mol) | Pathway 2 | Ea (kcal/mol) | Pathway 3 | Ea (kcal/mol) |
|---|---|---|---|---|---|
| 28 to 15 | 21.481 | 28 to 8 | 26.916 | 28 to 7 | 28.433 |
| 15 to 3 | 21.174 | 8 to 3 | 27.727 | 7 to 3 | 27.204 |
| 3 to biphenyl | 28.643 | 8 to 1 | 28.501 | 7 to 1 | 27.540 |
|  |  | 1 to biphenyl | 28.215 | 1 to biphenyl | 28.215 |

FIG. 72 shows GC-MS peak area as a function of PCB 28 and its byproducts concentration.

Conclusion

A PCB dechlorination reactions with ZVMg and ZVMg/AC in acidified 2-butoxyethanol (biodegradable and eco-friendly solvent) under ambient conditions were developed in this study. These reactions were applied for the dechlorination of PCB 153 and PCB 28, and high efficiencies were obtained. Contrary to ethanol/EL, 2-butoxyethanol system effectively removed all chlorines from either high chlorinated or low chlorinated PCBs to form biphenyl as the main byproduct even in the presence of AC. Therefore, a significance advantage of this system is the fact that it can be used as a combined process involving extraction of PCBs by 2-butoxyethanol, followed by reduction with ZVMg or ZVMg/AC. This method provides an attractive option for the in situ treatment of PCBs-containing building materials. Test the effectiveness of this method on the dechlorination of PCBs in actual PCB-laden paint or concrete is presented herein.

Example 4

The purpose of this example was to provide a laboratory evaluation of NMTS and AMTS using 2-butoxyethanol for remediation of PCB-contaminated paint field samples.

As discussed in Example 3, acidified 2-butoxyethanol can be employed in a hydrodechlorination reaction of PCBs through the use of ball-milled zero-valent magnesium (ZVMg) particles. It is known that 2-butoxyethanol has surfactant properties and has potential use in removing multiple layers of unwanted paint from painted structures. Therefore, this is one of the main advantages expected to be gained by using this solvent as a substitute for EL in the formulation of NMTS and AMTS as paint softener. This work introduces the development of two delivery systems for effective deployment of this treatment reaction to field samples. Two treatment systems formulated in this process, the Non-Metal Treatment System (NMTS) and the Activated Metal Treatment System (AMTS), are capable of extracting or extracting and degrading, respectively, trapped PCBs within a variety of building materials.

The proposed NMTS and AMTS are comprised of an absorbent matrix with thickening agents solvated by 2-butoxyethanol, while ZVMg ball-milled with activated carbon (AC) functions as a reducing agent in the AMTS. 2-Butoxyethanol in both systems is not only used to extract PCBs from the paint structure and provide a hydrogen source for the degradation of PCBs, but is also used to remove multiple thick layers of heavily weathered paint. The objectives were to test the 2-butoxyethanol NMTS/AMTS in the remediation of PCB-contaminated paint samples and to compare the effectiveness of one-step and two-step processes for PCB-laden paint remediation by these techniques. Because the treatment system effectiveness is a function of contact time, keeping the paste moist for an extended period to ensure continued extraction and degradation is desirable. Therefore, the evaporation rate of the solvent in this system was measured. An additional objective is to evaluate the ability of this new formulation to adhere to the vertical surfaces on which it will eventually be applied.

Experimental

Chemicals and Materials

Neat Aroclor standards were purchased from Accustandard and stock solutions of Aroclor 1260 and 1254 were prepared in absolute ethanol (Pharmco-AAPER). Micro-scale magnesium powder (2-4 µm) was obtained from Hart Metals Inc and activated carbon (charcoal G-60) was obtained from Matheson Coleman & Bell (Gardena, CA). Toluene (Optima®, 99.95%), concentrated sulfuric acid (Certified ACS Plus, 98.0%), potassium permanganate (Certified ACS, 99.5%), calcium stearate (powder, technical grade), polyethylene glycol (PEG) 8000 (Carbowax powder), and glycerol (laboratory grade) were purchased from Fisher Scientific (Pittsburgh, PA) and used as received. Glacial acetic acid (99.8% purity) was obtained from Acros Organics, (Morris Plains, NJ). PowderSorb was obtained from Applied Science and Advanced Technologies (Baton Rouge, LA). "Dennyfoil" aluminum-backed paper vapor barrier was purchased through Denny Sales Co. (Pompano Beach, FL).

Field Samples

Another set of building materials impacted with PCBs were sent from Old Rainer Brewery in Seattle in order to test the 2-butoxyethanol-NMTS/AMTS. These samples include four bags of paint chips and building materials which were collected from the exterior walls of three buildings in the site. Table 8 presents description of the received samples. Table 8 shows pretreatment conditions of field samples.

TABLE 8

| Sample | Description |
|---|---|
| 6 West Elevation (location 1) | Three large chips of paint, each red on one side, beige on the other with some greyish color. Three pieces of brick each covered in same paint. |
| 6 West Elevation (location 2) | Two large chips of paint, each red on one side and dark beige on the other. Four pieces of brick each covered in red paint. Red paint is easily removed from beige layer in large strips; beige paint generally adheres more strongly. |
| 18 South Elevation | Three large pieces of concrete with various small fragments each covered in two layers of paint: top layer green with yellow, bottom dark beige. Each layer binds strongly to the next; layers are difficult to isolate. |
| 20 East Elevation | Eight pieces of concrete each coated with two layers of paint: top layer black, bottom beige. Paint is firmly adhered to concrete and resists separation. |

Production of Ball-Milled ZVMg/AC

The mechanically ball-milling process of ZVMg/AC included mixing 76.5 g magnesium powder with 8.5 g of AC into the galvanized steel canisters (17.80 cm length and 5.03 cm in internal diameter). To each canister, sixteen stainless steel ball bearing (1.6 cm$^3$ diameter) were placed. The ball-milled of components were done in an argon atmosphere for 30 min using a Series 5400 Red Devil Paint Shaker.

Production of Treatment Systems

NMTS can be prepared in any quantity using the same proportions outlined in Table 1. For the field samples received from Seattle 280 g of NMTS was formulated. To start, 15.4 g of sorbent was coated with 15.4 g of glycerol in 2 L glass jar with airtight lid. 30.8 gg of calcium stearate and 15.4 g polyethylene glycol (8000 PEG) were transferred to the jar and mixed carefully by auger bit. In a separate container, 250.6 mL of 2-butoxyethanol and 2.7 mL of glacial acetic acid were combined. The liquid mixture was then added to the bulking agent jar with constant mixing for few minutes to ensure homogeneity. The airtight jar was closed and allowed to sit for 30 minutes for the NMTS to thicken before use.

To create AMTS, 35 g of ZVMg/AC was combined with 35 g of glycerol and mixed until the metal was thoroughly coated with glycerol. This mixture was then added to NMTS paste and at this point the mixture has new mass of 350 g. The liquid containing 3.5 mL of glacial acetic acid and 31.5 mL of 2-butoxyethanol was added to the gar.

Treatment Procedure

For evaluation of initial PCB concentrations, a small section of each paint sample was scraped off of its associated substrate and 1 g of this crushed paint was collected from each sample. A 0.25 inch masonry drill bit was used to sample 0.5 gm of the underlying material at depths from 0.0-0.5 inches from the exposed side of the substrate. The paint and substrate samples were extracted using 10 mL of toluene and 5 mL of ethanol, respectively, then analyzed for PCBs.

All samples were treated using the same conditions; first each sample was divided into regions with aluminum roofing tape (for samples comprised of multiple small pieces, samples were instead divided into groups). Then, a layer of 0.5 in thick NMTS or AMTS was applied to each section and sealed in place with aluminum roofing tape around a layer of aluminum foil. The treatment systems were stored on a bench top at ambient conditions for two weeks. Sampling was conducted by removing the foil layer protecting the treatment system and collecting the treatment system for analysis. Paint samples without substrate were then cut around the treatment area to facilitate paint removal, while paint samples on concrete or brick substrates were manually removed using a paint scraper. To remove any residual paste on the paint surfaces prior to sampling, the paint was wiped with denatured alcohol. Half of the treated samples were tested after one week of exposure to NMTS and AMTS and the other half were sampled after two weeks of treatment.

Extraction and Clean up

For extraction PCBs from different building materials, a measured 1 gm of dried paint and NMTS/AMTS and a portion of 0.5 gm of concrete/brick powder was ultrasonically extracted in 10 mL toluene and 5 mL ethanol, respectively (EPA Method 3550C)[52]. After sonication, all samples were centrifuged for five minutes and the supernatants were then cleaned up using EPA Method 3665 (Sulfuric Acid/Permanganate Clean-Up)[53].

Analysis of Aroclor

PCBs present in samples were analyzing through gas chromatography with mass spectrometry an Agilent Technologies 7990 GC/MS system equipped with an autosampler. Separation of PCBs was performed on a 30 m Restek RTX®-5 column (0.25 mm i. d., 0.25 µm film thickness). The carrier gas in this instrument was Helium with a constant flow set to 1.3 mL/min. The injector temperature set to 250° C. Full scan mode was used to run the MS where the ion source temperature set to 280° C.

To quantify PCBs, a modification of EPA Method 8082A (Polychlorinated Biphenyls by Gas Chromatography) was used in which the concentration of Aroclor was determined by the summing the peak areas of the five most prominent peaks[54]. The internal standard PCB 209 was added for quantitation purposes.

Solvent Evaporation Rate Studies

Figure 41:
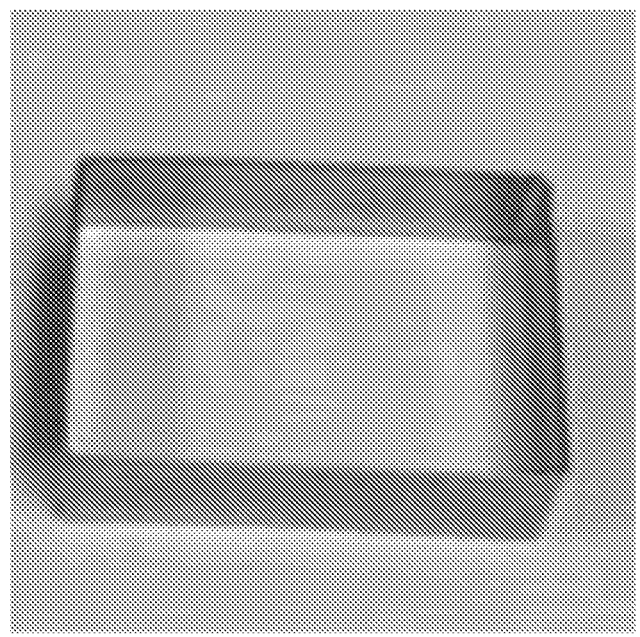
FIG. 41: shows a mold used to shape NMTS.

Three types of NMTS were prepared using different solvents: one with ethanol/d-limonene, one with ethanol/EL, and one with 2-butoxyethanol. The metal with square shape in FIG. 41 was used to mold each formula. That was eventually placed on a pre-weighed watch glass. Each sample resulted in a thickness of 1.6 cm with the surface area of the NMTS being 69 cm$^2$. A Denver Instruments A160 balance was used to monitor the mass of each sample, then the change in mass causes by evaporation of the respective solvent was noted. FIG. 41 shows square shape metal used to mold NMTS.

Adherence of the Treatment System Paste

One of the qualitative performance objectives is an even, consistent, and durable distribution of paste on the surface to be treated. This was evaluated by assessing the adherence of a 0.5-inch thick layer of the NMTS to a tile surface over the time period of treatment. The paste was evenly applied to the tile by hand using a form with a depth of 0.5 inches. The paste was applied at intervals over the course of one week with the time after mixing recorded for each application. Paste formulations were stored in sealed containers between mixing and application. Each paste was visually inspected daily over the course of another week to determine whether it was able to adhere to the surface when held vertically. For this, five different formulations of NMTS beside the standard formula were prepared by increasing the concentration of 2-butoxyethanol in the system while reducing the relative concentrations of other components (Table 9). Table 9 shows composition of six different formulations of NMTS.

TABLE 9

| | Mass percentage (%) | | | | | |
| --- | --- | --- | --- | --- | --- | --- |
| | 1 | 2 | 3 | 4 | 5 | 6 |
| PowderSorb | 5.5 | 5 | 4.5 | 4 | 3.5 | 3 |
| Calcium Stearate | 11 | 10 | 9 | 8 | 7 | 6 |
| PEG 8000 | 5.5 | 5 | 4.5 | 4 | 3.5 | 3 |
| Glycerol | 5.5 | 5 | 4.5 | 4 | 3.5 | 3 |
| 2-butoxyethanol | 71.5 | 74 | 76.5 | 79 | 81.5 | 84 |
| Glacial acetic acid | 1 | 1 | 1 | 1 | 1 | 1 |

Results and Discussion

Treatment of Field Samples

Initial extractions of PCBs from the paint samples into toluene found that the samples to be contaminated with mixture of Aroclor 1254 and Aroclor 1260 except samples collected from 18 east elevation building. The degradation of PCBs in each building are discussed below.

Treatment of 6 West Elevation Paint Samples

Figure 42:
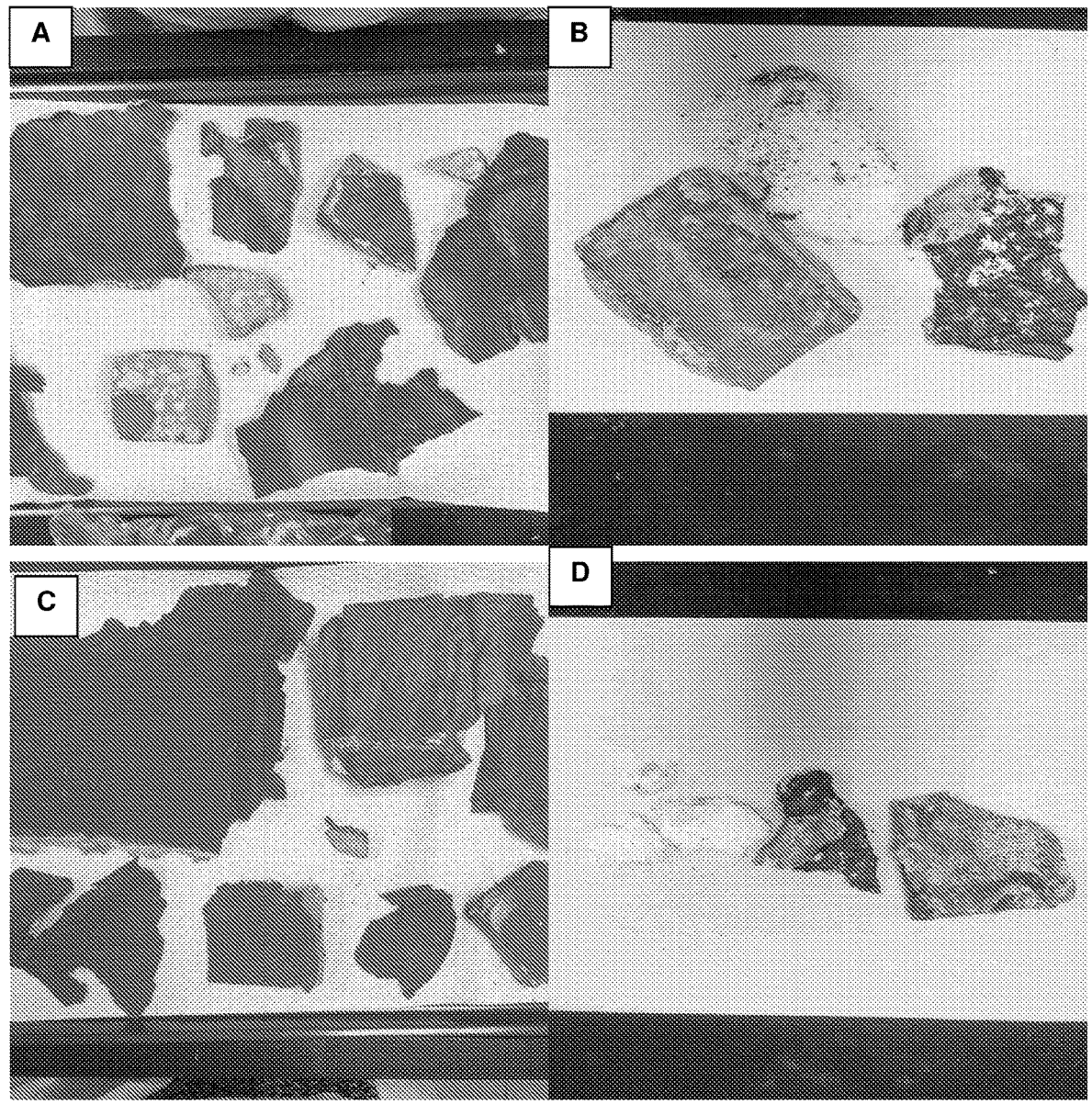
FIG. 42A: shows west elevation samples, specifically samples collected from location 1 prior to treatment.
FIG. 42B: shows west elevation samples, specifically samples collected from location 1 after one-week treatment with NMTS.
FIG. 42C: shows west elevation samples, specifically samples collected from location 2 prior to treatment.
FIG. 42D: shows west elevation samples, specifically samples collected after one-week treatment with AMTS.
Figure 43:
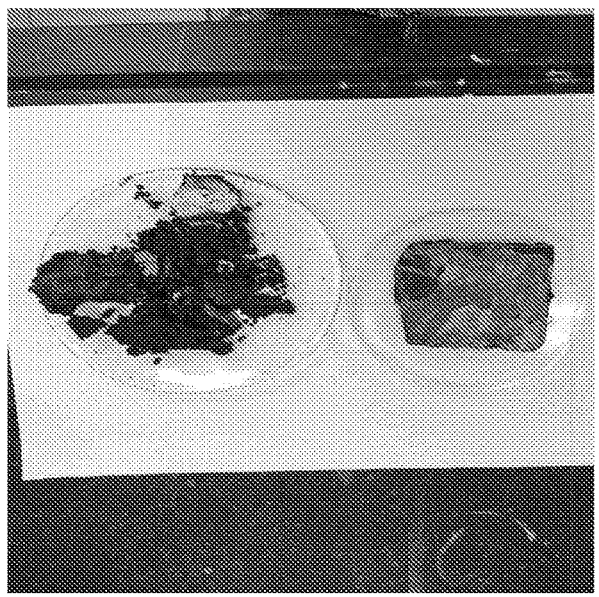
FIG. 43: shows 6 west elevation samples after one-week treatment with AMTS.

Two different bags were sent from building 6 west elevation where the samples collected from two different locations. FIG. 42 shows the samples for building 6 west elevation from location 1 and location 2 prior to analysis and after one week of treatment with NMTS and AMTS. FIG. 42 shows 6 west elevation samples A) Samples collected from location 1 prior to treatment, B) Samples collected from location 1 after one-week treatment with NMTS, C) Samples collected from location 2 prior to treatment. D) Samples collected After one-week treatment with AMTS. FIG. 43 shows 6 west elevation samples after one-week treatment with AMTS.

Figure 44:
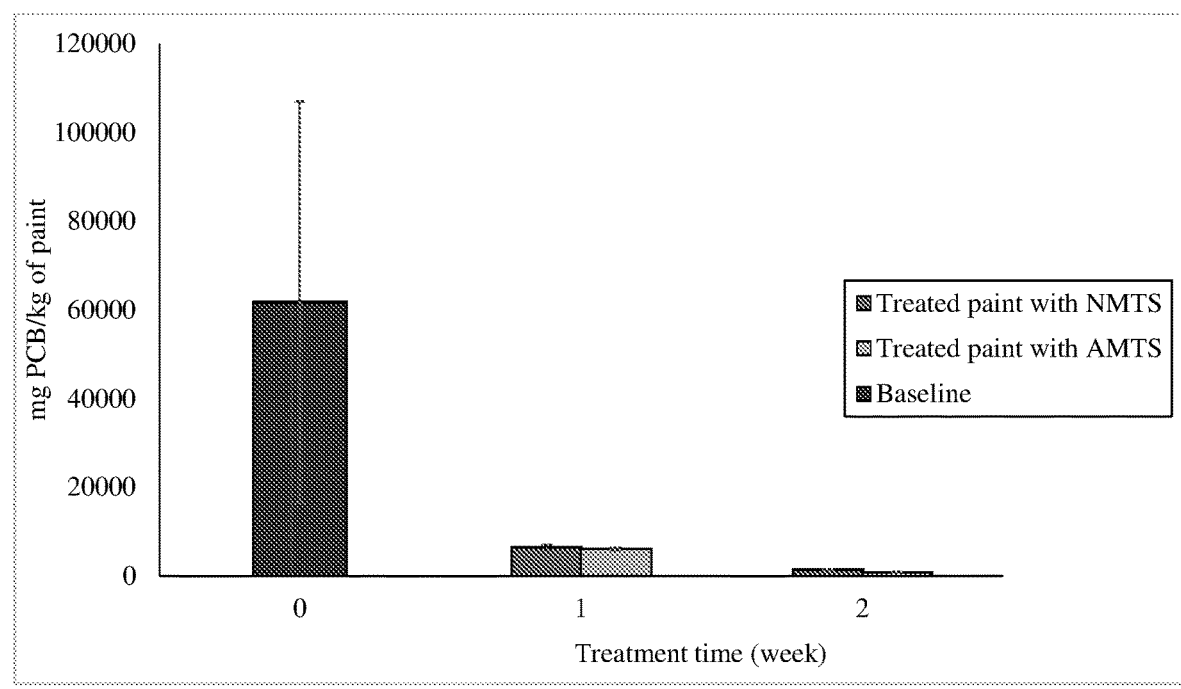
FIG. 44: shows average PCB concentrations in 6 west elevation 1 paint over treatment time.
Figure 45:
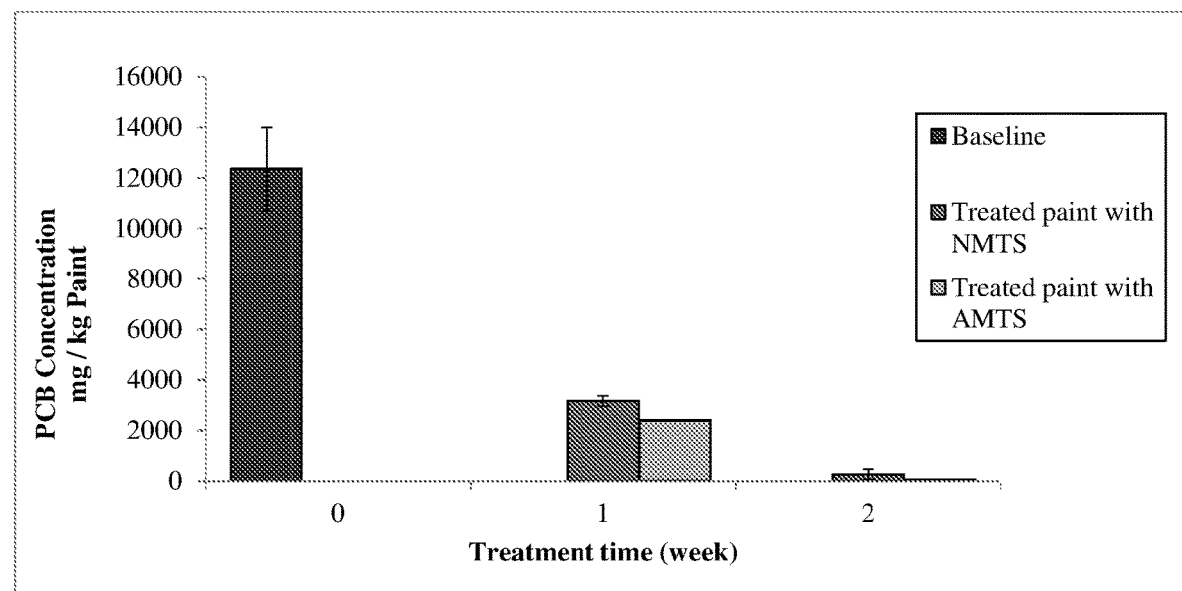
FIG. 45: shows average of PCBs concentration in 6 west elevation 2 paint over treatment time.

After treatment complete removal of all layer of paint from brick was achieved (FIGS. 42 B and D). The red layer and all inner beige layers were peeled off from the brick as one piece when treatment pastes were removed. Due to the high density of AMTS, the paint was adhered to the AMTS as shown in FIG. 43. Portions of paint, NMTS, and AMTS (1 gm each) were analytically weighed into vials and extracted. The weekly samples were analyzed to determine the PCB concentrations left on the surfaces (FIG. 44 and FIG. 45). FIG. 44 shows average PCB concentrations in 6 west elevation 1 paint over treatment time. FIG. 45 shows average of PCBs concentration in 6 west elevation 2 paint over treatment time.

The initial PCBs identified in paint samples varied greatly in concentration between the two locations and even between two samples collected from same location. Analyzing indicated that concentrations varied from 10698.16 to 107051.90 mg/kg paint. The large deviation in initial concentration of PCB is expected on historical structures such as Old Rainer Brewery buildings where either the contaminated layer(s) of paint had flaked off or migrates in surrounded areas over time or the surface was not evenly coated with PCB-impacted paint. This result in variation of PCB concentration even within small distances of sampling points[24].

As can be seen from FIG. 44 and FIG. 45, after one week of treatment approximately 89% of the PCB initial concentration was removed from the paint, after two weeks of treatment another 10% of the initial PCB concentration was removed. In total 99% of the initial PCB concentration was removed from the contaminated surface with just two weeks of treatment.

Figure 46:
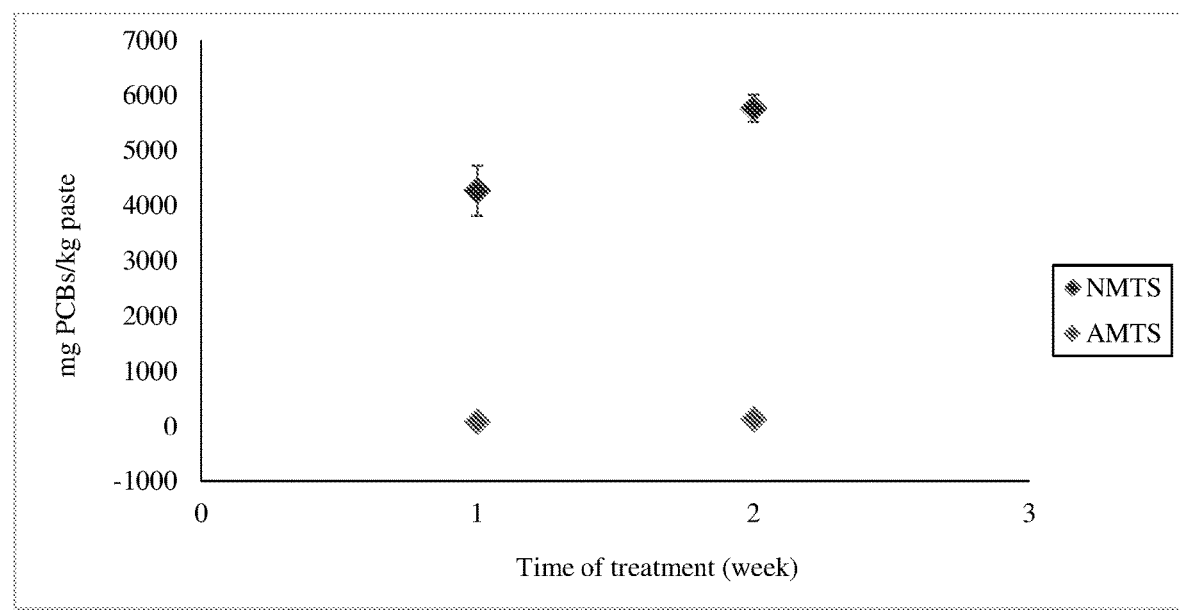
FIG. 46: shows average PCB concentration in 6 west elevation treatment systems over time.

FIG. 46 illustrates the concentration of PCBs in the treatment system pastes as a function of treatment time. The NMTS data demonstrates that PCB extraction continues over the course of treatment as the PCB concentration in the paint decreases while the PCB concentration of the treatment system paste increases. The AMTS concentrations remained predictably low, while the paint concentration continued to decrease, indicating that the sorption and dechlorination processes worked in parallel with the Mg/AC continuing to degrade the collected PCBs. Previous studies with ethanol as solvent demonstrated an accumulation of PCBs in the AMTS as treatment progressed for several weeks. Contrary to 2-butoxyethanol, this accumulation indicates that the ethanol AMTS suffers reduced efficiency and reactivity over time as the solvent evaporates. It is important to note that one advantage of using 2-butoxyethanol as solvent is this significant increase in the effectiveness of AMTS in removing PCBs from paint, to a level comparable with the NMTS. FIG. 46 shows average PCB concentration in 6 west elevation treatment systems over time.

Treatment of 20 East Elevation Paint

FIG. 47 shows the samples for building 9NPW prior to analysis and after one week of treatment with NMTS. More specifically, FIG. 47 shows 20 East Elevation samples A) Prior to treatment, B) After one-week treatment with NMTS. In sampling the NMTS paste, it was noted that both layers of paint (black and beige) came off in one piece with the paste. Only a thin layer of beige paint remained on the crack of the concrete, however this layer was very soft and easy to remove by spatula. The weekly analysis PCB concentration is presented in FIG. 48. FIG. 48 shows average of PCBs concentration in 20 east elevation paints over treatment time.

The NMTS and AMTS were seen to be capable of reducing PCB concentrations in painted concrete pieces from 31,551±5138 mg PCB/kg paint to 2170±386 mg PCB/kg paint over the course of two weeks of treatment by NMTS. Higher reduction to 1244±59 mg PCB/kg paint was achieved by utilizing AMTS. This evidence supports that the one-step remediation process can be applied by using 2-butoxyethanol AMTS even with highly concentrated structures, like those seen in the Old Brewery Rainer samples.

The PCB contamination in this group of painted concrete samples was not limited to the paint surface. Initial analysis of the concrete indicated that Aroclors were present in the underlying materials of building 20 east elevation (40.76 mg/kg concrete) while PCBs were not detected in 6 west elevation brick samples. However, after application the treatment systems for two weeks the concentration was dropped to 13.91±0.42.

Treatment of 18 South Elevation Paint

Figure 49:
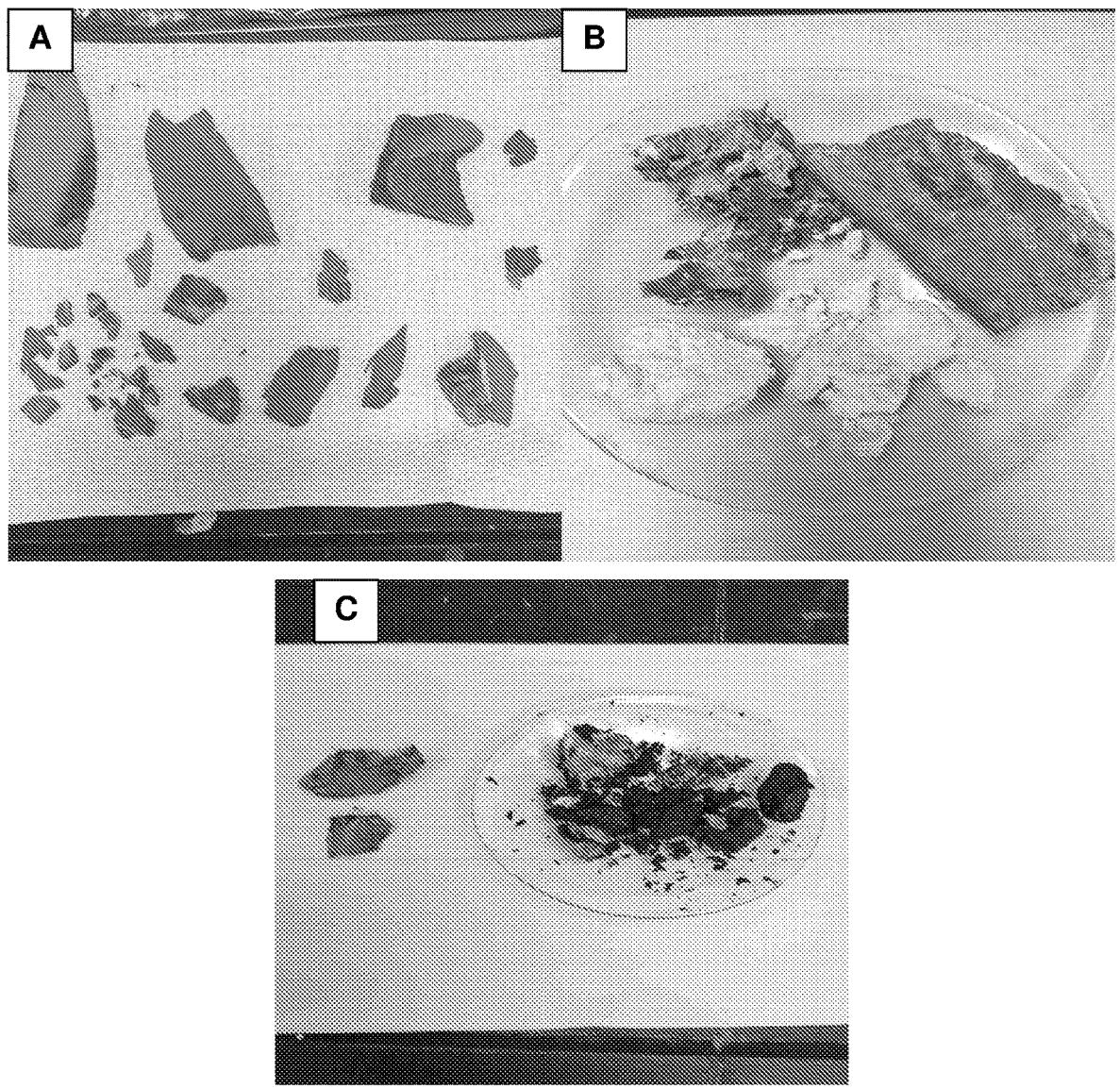
FIG. 49A: shows 18 South East samples prior to treatment.
FIG. 49B: shows 18 South East samples after one-week treatment with NMTS.
FIG. 49C: shows 18 South East samples after one-week treatment with AMTS.

From the initial evaluation, Aroclors were not detectable in all paint and concrete samples that collected from this building. This suggest that by the time of sampling, previous renovation work on building 18 south elevation had removed PCB-laden building materials or mixtures of PCB were not homogenous at the time they were applied. However, both treatment systems (NMTS and AMTS using 2-butoxyethanol) were applied to these samples in order to investigate the ability of the new formulations to remove the paint from the underlying materials. FIG. 49 shows the samples prior to analysis and after one week of applying NMTS and AMTS. More specifically, FIG. 49 shows 18 South East samples A) Prior to treatment, B) After one-week treatment with NMTS, C) After one-week treatment with AMTS.

Another important advantage of using 2-butoxyethanol as solvent in the treatment system formulations is complete removal of all paint layers from brick and concrete surfaces after 5 days of treatment. Alternative removal methods are typically limited to such harsh treatments as sandblasting, which not only have the potential to damage underlying surfaces, but will effectively volatilize any remaining PCB contamination as the resultant dust is spread, creating a greater hazard for remediation crews. The Table 10 below shows the conditions of each paint sample after the course of seven days of exposure to treatment systems. Table 10 shows post-treatment conditions.

TABLE 10

| Sample | Description |
| --- | --- |
| 6 West Elevation (location 1) | The paint was removed in one, soft layer with no residual paint left on the brick. |
| 6 West Elevation (location 2) | The paint was removed in one, soft layer with no residual paint left on the brick. |
| 20 East Elevation | The paint was, for the most part, removed in a single, soft layer. Residual paint on concrete had to be removed with a spatula. |
| 18 South Elevation | The paint was, for the most part, removed in a single, soft layer. Very little of residual paint on concrete had to be removed with a spatula. |

Treatment Systems' Solvent Evaporation Rate

The solvent is of utmost importance to the treatment system because it is crucial for the removal of PCBs from the contaminated material as well as their degradation. The structures to be remediated by these systems are on a much larger scale than can feasibly be replicated in the laboratory. Field use will require longer application times as well as direct exposure to the elements, necessitating improved sealing measures and potentially longer sealant times. Therefore, studying how long the treatment system stays adequately solvated before sealing is very important. However, the evaporation rate of each treatment system is more complex than the evaporation of a pure solvent due to the various components present, as well as the relationship between the solvent and the treatment system surface.

Figure 50:
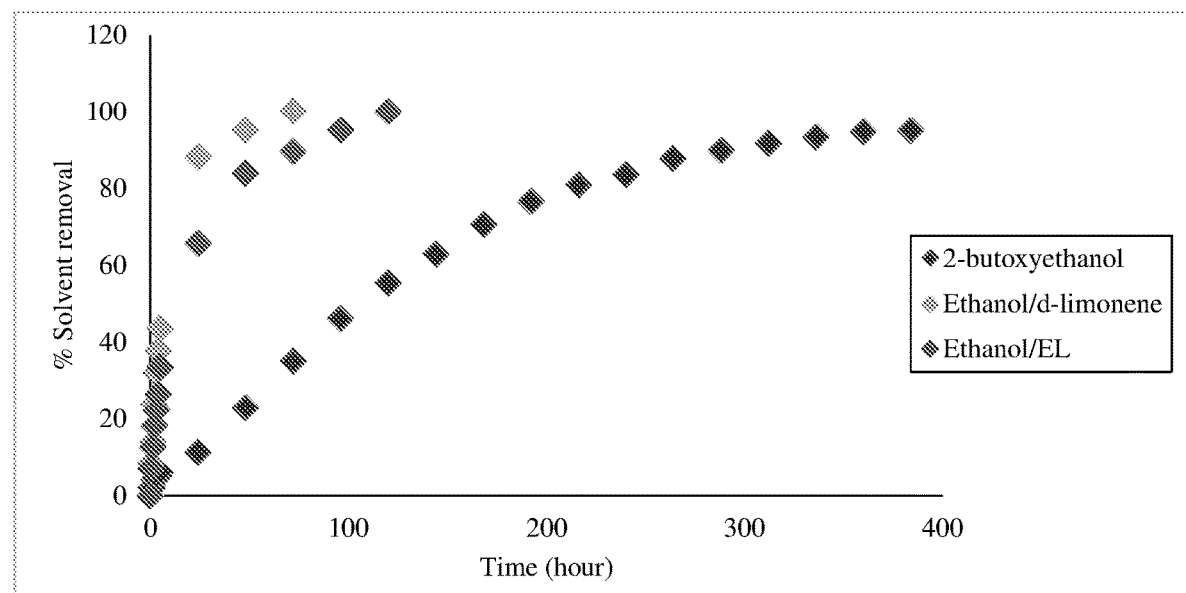
FIG. 50: shows Evaporation tracking of the solvent used for NMTS.
Figure 51A:
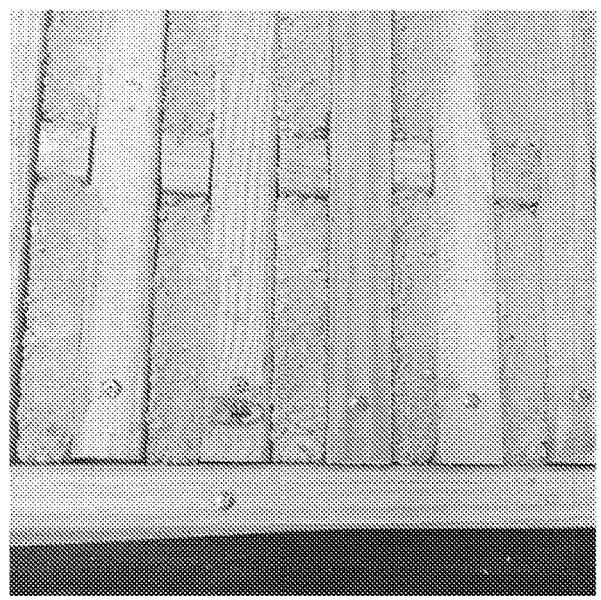
FIG. 51A: shows casting concrete into a wood mold.
Figure 51B:
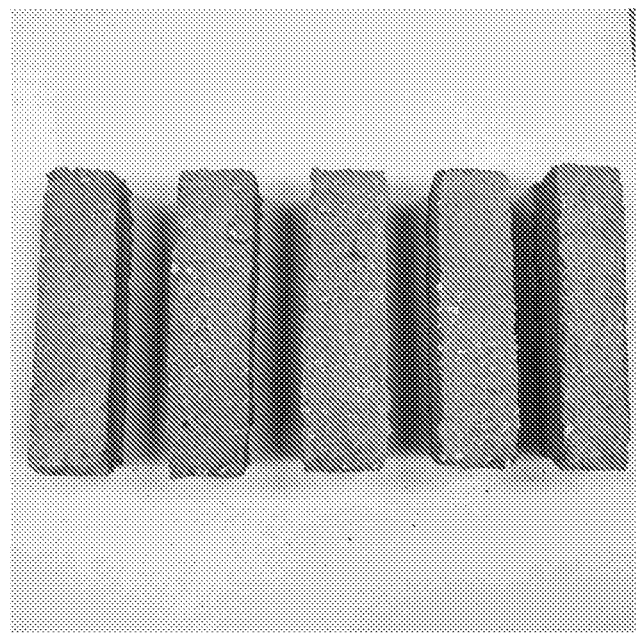
FIG. 51B: shows concrete bars made with a wood mold.
Figure 51C:
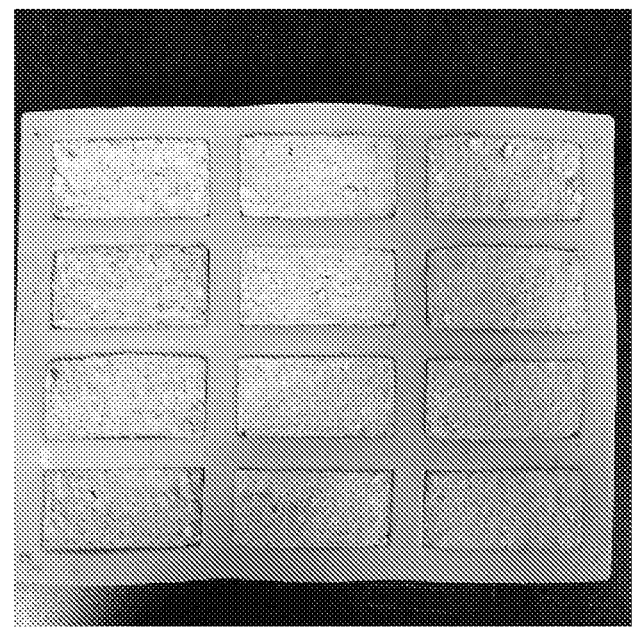
FIG. 51C: shows casting concrete into a silicon mold.
Figure 51D:
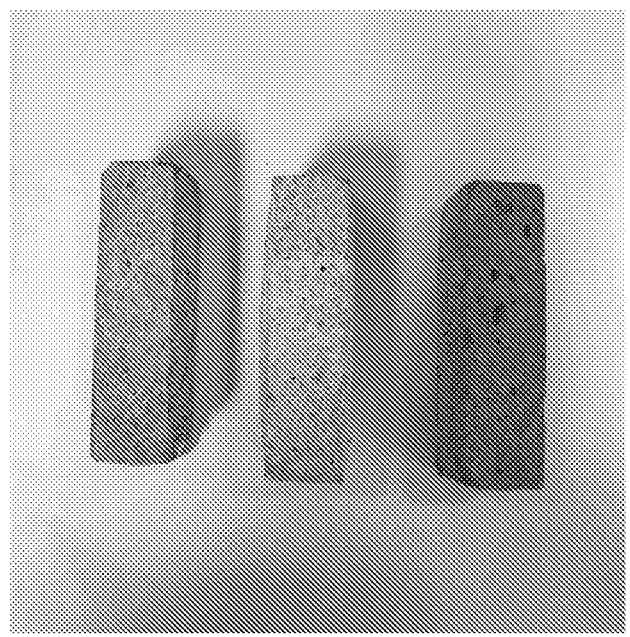
FIG. 51D: shows casting concrete bars made with a silicon mold.

It has been proven that the surface area of the treatment system affects the evaporation rate of its solvent, therefore, all three formulas of NMTS in this study had the same surface areas and were the same thickness. FIG. 50 shows the rate of evaporation when ethanol, ethanol/EL (90:10), and 2-butoxyethanol were used as solvents in the NMTS formula. When 2-butoxyethanol is used in the formulation the paste stays moist for 21 days, however, when EtOH:EL is used the paste dries out and loses efficiency after 5 days. These results favor use of treatment systems with 2-butoxyethanol, which has a much higher boiling point, as it may not require a vapor barrier during remediation. FIG. 50 shows evaporation tracking of the solvent used for NMTS.

Adherence of the Treatment System Paste to Vertical Surface

Table 10 shows the results of paste system adherence when each tile was held vertically. NMTS incorporating 71.5%, 74% and 76.5% 2-butoxyethanol showed rapid and steady adherence within 30 minutes. As the percentage of solvent increased, the time needed for the paste to cure after mixing in order to sufficiently adhere without running down the surface also increased: treatment pastes containing 79% solvent needed more than 1 hour to stick to the tile surface. By increasing the solvent percentage to 81.5%, or 84% of the total mass, the formulations stuck to the tile after 24 and 48 hours respectively.

This behavior is especially important when compared with that of ethanol- or ethanol/EL-based systems, which had a more watery consistency and required at least two hours of cure time in a sealed container prior to adhesion to the surface. The molecular structure of 2-butoxyethanol is significant in this regard, with its alcohol head group being hydrophilic and its alkyl tail being lipophilic. The same properties which make 2-butoxyethanol a good surfactant provided the desired adherence in the paste formulations. Table 11 shows adherence observations of different NMTS Formulations.

TABLE 11

|  | Standard | 1 | 2 | 3 | 4 | 5 |
|---|---|---|---|---|---|---|
| 30 min | +[A] | + | + | −[B] | − | − |
| 1 hour | + | + | + | − | − | − |
| 3 hours | + | + | + | + | − | − |
| 5 hours | + | + | + | + | − | − |
| 1 day | + | + | + | + | + | − |
| 2 days | + | + | + | + | + | + |
| 3 days | + | + | + | + | + | + |
| 6 days | + | + | + | + | + | + |
| 7 days | + | + | + | + | + | + |

Plus and minus are time point observations
[A] Plus represents paste stuck to tile when vertical
[B] Minus represents paste ran down tile when vertical Conclusion Non-destructive and eco-friendly in situ treatment systems were proposed in this work. New NMTS and AMTS formulations were developed by replacing the solvent with an alternate 2-butoxyethanol in order to increase the treatment efficiency on the PCB contamination removal. Application of these new treatment systems on a set of paint chips and building materials impacted with high concentration of PCBs from the field site promoted good adherence to the treated surfaces resulted in complete removal of all contaminated layer of paint. The PCBs' degradation was greater than 99% of the initial concentration after course of two weeks of treatment. The use of acidified 2-butoxyethanol and ZVMg over activated carbon permitted the extraction and destruction of PCBs from on-site in one-step treatment, therefore, no need to transport contaminated materials from the site. Furthermore, ability to treat PCBs without needing to destroy the building or structure so that the option exists for reuse of the building or structure.

Example 5

The purpose of this example was to demonstrate remediation of polychlorinated biphenyl-contaminated concrete using non-metal and activated metal treatment systems. An objective of this study was to investigate the feasibility of ethanol, which is used for NMTS and AMTS preparation, to sorb into the concrete structure. This investigation encompassed the absorption of ethanol-associated PCBs into laboratory-prepared concrete over time and at different distances from the source. Other solvent systems such as absolute ethanol/ethyl lactate (ethanol/EL) and 2-butoxyethanol were also tested as alternatives to ethanol. In addition, the ability of the acidified ethanol/EL NMTS and acidified 2-butoxyethanol NMTS to transport PCBs out of concrete were determined. Combining the NMTS with zero-valent magnesium over activated carbon (ZVMg/AC), thereby generating new formulations of AMTS, successfully extracted and degraded PCBs from PCB-laden concrete.

Experimental

Chemicals and Materials

PCB congeners in solid form were purchased from Accustandard (New Haven, CT), and used without further purification. Toluene (Optima®, 99.95%), concentrated sulfuric acid (Certified ACS Plus, 98.0%), potassium permanganate (Certified ACS, 99.5%), calcium stearate (powder, technical grade), polyethylene glycol (PEG) 8000 (Carbowax powder), and glycerol (laboratory grade) were obtained from Fisher Scientific (Pittsburgh, PA). Absolute ethanol (USP grade) was obtained from Pharmco-AAPER and used without any further purification. Glacial acetic acid (99.8% purity), ethyl L(−)-lactate (97.0%) and 2-butoxyethanol (99.0%) were obtained from Acros Organics, (Morris Plains, NJ). Micro-scale magnesium (2-4 μm) was obtained from Heart Metals (Tamaqua, PA) and activated carbon (charcoal G-60) was obtained from Matheson Coleman & Bell (Gardena, CA). PowderSorb was obtained from Applied Science and Advanced Technologies (Baton Rouge, LA). Alphagaz™ nitrogen and helium gases for use with GC-ECD were obtained from Air Liquide (Orlando, FL). Nylon filters (0.45 μm pore size) were obtained from Fisher Scientific (Pittsburgh, PA). America Portland cement, sand, gravel, and aluminum insulation vapor barrier were purchased commercially.

Production of Ball-Milled ZVMg/AC

The mechanical ball-milling process of ZVMg/AC included mixing 76.5 g magnesium powder with 8.5 g of AC into the galvanized steel canisters (17.80 cm length and 5.03 cm in internal diameter). To each canister, sixteen stainless steel ball bearing (1.6 cm$^3$ diameter) were placed. The ball-milled of components were done in an argon atmosphere for 30 min using a Series 5400 Red Devil Paint Shaker.

Concrete Preparation

Fresh concrete mixture was prepared in the laboratory according to Civil Engineering department at UCF. America Portland Cement Type I was used as cementitious materials and sand was used as fine aggregate. Gravel with the particle size of 0.093-0.183 inch was used as coarse aggregate in the preparation of concrete mixture. The masses of cement, sand and gravel in the mixture are 300, 300 and 600 g, respectively, and the water-to-cement ratio equals 0.50. After being mixed, part of the mixture was casted in silicon molds with the dimensions of 1×1×3 inch$^3$ (FIG. 51 A), and the other part was casted in wood molds with the dimensions of 1×1×6 inch$^3$ (FIG. 51 C). All molded specimens were cured by lightly wetting the surface with water two to three times a day for one month. At the age of 30 days, the specimens were taken out to sorption experiments.

Sorption Experiments of Organic Solvent-Associated PCB into Concrete

Figure 52:
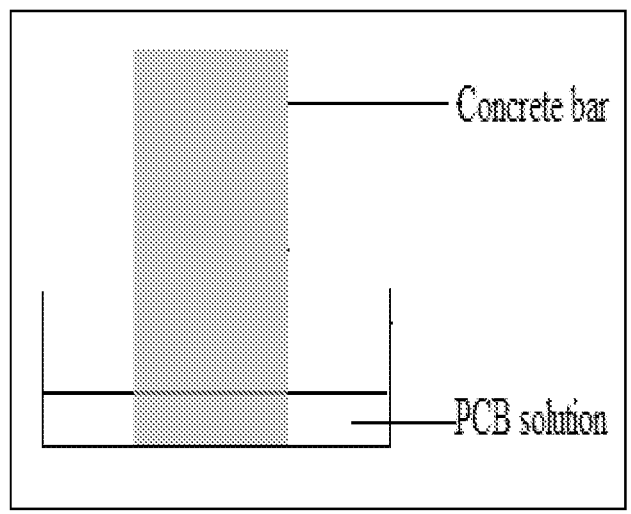
FIG. 52: shows schematic of sorption experiments of organic solvent-associated PCB into the concrete.

To study the absorption of ethanol as well as to incorporate the PCBs into the lab-made concrete, 20 lab-made concrete bars with length 6 inches and 3 bars with length 3 inches were used. Each concrete bar was immersed in a 100 mL Pyrex beaker containing 20 mL of PCB 153 in ethanol (200 µg mL$^{-1}$), with the PCB solution surface 0.5 inch higher than the lower surface of the bars as shown in FIG. 52. Two experiments were conducted to compare the effectiveness of different solvent systems as alternatives to ethanol in which 3 bars were immersed in 20 mL PCB153 in ethanol/ethyl lactate (90:10) and 3 bars were immersed in 20 mL of PCB 153 in 2-butoxyethanol for four weeks. The beakers were put in a 2-L glass canning jar with an airtight cap and sealed by Parafilm®. The jar was then placed on a bench at ambient conditions. At the scheduled times, concrete specimens were taken out and dried in an oven which was maintained at 50° C. for 24 hours, then cooled overnight at room temperature. Eight of the PCB-laden concrete bars were kept for treatment experiments, and the remaining bars were sampled for PCB concentration. FIG. 51 SHOWS Casting concrete into A) Wood mold and C) Silicon mold. Concrete bars made with B) Wood mold and D) Silicon mold. FIG. 52 shows a schematic diagram of sorption experiments of organic solvent-associated PCB into the concrete.

Sorption Experiment of PCB Congeners into Concrete

Differences in PCB sorption based on degree of chlorination were tested by exposing laboratory-prepared concrete to an ethanol solution of four PCB congeners (PCB 39, 101, 153, and 182) whose molecular structures are shown in Formulas 3, 4, 5, 6. The congeners below were chosen because they are present in one or more of the most common Aroclors found in environmental samples[1]. These congeners were also chosen because they have varying polarities and degrees of chlorination. Formulas 3, 4, 5, 6: Molecular structures of different PCB congeners.

Formula 3

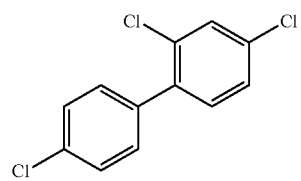

PCB 39

Formula 4

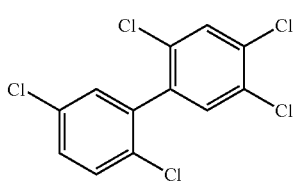

PCB 101

Formula 5

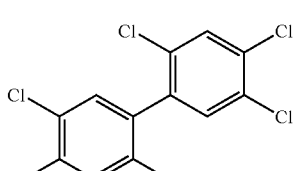

PCB 153

Formula 6

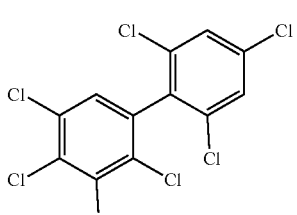

PCB 182

Ten 6-inch concrete bars were immersed in mixtures of the four PCB congeners chosen, at a concentration of 200 µg mL$^{-1}$ each. Immersion and drying were accomplished as previously using PCB 153.

Preparation of Treatment Systems

The treatment of PCB-contaminated concrete in this study was performed through four different formulations each consisting of calcium stearate, ethylene glycol, PowderSorb, and glycerol. These formulations were further divided based on whether they were intended to remove PCBs (NMTS), or to remove and degrade PCBs (AMTS). In the first formulation of NMTS, ethanol/EL (90:10) was used as solvent, while 2-butoxyethanol was used in the second formulation of NMTS. The two AMTS formulations were prepared by combining ball-milled ZVMg/AC coated by glycerol with the NMTS using either acidified ethanol/EL or acidified 2-butoxyethanol.

Treatment with Ethanol/EL NMTS/AMTS and 2-Butoxyethanol NMTS/AMTS

Figure 53A:
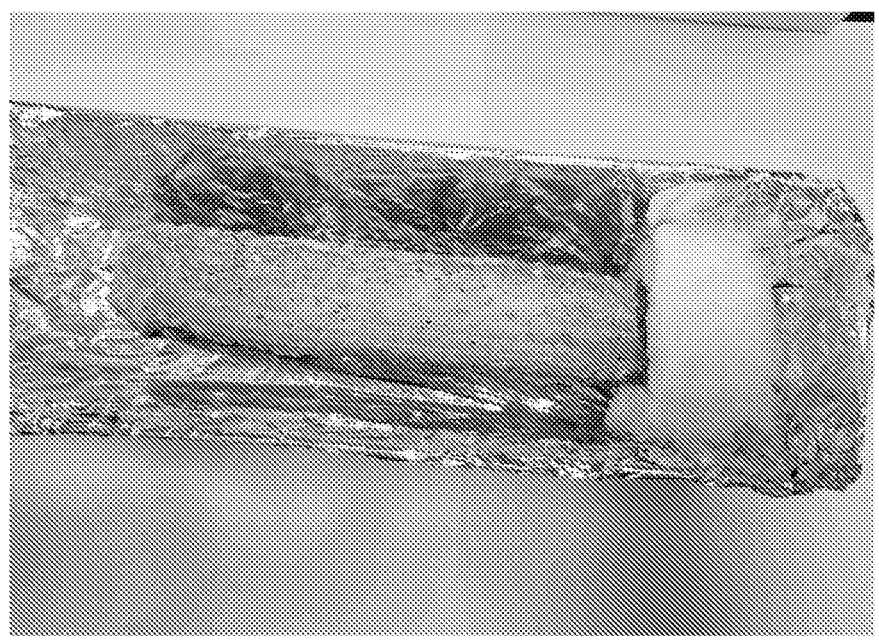
FIG. 53A: shows NMTS applied to the laboratory-prepared concrete containing PCB via direct contact.
Figure 53B:
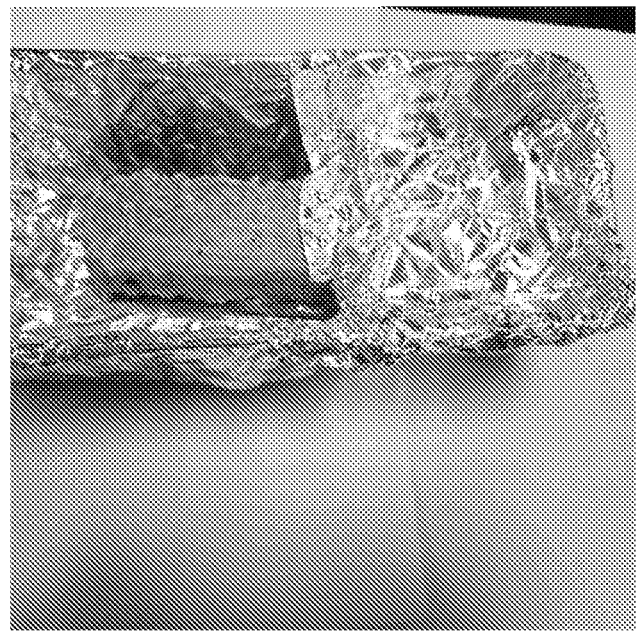
FIG. 53B: shows NMTS sealed with aluminum foil and tape.
Figure 53C:
FIG. 53C: shows all treatment systems and concrete sealed with a plastic bag.

Of the concrete pieces containing PCB prepared for treatment, half were treated with ethanol/EL treatment system pastes (NMTS and AMTS) and the other half were treated with 2-butoxyethanol treatment system pastes by direct contact at one end of the bar, covering the first 0.5 inches of depth (FIG. 53 A). The treatment systems were sealed with aluminum foil and aluminum tape and then covered by plastic bags (FIGS. 53 B and C). The treatment systems were in contact with the concrete for two weeks. Both pastes were used to determine if there was a difference in the maximum distance that the PCBs were withdrawn from the concrete based on the treatment system solvent. FIG. 53 shows A) NMTS was applied to the laboratory-prepared concrete containing PCB via direct contact. B) NMTS were sealed with aluminum foil and tape, C) All treatment system and concrete were sealed with plastic bag.

Sampling of Concrete

Figure 54A:
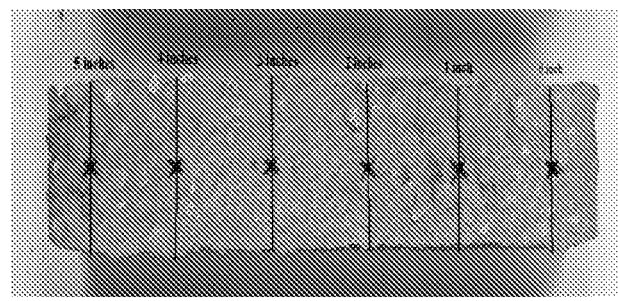
FIG. 54A: shows sampling diagram for PCB-laden concrete with drilling at 0, 1, 2, 3, 4, and 5 inches.
Figure 54B:
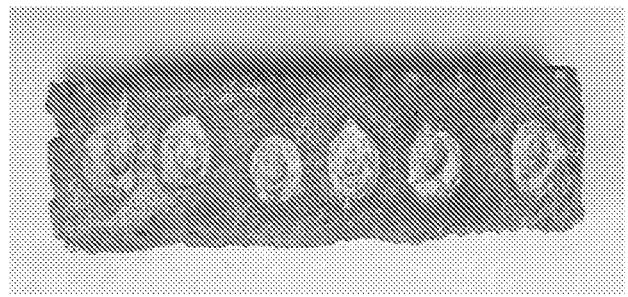
FIG. 54B: shows post-sampling concrete showing depth of core samples.

Concrete bars were sampled according to the EPA standard operating procedure for PCB contaminated porous surfaces[71]. A 10 in. Drill Press with Laser (Ryobi) equipped with LED light and adjustable work platform was used to pulverize the concrete into powder. Concrete bars were drilled at distances of 0, 1, 2, 3, 4 and 5 inches from the position of the source of PCB or the position of treatment paste (FIG. 54). At each distance, surface samples were drilled to a depth of 0.25 inches below the surface using a 0.5-inch carbide drill bit. The concrete powder for each surface sample was taken from all four sides of bar and homogenized. The core samples were drilled from one side of the bar at depth from 0.25 to 0.5 inches into the material by 0.25-inch carbide drill bit FIG. 54 shows A) Sampling diagram for PCB-laden concrete with drilling at 0, 1, 2, 3, 4, and 5 inches. B) Post-sampling concrete showing depth of core samples.

Sample Extraction and Cleanup

Extraction of PCBs from concrete or NMTS/AMTS was accomplished according to EPA Method 3550C (Ultrasonic Extraction)[52]. Samples of 1.0 g of dried NMTS/AMTS or 0.5 g of concrete powder were sonicated for 90 minutes in 10 mL of toluene or 5 mL of ethanol, respectively, using a VWR Scientific Aquasonic Model 750D ultrasound bath. After sonication, samples were centrifuged, and the supernatants were isolated. Toluene/PCB extracts were washed with DI water and required no further extraction. The ethanol/PCB solutions were extracted with equal volumes of toluene and water. All extracted samples were subjected to cleanup according to EPA Method 3665 (Sulfuric Acid/Permanganate Cleanup) with concentrated sulfuric acid and a five percent (w/v) aqueous potassium permanganate solution[53].

Analysis

The analytical instruments used for the quantitative analysis of extracted and cleaned samples of PCB congeners were a Perkin-Elmer Clarus 580 gas chromatograph equipped with an electron capture detector (GC-ECD) equipped with a Restek RTX®-5 column (30 m×0.25 mm i.d., 0.25 µm film thickness). Ultra-high purity nitrogen was used as the ECD makeup gas at a flow of 30 mL/min and helium acted as the carrier gas, a constant flow of 1.3 mL/min was set. The injector port temperature was held at 275° C. and the detector was at 325° C.

The analytical method used for quantitation of PCBs was a modification of EPA Method 8082A (Polychlorinated Biphenyls by Gas Chromatography)[54]. 2,2',3,3',4,4',5,5',6,6'-Decachlorobiphenyl (PCB 209) was used as the internal standards for quantitation. The unknown concentrations of single PCB congeners were determined by linear fit to a five-point calibration curve ($R^2 \geq 0.99$).

Results and Discussion

Sorption of PCB into Concrete Through Transport of Ethanol

The pore network of concrete which forms as a result of its hydration reaction provides passages for the transport of fluid into concrete. This capillary network is hydrophilic, spontaneously absorbing water from the environment which may bring various chemical contaminants. These chemicals species will then diffuse according to the concentration gradient present. It has been proven that PCBs can migrate from primary sources such as caulk and paint into concrete, therefore, the remediation of PCBs should be based on pulling PCBs from the concrete by treatment systems. A goal of the NMTS and AMTS is to remediate PCBs from the PCB-laden concrete by transferring the organic solvent from the treatment system paste to the concrete. The organic solvent and associated PCBs retained from concrete then return to the NMTS/AMTS paste. Therefore, it is important to investigate the ability of the organic solvent that is used in treatment pastes to absorb into concrete in order to understand the process and/or limitations of NMTS/AMTS to be used as a remediation technology.

Effect of Distance from the Source of PCB

Figure 55:
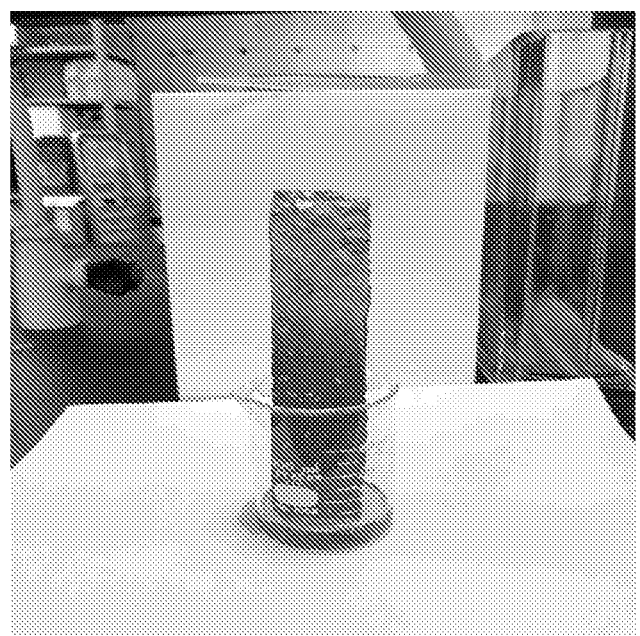
FIG. 55: shows a photo of the penetration height of ethanol into concrete bar.
Figure 56:
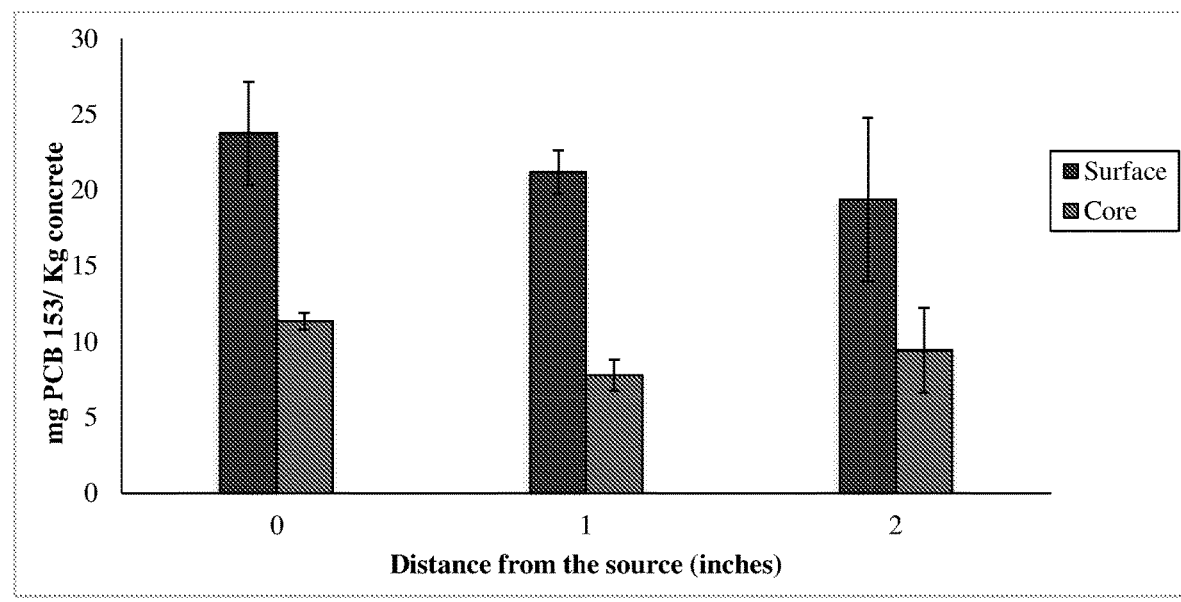
FIG. 56: shows contaminated concrete (3-inch bars) with PCB 153 in ethanol for two weeks.
Figure 57:
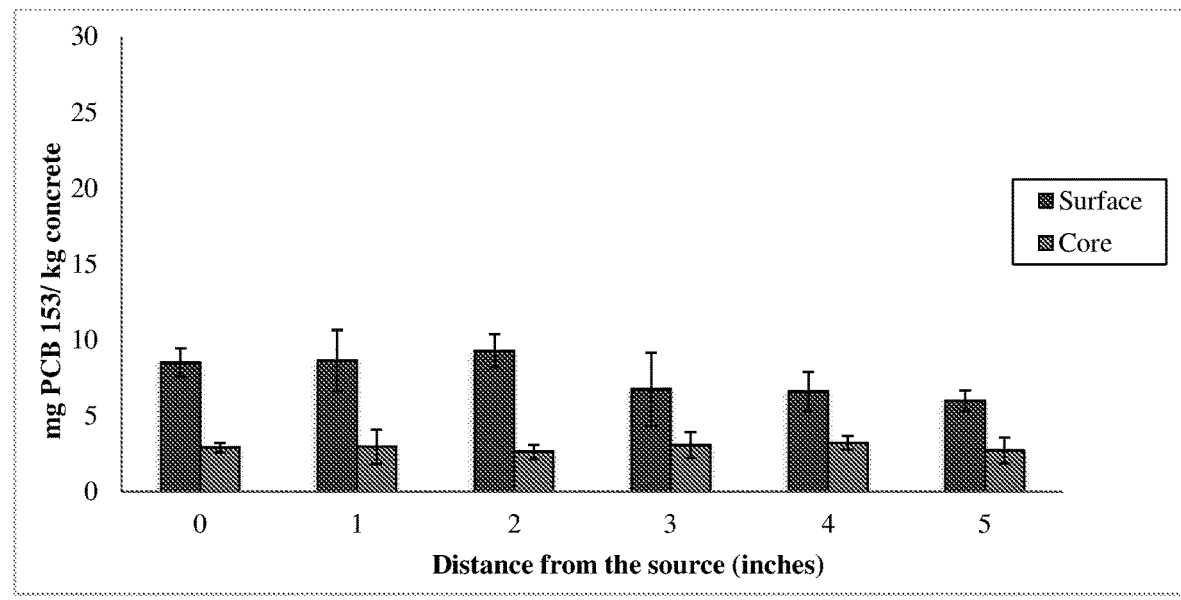
FIG. 57: shows contaminated concrete (6-inch bars) with PCB 153 in ethanol for two weeks.

As it has been proven by Pizzaro[25], PCBs can penetrate the concrete structure to depths reaching several inches under the surface. It would therefore be advantageous to determine the ability of ethanol-associated PCBs to move into concrete at long distances (up to six inches) from the source. As can be seen in FIG. 55, the surface of the concrete bars became dark after immersion in the solution due to the penetration of ethanol into the pore network. The dark region height increased over time, covering the entire surface within a few hours. FIG. 56 and FIG. 57 show the sorption results of three- and six-inch concrete blocks exposed to PCB 153 in ethanol. The results presented indicate that the PCB molecules in ethanol penetrated the entire length of both 3-inch and 6-inch concrete bars. Ethanol as a solvent pushed PCB into concrete more than 5 inches from the source, however, the concentration of PCB decreases as the distance from the source increases. FIG. 55 is a photo of the penetration height of ethanol into concrete bar. FIG. 56 shows contaminated concrete (3-inch bars) with PCB 153 in ethanol for two weeks. FIG. 57 shows contaminated concrete (6-inch bars) with PCB 153 in ethanol for two weeks.

Effect of Contact Time

Figure 58:
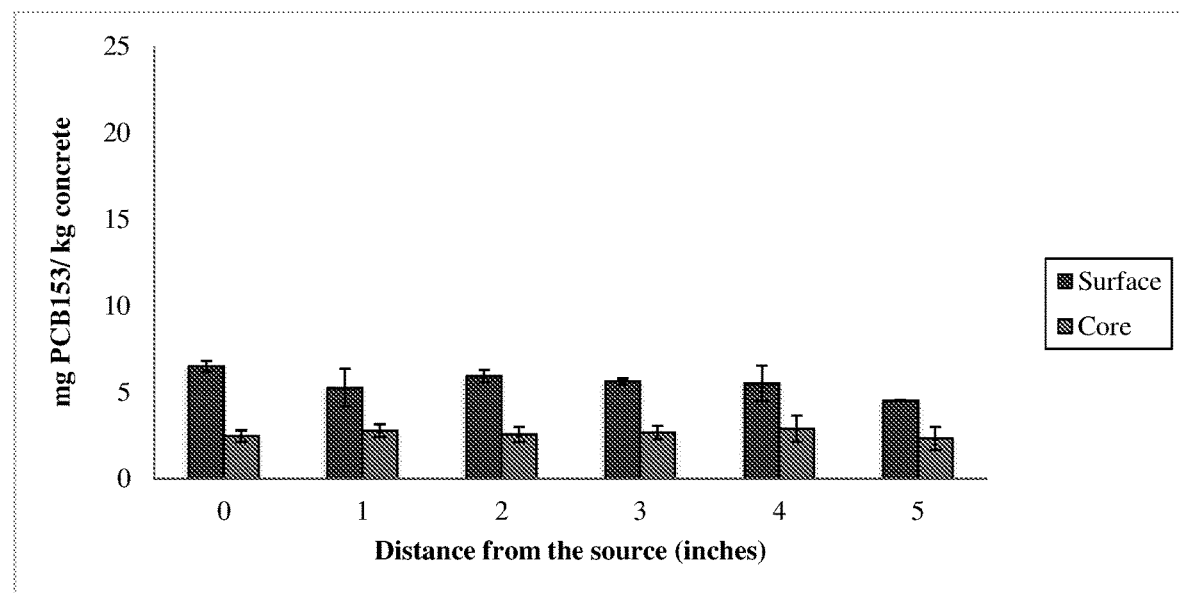
FIG. 58: shows contaminated concrete with PCB 153 in ethanol for one week.
Figure 59:
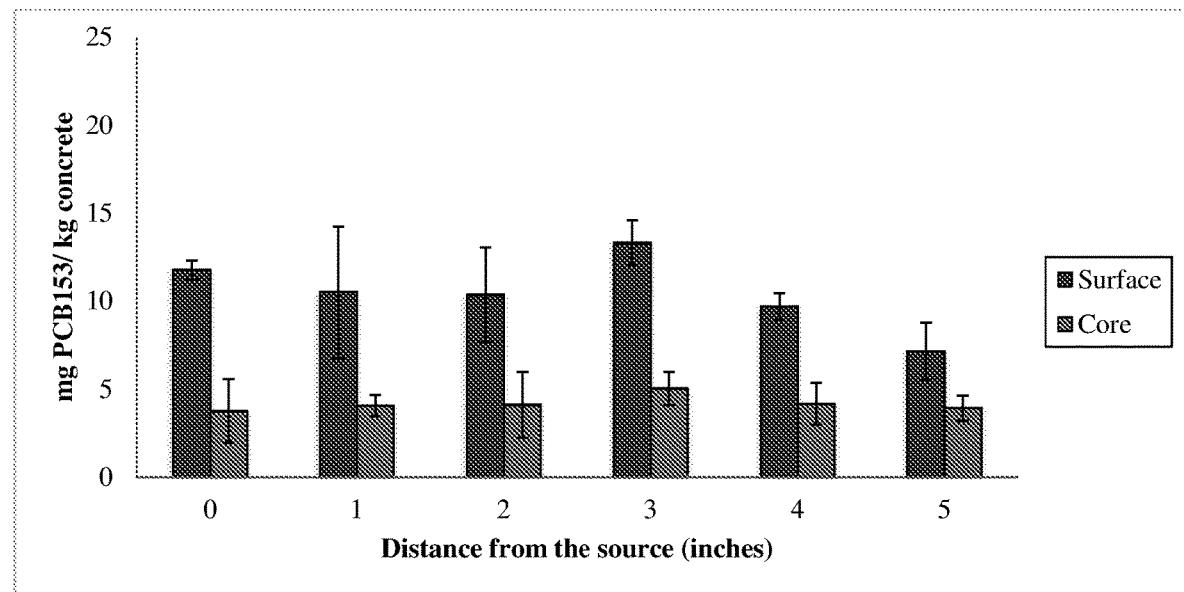
FIG. 59: shows contaminated concrete with PCB153 in ethanol for three weeks.
Figure 60:
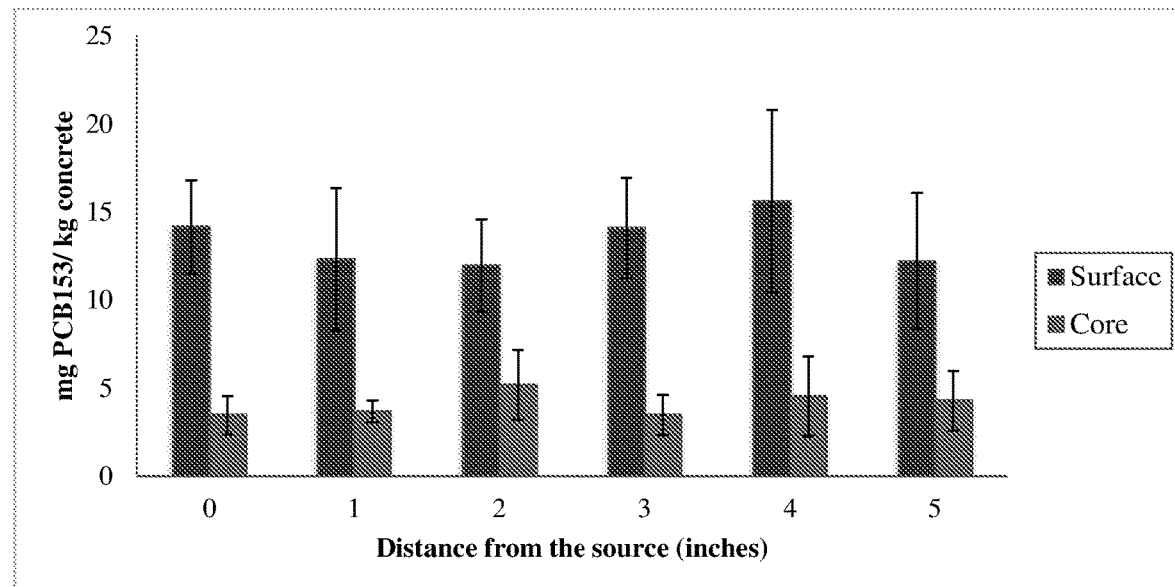
FIG. 60: shows contaminated concrete with PCB153 in ethanol for four weeks.

The ability of ethanol to sorb into concrete was evaluated at sequential time points by measuring the concentration of PCBs in the concrete. At each allotted time, three blocks of concrete were taken out, dried, and sampled by drilling. The results of the surface and internal concentrations of PCBs, given in the following FIG.s, show that the concentration of PCBs increased gradually over immersion time. This phenomenon likely can be explained by the greater ability of the ethanol to increase the surface permeability and open concrete pores through the four weeks immersion. This is consistent with results from studies on immersion of concrete in water, which prove that immersion for 30-days increases surface permeability and pore size[72]. A large or continuous source of PCBs can cause PCBs to diffuse deeper into the concrete structure. By the end of week four of immersion the surface and core PCB concentrations at 5-inches depth rose to approximately the same concentration as the region directly in contact with the contaminant source. FIG. 58 shows contaminated concrete with PCB 153 in ethanol for one week. FIG. 59 shows contaminated concrete with PCB153 in ethanol for three weeks. FIG. 60 shows contaminated concrete with PCB153 in ethanol for four weeks.

The sorption rate of PCB 153 in concrete surface and at depth from 0.25 to 0.5 inches below the surface at different distance from the source was determined. Sorption rate at any point is the amount of PCB adsorbed by the concrete at this point per unit surface area divided by the time of concrete sub-immersion in PCB solution. The dimension and surface area of all concrete species with long 6-inches are similar since they were made by wood mold.

Figure 61:
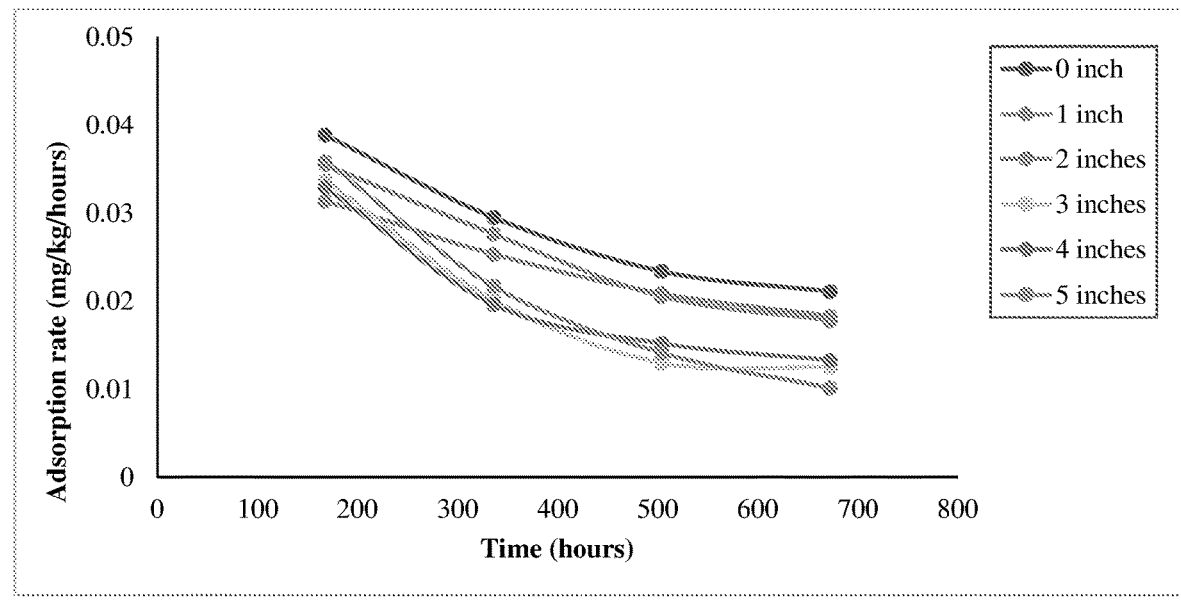
FIG. 61: shows sorption rate of PCB 153 in concrete surface over time.
Figure 62:
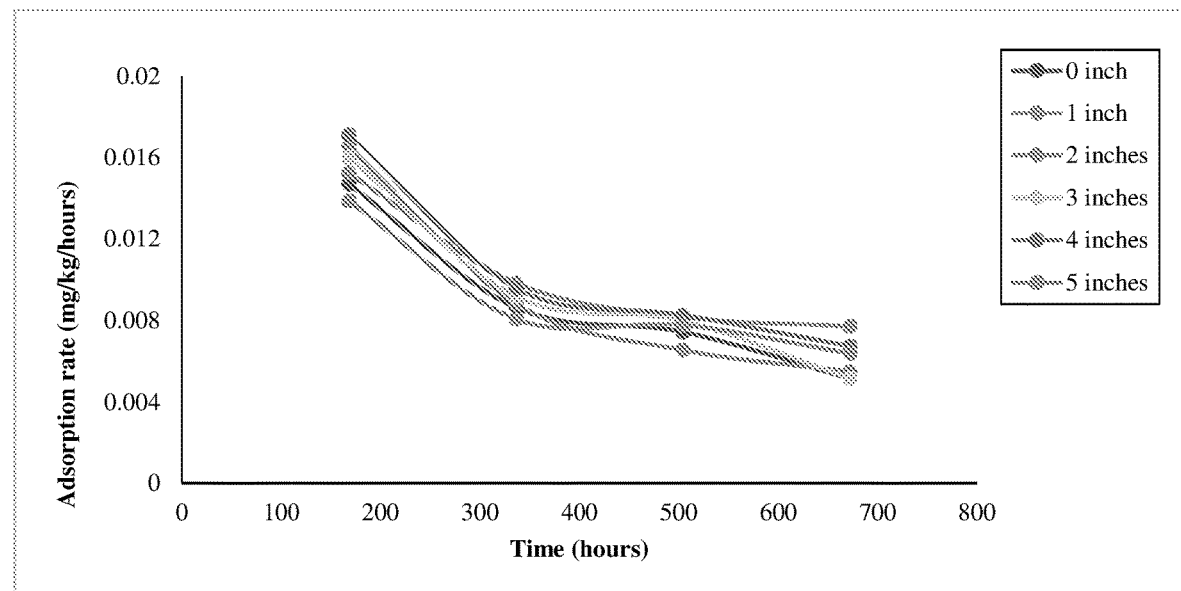
FIG. 62: shows sorption rate of PCB 153 in concrete core over time.

Figures through show the sorption rates as a function of time for concrete surface and cores. Although the PCB content of the specimen's surface and core kept increasing over time, the rate of the sorption decreased as the PCB accumulated in the pores of concrete (FIG. 61 and FIG. 62). If the exposure time is sufficiently long, the concrete will become saturated, and the sorption rate will approach zero. FIG. 61 shows sorption rate of PCB 153 in concrete surface over time. FIG. 62 shows sorption rate of PCB 153 in concrete core over time.

Determination of Solvent Effects on PCB Sorption into Concrete

As indicated previously, use of ethanol as solvent for NMTS and AMTS during the remediation of PCB-laden building materials is a significant limitation, primarily due to its flammability and volatility. Therefore, other kinds of solvents will be needed for the remediation process. As described previously, two organic solvent systems (ethanol/EL and 2-butoxyethanol) were used to develop alternative non-metal and activated metal treatment systems with lower volatility (ethanol/EL and 2-butoxyethanol) and lower flammability (2-butoxyethanol). Because of their success in these new formulations, their ability to move into the surface and the internal structure of concrete was characterized similarly to ethanol, and results were used for a comparison of all three solvent systems.

Figure 63:
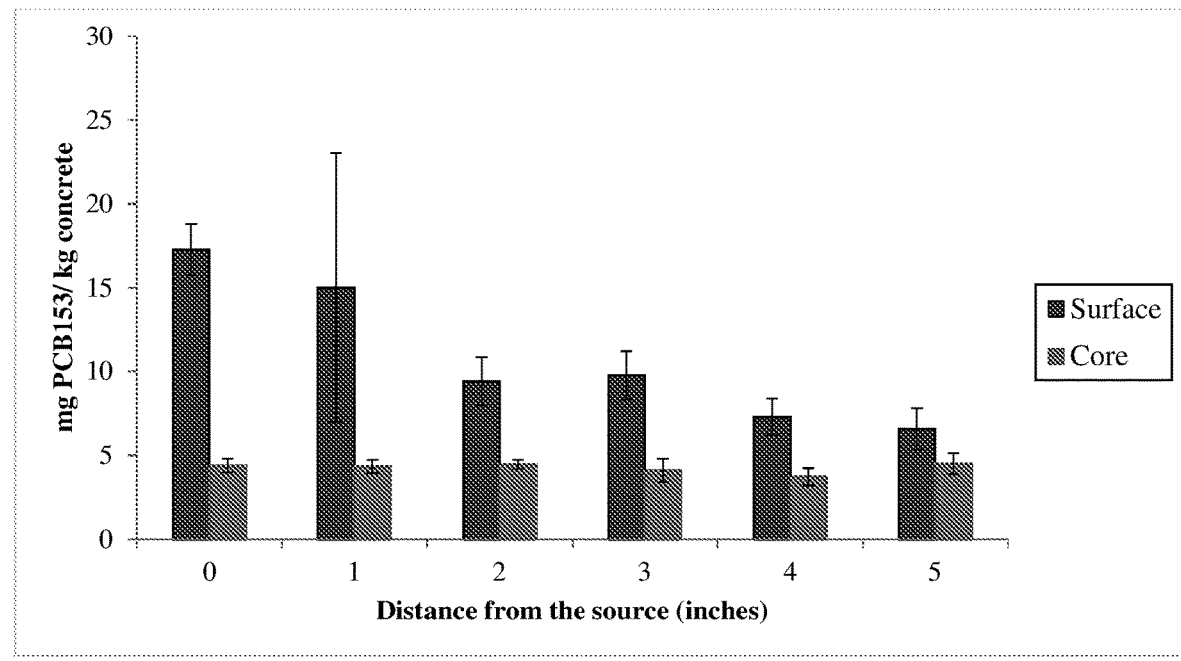
FIG. 63: shows contaminated concrete with PCB 153 in ethanol/EL (90:10) for four weeks.
Figure 64:
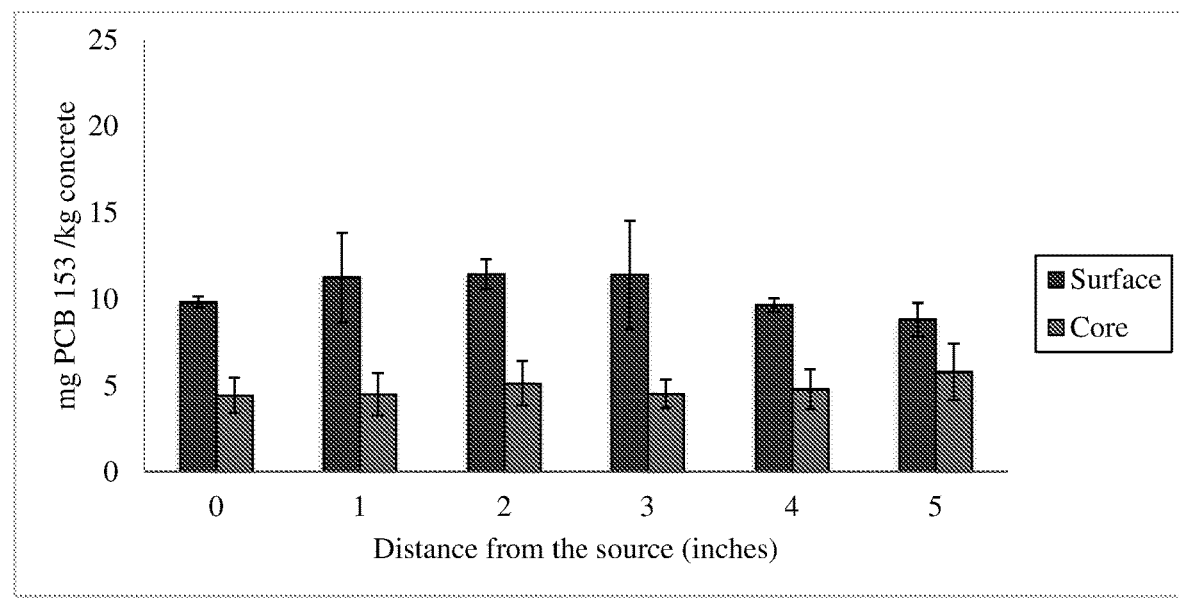
FIG. 64: shows contaminated concrete with PCB 153 in 2-butoxyethanol for four weeks.

Three bars of concrete, each having a length of 6 inches, were immersed in a solution of 200 μg mL$^{-1}$ PCB 153 in ethanol/EL (90:10) to a depth of 0.5 inches, and three additional bars were immersed in a solution of 200 μg mL$^{-1}$ PCB 153 in 2-butoxyethanol. The concrete bars remained in contact with their respective PCB solutions for a period of four weeks. After exposure, the concrete bars were dried at 50 C overnight then sampled by drilling at 1-inch intervals and extracted as previously. PCB concentrations on the surface and in the core as a function of distance are illustrated in FIG. 63 and FIG. 64. FIG. 63 shows contaminated concrete with PCB 153 in ethanol/EL (90:10) for four weeks. FIG. 64 shows contaminated concrete with PCB 153 in 2-butoxyethanol for four weeks.

Both solvent systems exhibit the ability to permeate into the pores of concrete, as evidenced by the detection of PCB 153 in the concrete surface as well as in the core samples. This ability is probably due to their low viscosity. The concentration of PCB 153 in concrete exposed for four weeks decreases in the order ethanol>ethanol/EL>2-butoxyethanol. Considering that the concrete bars have similar surface areas and were exposed to the same concentration of PCB 153, the solvent and the characteristics of the concrete pore structure play the critical role in penetration efficiency.

It has been proven that the wettability and permeability of concrete with respect to liquids decrease with increasing molecular size, the permeability decreases as steric hindrance increases. The different sorption behaviors of ethanol, ethanol/EL, and 2-butoxyethanol have been shown to be directly related to their molecular structure and size. As expected, 2-butoxyethanol with its relatively long alkyl chain exhibited the lowest concentrations of PCB 153 in concrete. The behavior demonstrated in FIG. 64 is similar to that seen when ethanol was used as the solvent (FIG. 60), especially in core concentrations, although surface concentrations were consistently lower in 2-butoxyethanol. Conversely, concentrations of PCBs in bars exposed to the ethanol/EL solvent system deviated significantly from this behavior. FIG. 63 shows how ethanol/EL cannot push PCB far inside concrete bar, having significantly higher concentrations in the first few inches.

There are three possible explanations regarding the differences in PCB concentration at various distances within the concrete bars exposed to ethanol/EL. First the molecular size of EL and ethanol molecules may affect their movement through the concrete pore structure. A second explanation for the difference in PCB concentration is the difference in the pore structure since multiple concrete bars were used. It might be the concrete bars used in the experiments studying sorption of PCB-associated ethanol/EL have a discontinuous pore structure which resulted in entrapped PCB. The difference can be explained also on the basis of interactions between EL and cement in concrete due to the presence of a carboxyl group in EL, which may effectively trap most PCBs in the first inches of concrete.

Treatment with Ethanol/EL NMTS/AMTS and 2-Butoxyethanol NMTS/AMTS

NMTS using acidified ethanol as a solvent was investigated for its ability to remediate PCBs from different porous materials such as concrete, brick, and granite. Although the PCB remediation was successful, this system is limited by rapid activity loss from solvent evaporation and is unable to fully extract all PCBs present in concrete. Therefore, experiments were performed to test treatment of PCB-laden concrete using acidified ethanol/EL NMTS/AMTS and acidified 2-butoxyethanol NMTS/AMTS via direct contact.

Figure 65:
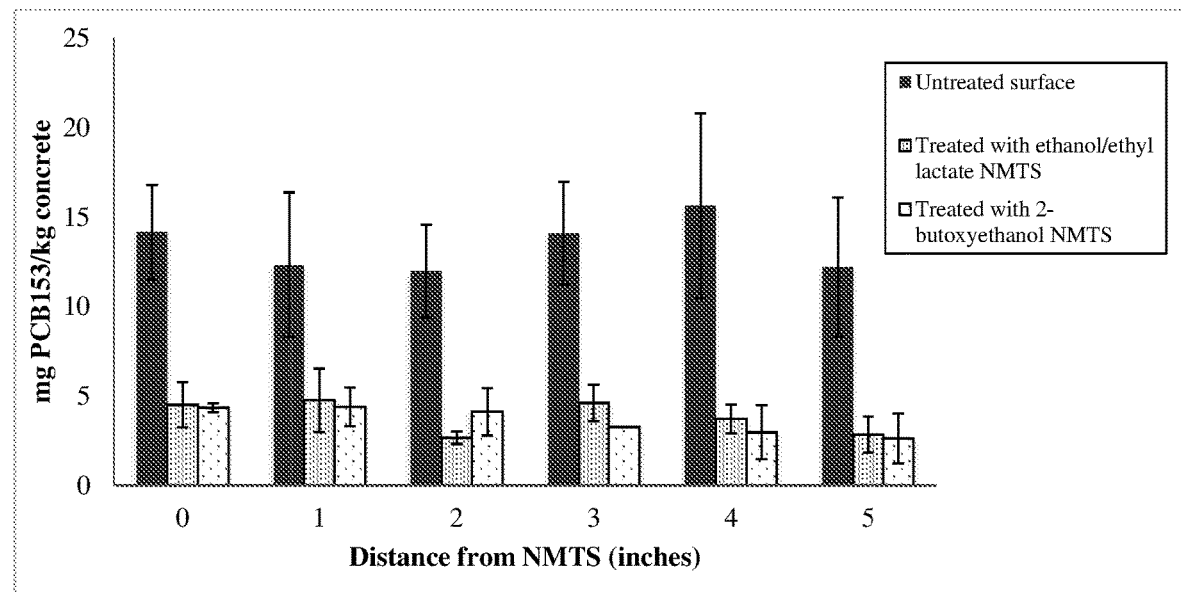
FIG. 65: shows concentration of PCB 153 in the surface of the laboratory-prepared concrete after treatment with ethanol/EL NMTS and 2-butoxyethanol NMTS.
Figure 66:
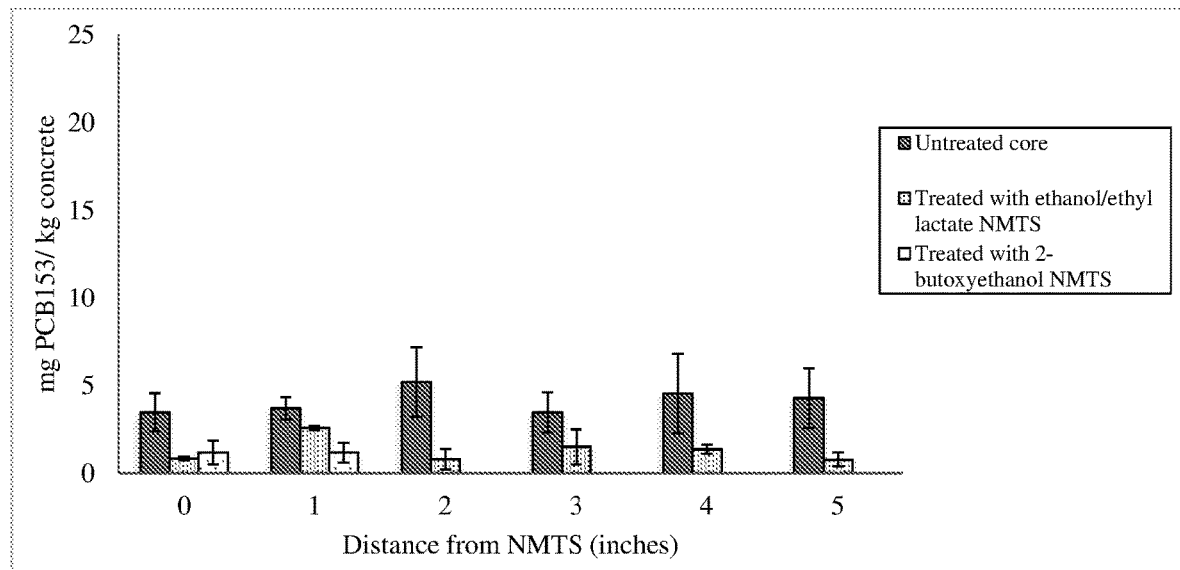
FIG. 66: shows concentration of PCB 153 in the core of the laboratory-prepared concrete after treatment with ethanol/EL NMTS and 2-butoxyethanol NMTS.

Treatment was performed by directly applying the appropriate treatment system to the source end of a contaminated concrete bar, then sealing the treated area with aluminum foil and aluminum tape. The treatment was performed for two weeks, after which the aluminum tape and treatment system were removed and the concrete was sampled by drilling. PCBs were extracted as previously from the concrete powder and analyzed by GC-ECD. The results of this analysis for NMTS are presented in FIG. 65 and FIG. 66. FIG. 65 shows concentration of PCB 153 in the surface of the laboratory-prepared concrete after treatment with ethanol/EL NMTS and 2-butoxyethanol NMTS. FIG. 66 shows concentration of PCB 153 in the core of the laboratory-prepared concrete after treatment with ethanol/EL NMTS and 2-butoxyethanol NMTS.

Table 12 shows concentration of PCB 153 in treated concrete by ethanol/EL AMTS and 2-butoxyethanol AMTS.

TABLE 12

| Distance from the AMTS (inches) | mg PCB/kg concrete treated by ethanol/EL AMTS | | mg PCB/kg concrete treated by 2-butoxyethanol AMTS | |
| --- | --- | --- | --- | --- |
| | Treated Surface [a] | Core [b] | Treated surface [a] | Treated core [b] |
| 0 | 3.92 ± 1.85 | 0.97 ± 1.03 | 1.66 ± 0.69 | 1.97 ± 0.13 |
| 1 | 2.74 ± 1.48 | 0.91 ± 0.28 | 1.34 ± 0.51 | 1.91 ± 0.42 |
| 2 | 1.87 ± 1.10 | 1.15 ± 0.74 | 1.19 ± 0.13 | 0.15 ± 0.02 |
| 3 | 2.59 ± 0.68 | 1.56 ± 0.13 | 0.98 ± 0.44 | 0.56 ± 0.38 |
| 4 | 2.01 ± 0.32 | 1.32 ± 0.84 | 0.80 ± 0.06 | N.D. [c] |
| 5 | 2.67 ± 0.17 | 0.89 ± 0.51 | 1.07 ± 0.14 | N.D. [c] |

From the surface to 0.25 inches into concrete.
From depth 0.25 to 0.50 inches into concrete.
Not detectable.

After fourteen days of treatment with ethanol/EL NMTS and 2-butoxyethanol NMTS high PCB removal was achieved. Both solvent systems are easily capable of solubilizing and desorbing PCBs from the concrete even at 5-inches distance from the application site. However, 2-butoxyethanol NMTS/AMTS show slightly higher reduction of PCB in the surface samples. The greatest change in PCB concentration was seen in the core samples with 2-butoxyethanol where the PCB concentration dropped to 1.17 mg/kg at the first two inches away from the treatment systems. After that, PCB concentrations were observed to practically nondetectable levels. The long alkyl groups in 2-butoxyethanol create an electronic environment along the polyaliphatic chain of the solvent which enhances the attraction of the electron-deficient aromatic nuclei of PCBs.

Conclusion

The organic solvents tested each have a remarkable ability to wet the surface and to permeate into the pores of concrete. The transport of PCBs into the concrete occurs to significant depths dependent on the contact time and structure of the solvent associated with the PCBs in question. Concrete prepared in the laboratory that was contaminated with PCB 153 was treated with NMTS and AMTS, these novel treatment system formulations using either a co-solvent system (ethanol/EL) or 2-butoxyethanol as solvents were shown to be successful for the extraction of PCBs from concrete. The activated treatment systems with ZVMg/AC were shown to extract and degrade PCBs.

LISTING OF REFERENCES

1. Erickson, M. D., *Analytical chemistry of PCBs*. CRC press: 1997.
2. Wiegel, J.; Wu, Q., Microbial reductive dehalogenation of polychlorinated biphenyls. *FEMS microbiology ecology* 2000, 32 (1), 1-15.
3. Breivik, K.; Sweetman, A.; Pacyna, J. M., Towards a global historical emission inventory for selected PCB congeners—a mass balance approach 1. Global production and consumption. *The Science of the Total Environment* 2002, 290, 181-198.
4. Broadhurst, M. G., Use and replaceability of polychlorinated biphenyls. *Environmental Health Perspectives* 1972, 2, 81.
5. Macintosh, D. L.; Minegishi, T.; Fragala, M. A.; Allen, J. G.; Coghlan, K. M.; Stewart, J. H.; McCarthy, J. F., Mitigation of building-related polychlorinated biphenyls in indoor air of a school. *Environmental Health* 2012, 11 (1), 24.
6. Tehrani, R.; Van Aken, B., Hydroxylated polychlorinated biphenyls in the environment: sources, fate, and toxicities. *Environmental Science and Pollution Research* 2014, 21 (10), 6334-6345.
7. Council, N. R., *A risk-management strategy for PCB-contaminated sediments*. National Academies Press: 2001.
8. Choi, S.-D.; Baek, S.-Y.; Chang, Y.-S.; Wania, F.; Ikonomou, M. G.; Yoon, Y.-J.; Park, B.-K.; Hong, S., Passive air sampling of polychlorinated biphenyls and organochlorine pesticides at the Korean Arctic and Antarctic research stations: Implications for long-range transport and local pollution. *Environmental science & technology* 2008, 42 (19), 7125-7131.
9. Rodenburg, L. A.; Du, S.; Fennell, D. E.; Cavallo, G. J., Evidence for widespread dechlorination of polychlorinated biphenyls in groundwater, landfills, and wastewater collection systems. *Environmental science & technology* 2010, 44 (19), 7534-7540.
10. Hu, D.; Martinez, A.; Hornbuckle, K. C., Discovery of non-aroclor PCB (3,3'-dichlorobiphenyl) in Chicago air. *Environmental science & technology* 2008, 42 (21), 7873-7877.
11. Borja, J.; Taleon, D. M.; Auresenia, J.; Gallardo, S., Polychlorinated biphenyls and their biodegradation. *Process biochemistry* 2005, 40 (6), 1999-2013.
12. Rodenburg, L.; Guo, J.; Christie, R., Polychlorinated biphenyls in pigments: inadvertent production and environmental significance. *Coloration Technology* 2015, 131 (5), 353-369.
13. Stenberg, M.; Hamers, T.; Machala, M.; Fonnum, F.; Stenius, U.; Lauy, A.-A.; van Duursen, M. B.; Westerink, R. H.; Fernandes, E. C. A.; Andersson, P. L., Multivariate toxicity profiles and QSAR modeling of non-dioxin-like PCBs—an investigation of in vitro screening data from ultra-pure congeners. *Chemosphere* 2011, 85 (9), 1423-1429.
14. Biphenyls, P., ATSDR Case Studies in Environmental Medicine Polychlorinated Biphenyls (PCBs) Toxicity.
15. Hopf, N. B.; Waters, M. A.; Ruder, A. M., Cumulative exposure estimates for polychlorinated biphenyls using a job-exposure matrix. *Chemosphere* 2009, 76 (2), 185-193.
16. Engel, L. S.; Laden, F.; Andersen, A.; Strickland, P. T.; Blair, A.; Needham, L. L.; Barr, D. B.; Wolff, M. S.; Helzlsouer, K.; Hunter, D. J., Polychlorinated biphenyl levels in peripheral blood and non-Hodgkin's lymphoma: a report from three cohorts. *Cancer research* 2007, 67 (11), 5545-5552.
17. U.S. Environmental Protection Agency: Toxic Substances Control Act (TSCA). In 40 *CFR* 700-766, 1976; pp 2601-2692.
18. U. S. Environmental Protection Agency, Polychlorinated Biphenyls (PCBs) Manufacturing, Processing, Distribution in Commerce, and Use Prohibitions. In 40*CFR*761, 2007.
19. In PCBs, Stockholm, Sweden, Stockholm Convention on Persistent Organic Pollutants: Stockholm, Sweden, 2001.
20. Herrick, R. F.; Lefkowitz, D. J.; Weymouth, G. A., Soil contamination from PCB-containing buildings. *Environmental health perspectives* 2007, 115 (2), 173.
21. Herrick, R. F., PCBs in school—persistent chemicals, persistent problems. *New Solutions: A Journal of Environmental and Occupational Health Policy* 2010, 20 (1), 115-126.
22. Brown, K. W.; Minegishi, T.; Cummiskey, C. C.; Fragala, M. A.; Hartman, R.; Macintosh, D. L., PCB remediation in schools: a review. *Environmental Science and Pollution Research* 2016, 23 (3), 1986-1997.
23. Bent, S.; Bohm, K.; Boschemeyer, L.; Gahle, R.; Kortmann, F.; Michel, W.; Schmidt, C.; Weber, F., Management of indoor air pollution by polychlorinated biphenyl compounds exemplified by two Hagen schools. *Gesundheitswesen (Bundesverband der Arzte des Offentlichen Gesundheitsdienstes (Germany))* 1994, 56 (7), 394-398.
24. Jartun, M.; Ottesen, R. T.; Steinnes, E.; Volden, T., Painted surfaces—Important sources of polychlorinated biphenyls (PCBs) contamination to the urban and marine environment. *Environmental Pollution* 2009, 157 (1), 295-302.
25. Pizarro, G. E.; Dzombak, D. A.; Smith, J. R., Evaluation of cleaning and coating techniques for PCB-contaminated concrete. *Environmental Progress & Sustainable Energy* 2002, 21 (1), 47-56.
26. Kuusisto, S.; Lindroos, O.; Rantio, T.; Priha, E.; Tuhkanen, T., PCB contaminated dust on indoor surfaces—Health risks and acceptable surface concentrations in residential and occupational settings. *Chemosphere* 2007, 67 (6), 1194-1201.

27. Coghlan, K.; Chang, M.; Jessup, D.; Fragala, M.; McCrillis, K.; Lockhart, T., Characterization of polychlorinated biphenyls in building materials and exposures in the indoor environment. *Indoor Air* 2002, 2002, 147-152.
28. Kolarik, B.; Andersen, H. V.; Frederiksen, M.; Gunnarsen, L., Laboratory investigation of PCB bake-out from tertiary contaminated concrete for remediation of buildings. *Chemosphere* 2017, 179, 101-111.
29. Corner, R.; Sundahl, M.; Ek-Olausson, B.; Tysklind, M., PCB in indoor air and dust in buildings in Stockholm. *Indoor Air* 2002, 141-146.
30. Balfanz, E.; Fuchs, J.; Kieper, H., Sampling and analysis of polychlorinated biphenyls (PCB) in indoor air due to permanently elastic sealants. *Chemosphere* 1993, 26 (5), 871-880.
31. Burkhardt, U.; Bork, M.; Balfanz, E.; Leidel, J., Indoor pollution by polychlorinated (PCB) biphenyls in permanent elastic sealing compounds. *Gesundheitswesen* 1990, 52 (10), 567-574.
32. Chang, M.; Coghlan, K.; McCarthy, J., Remediating PCB-containing building products: strategies and regulatory considerations. *Indoor Air* 2002, 171-176.
33. Andersson, M.; Ottesen, R.; Volden, T., Building materials as a source of PCB pollution in Bergen, Norway. *Science of the total environment* 2004, 325 (1), 139-144.
34. Herrick, R. F.; McClean, M. D.; Meeker, J. D.; Baxter, L. K.; Weymouth, G. A., An Unrecognized Source of PCB Contamination in Schools and Other Buildings. *Environmental Health Perspectives* 2004, 112 (10), 1051-1053.
35. Barkley, N. P., Update on building and structure decontamination. *Journal of the Air & Waste Management Association* 1990, 40 (8), 1174-1178.
36. Kaštánek, F.; Kaštánek, P., Combined decontamination processes for wastes containing PCBs. *Journal of hazardous materials* 2005, 117 (2), 185-205.
37. *Environmental Health & Engineering, Inc.: Literature Review of Remediation Methods for PCBs in Buildings*; Contract No. EP-C-10-043, EPA/600/R-12/034; 2012.
38. VanSchalkwyk, W. *Managing PCBs in Our Infrastructure presented at Triumvirate Environmental Inc. (TEI) Roundtable Series: PCBs in Building Caulk: A Primer.* Somerville; Oct. 20, 2009, 2009.
39. Ljung, M.; Olsson, M.; Tolstoy, N., Research and development in sanitation technology for PCB-containing sealants. *Building Physics* 2002, 6.
40. Saitta, E. K.; Gittings, M. J.; Novaes-Card, S.; Quinn, J.; Clausen, C.; O'Hara, S.; Yestrebsky, C. L., Case study of a non-destructive treatment method for the remediation of military structures containing polychlorinated biphenyl contaminated paint. *Journal of environmental management* 2015, 158, 40-47.
41. DeVor, R.; Carvalho-Knighton, K.; Aitken, B.; Maloney, P.; Holland, E.; Talalaj, L.; Fidler, R.; Elsheimer, S.; Clausen, C. A.; Geiger, C. L., Dechlorination comparison of mono-substituted PCBs with Mg/Pd in different solvent systems. *Chemosphere* 2008, 73 (6), 896-900.
42. Negroni, A.; Zanaroli, G.; Vignola, M.; Fava, F.; Shu, H.-Y., REDUCTIVE DECHLORINATION OF POLYCHLORINATED BIPHENYLS (PCBs) BY MEANS OF NANOSCALE ZERO-VALENT NICKEL-IRON (NZVNI) PARTICLES. *Environmental Engineering & Management Journal (EEMJ)* 2012, 11 (10).
43. Coutts, J. L.; Devor, R. W.; Aitken, B.; Hampton, M. D.; Quinn, J. W.; Clausen, C. A.; Geiger, C. L., The use of mechanical alloying for the preparation of palladized magnesium bimetallic particles for the remediation of PCBs. *Journal of hazardous materials* 2011, 192 (3), 1380-1387.
44. Ruiz, N.; Krug, T.; O'Hara, S.; Quinn, J.; Clausen, C.; Geiger, C.; Captain, J. *Application of a Bimetallic Treatment System (BTS) for PCB Removal from Older Structures on DoD Facilities*; NAVAL FACILITIES ENGINEERING COMMAND PORT HUENEME CA ENGINEERING SERVICE CENTER: 2010.
45. Saitta, E. K., Laboratory Studies to Field Evaluation: Remediation of Polychlorinated Biphenyl Contaminated painted surfaces Through the use of Activated Metal Treatment Systems. 2010.
46. Maloney, P.; DeVor, R.; Novaes-Card, S.; Saitta, E.; Quinn, J.; Clausen, C. A.; Geiger, C. L., Dechlorination of polychlorinated biphenyls using magnesium and acidified alcohols. *Journal of hazardous materials* 2011, 187 (1), 235-240.
47. Novaes-Card, S., Magnesium And Acidified Ethanol Based Treatment Systems For The Extraction And Dechlorination Of Polychlorinated Biphenyls From Contaminated Oils, Paints, And Soils. 2013.
48. Legron-Rodriguez, T., Remediation Of Polychlorinated Biphenyl (pcb) Contaminated Building Materials Using Non-metal And Activated Metal Treatment Systems. 2013.
49. Saitta, E. K.; Gittings, M. J.; Clausen, C.; Quinn, J.; Yestrebsky, C. L., Laboratory evaluation of a prospective remediation method for PCB-contaminated paint. *Journal of Environmental Health Science and Engineering* 2014, 12 (1), 57.
50. Matsuda, H.; Inaba, K.; Nishihara, K.; Sumida, H.; Kurihara, K.; Tochigi, K.; Ochi, K., Separation Effects of Renewable Solvent Ethyl Lactate on the Vapor—Liquid Equilibria of the Methanol+ Dimethyl Carbonate Azeotropic System. *Journal of Chemical & Engineering Data* 2017, 62 (9), 2944-2952.
51. Henneberry, M.; Snively, J. A.; Vasek, G. J.; Datta, R., Biosolvent composition of lactate ester and D-limonene with improved cleaning and solvating properties. Google Patents: 2004.
52. Method 3550C Ultrasonic Extraction. U.S. Environmental Protection Agency, U.S. Government Printing Office: Washington, D C, 2007.
53. Method 3665A Sulfuric Acid/Permanganate Cleanup. U.S. Environmental Protection Agency, U.S. Government Printing Office: Washington, D C, 1996.
54. Method 8082A Polychlorinated Biphenyls (PCBs) by Gas Chromatography. U.S. Environmental Protection Agency, U.S. Government Printing Office: Washington, D C, 2007.
55. Elie, M. R.; Williamson, R. E.; Clausen, C. A.; Yestrebsky, C. L., Application of a magnesium/co-solvent system for the degradation of polycyclic aromatic hydrocarbons and their oxygenated derivatives in a spiked soil. *Chemosphere* 2014, 117, 793-800.
56. Guo, H.; Wang, W.; Sun, Y.; Li, H.; Ai, F.; Xie, L.; Wang, X., Ethyl lactate enhances ethylenediaminedisuccinic acid solution removal of copper from contaminated soils. *Journal of hazardous materials* 2010, 174 (1), 59-63.
57. Choi, H.; Al-Abed, S. R., Effect of reaction environments on the reactivity of PCB (2-chlorobiphenyl) over activated carbon impregnated with palladized iron. *Journal of hazardous materials* 2010, 179 (1), 869-874.
58. Jonker, M. T.; Koelmans, A. A., Sorption of polycyclic aromatic hydrocarbons and polychlorinated biphenyls to soot and soot-like materials in the aqueous environment:

mechanistic considerations. *Environmental Science & Technology* 2002, 36 (17), 3725-3734.
59. Zullo, F. M.; Liu, M.; Zou, S.; Yestrebsky, C. L., Mechanistic and computational studies of PCB 151 dechlorination by zero valent magnesium for field remediation optimization. *Journal of Hazardous Materials* 2017, 337, 55-61.
60. Mousa, M. A.; Quensen, J. F.; Chou, K.; Boyd, S. A., Microbial dechlorination alleviates inhibitory effects of PCBs on mouse gamete fertilization in vitro. *Environmental science & technology* 1996, 30 (6), 2087-2092.
61. Zarei, H.; Omidi, A., Experimental study on the calorimetric data of 2-butoxyethanol with aliphatic alcohols (C 1-C 4) and correlation with the Wilson, NRTL and UNIQUAC models at T=298K. *The Journal of Chemical Thermodynamics* 2016, 103, 30-35.
62. Boatman, R.; Kelsey, J.; Ball, N., Acute toxicity classification for ethylene glycol mono-n-butyl ether under the Globally Harmonized System. *Regulatory Toxicology and Pharmacology* 2014, 68 (1), 41-50.
63. Robert W. Dicke, W. W. D., Dispersants and Seafood Safety Assessment of the potential impact of COREXIT® oil dispersants on seafood safety. September 2011 ed.; CRRC Dispersant Initiative and Workshop "The Future of Dispersant Use in Spill Response": 2011.
64. Olivia Harris, S. W., Julia George, Carol Eisenmann *Toxicological Profile for 2-Butoxyethanol and 2-Butoxyethanol Acetate*; Atlanta, GA, 1998; pp 1-355.
65. Elie, M., Use Of An Activated Magnesium/cosolvent System For The Desorption And Degradation Of Polycyclic Aromatic Hydrocarbons And Their Oxygenated Derivatives In Contaminated Soils. 2012.
66. Okwadha, G. D.; Li, J., Biocontainment of polychlorinated biphenyls (PCBs) on flat concrete surfaces by microbial carbonate precipitation. *Journal of environmental management* 2011, 92 (10), 2860-2864.
67. Rathfelder, K.; Abriola, L. M., The influence of capillarity in numerical modeling of organic liquid redistribution in two-phase systems. *Advances in Water Resources* 1998, 21 (2), 159-170.
68. Powers, S. E.; Tamblin, M. E., Wettability of porous media after exposure to synthetic gasolines. *Journal of Contaminant Hydrology* 1995, 19 (2), 105-125.
69. Polychlorinated Biphenyl (PCB) Site Revitalization Guidance Under the Toxic Substances Control Act (TSCA). U.S. Environmental Protection Agency, U.S. Government Printing Office: Washington, D C, 2005.
70. Nischt, W. *Removal of PCBs From Concrete*
71. Standard Operating Procedure for Sampling Porous Surfaces for Polychlorinated Biphenyls (PCBs). U.S. Environmental Protection Agency: Boston, MA, 2011.
72. Liu, J.; Xing, F.; Dong, B.; Ma, H.; Pan, D., Study on surface permeability of concrete under immersion. *Materials* 2014, 7 (2), 876-886.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C § 112, sixth paragraph. In particular, the use of "step of" in the claims herein is not intended to invoke the provisions of 35 U.S.C § 112, sixth paragraph.

What is claimed is:

1. A treatment system capable of remediating a halogenated compound, the treatment system comprising:
   optionally from about 0 to about 80 percent by weight based on the total weight of the treatment system of a plurality of zero-valent metal particles; and
   from about 5 to about 95 percent by weight based on the total weight of the treatment system of a co-solvent comprising:
   from about 85 to about 90 percent by weight based on the total weight of the co-solvent of a first organic hydrogen donating solvent, wherein the first organic hydrogen donating solvent is selected from the group consisting of ethanol, 2-butoxyethanol, t-butanol, n-propanol, 1,4 butadiol, ethylenediamine, ethylene glycol, 2,2 diphenylethanol, 2-piperidinethanol, 2-methoxyethanol, and combinations thereof; and wherein the first organic hydrogen donating solvent is optionally acidified, and
   from about 5 to about 10 percent by weight based on the total weight of the co-solvent of a second organic hydrogen donating solvent, wherein the second organic hydrogen donating solvent comprises ethyl lactate, ethyl laurate or a solvent having the formula:

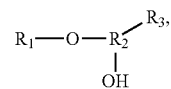

wherein $R_1$ is a $C_1$ to $C_6$ hydrocarbon moiety,
wherein $R_2$ is a $C_1$ to $C_3$ hydrocarbon moiety, and
wherein $R_3$ is selected from hydrogen and a $C_1$ to $C_3$ hydrocarbon moiety.

2. The treatment system according to claim 1, wherein the treatment system includes the plurality of zero-valent metal particles, and wherein the first organic hydrogen donating solvent is acidified.

3. The treatment system according to claim 1, wherein the second organic hydrogen donating solvent is ethyl lactate.

4. The treatment system according to claim 1, wherein, when applied to a painted surface comprising one or more halogenated compounds, the treatment system maintains more than 50% of its efficiency at extracting the one or more halogenated compounds from the paint over a period of at least 30 days.

5. The treatment system according to claim 1, further comprising activated carbon.

6. The treatment system according to claim 1, further comprising a thickener.

7. The treatment system according to claim 1, wherein the treatment system includes the plurality of zero-valent metal particles, and wherein the plurality of zero-valent metal particles do not include a coating of a catalytic noble metal.

8. The treatment system according to claim 1, wherein the co-solvent does not comprise water.

9. The treatment system according to claim 1, wherein the treatment system includes the plurality of zero-valent metal particles, and wherein the zero-valent metal particles are zero-valent magnesium particles.

* * * * *